US011512404B2

(12) United States Patent
Pain et al.

(10) Patent No.: US 11,512,404 B2
(45) Date of Patent: Nov. 29, 2022

(54) MATRIX-CONTROLLED PRINTHEAD FOR AN ELECTROCHEMICAL ADDITIVE MANUFACTURING SYSTEM

(71) Applicant: FABRIC8LABS, INC., San Diego, CA (US)

(72) Inventors: David Pain, Carlsbad, CA (US); Andrew Edmonds, Oceanside, CA (US); Jeffrey Herman, Solana Beach, CA (US); Charles Pateros, Carlsbad, CA (US); David Wirth, San Diego, CA (US); Kareemullah Shaik, San Diego, CA (US)

(73) Assignee: FABRIC8LABS, INC., San Diego, CA (US)

( * ) Notice: Subject to any disclaimer, the term of this patent is extended or adjusted under 35 U.S.C. 154(b) by 0 days.

(21) Appl. No.: 17/566,546

(22) Filed: Dec. 30, 2021

(65) Prior Publication Data

US 2022/0162765 A1 May 26, 2022

Related U.S. Application Data

(63) Continuation of application No. PCT/US2020/047531, filed on Aug. 21, 2020, which
(Continued)

(51) Int. Cl.
*C25D 1/00* (2006.01)
*B33Y 50/02* (2015.01)
(Continued)

(52) U.S. Cl.
CPC .............. *C25D 1/003* (2013.01); *B33Y 10/00* (2014.12); *B33Y 30/00* (2014.12); *B33Y 50/02* (2014.12)

(58) Field of Classification Search
CPC ........ C25D 1/003; B33Y 10/00; B33Y 30/00; B33Y 50/02
See application file for complete search history.

(56) References Cited

U.S. PATENT DOCUMENTS

| 4,575,330 A | 3/1986 | Hull |
| 4,678,282 A | 7/1987 | Yaniv et al. |
| (Continued) | | |

FOREIGN PATENT DOCUMENTS

| CN | 104178782 | 12/2014 |
| CN | 204097583 | 1/2015 |
| (Continued) | | |

OTHER PUBLICATIONS

Frey et al., "Switch-matrix-based High-Density Microelectrode Array in CMOS Technology", IEEE Journal of Solid-State-Circuits, Feb. 2010, pp. 467-482, vol. 45, No. 2.
(Continued)

*Primary Examiner* — Ciel P Contreras
(74) *Attorney, Agent, or Firm* — Kunzler Bean & Adamson

(57) ABSTRACT

Printhead for a 3D manufacturing system that uses metal electrodeposition to construct parts; embodiments utilize a grid of anodes to achieve high quality parts with features that may be small and detailed. To support grids with thousands or millions of anodes, the printhead may use matrix control with row and column drivers similar to display backplanes. Unlike display backplanes where the design goal is to display images using minimal current, the printhead may be optimized for high current density for fast electrodeposition, and for anode longevity. Current density may exceed 1000 mA per cm-squared, at least an order of magnitude greater than that of display backplanes. Anode longevity may be enhanced by using relatively large anodes compared to the grid pitch of the printhead, by lengthening the conductive
(Continued)

paths through anodes, or both. Embodiments may be constructed by adding anode and insulation layers on top of matrix-controlled switching circuits.

17 Claims, 49 Drawing Sheets

Related U.S. Application Data is a continuation-in-part of application No. 16/926,598, filed on Jul. 10, 2020, now Pat. No. 10,914,000, which is a continuation-in-part of application No. 16/795,495, filed on Feb. 19, 2020, now Pat. No. 10,724,146, said application No. PCT/US2020/047531 is a continuation-in-part of application No. 16/941,372, filed on Jul. 28, 2020, now Pat. No. 10,947,632.

(60) Provisional application No. 62/890,815, filed on Aug. 23, 2019, provisional application No. 62/983,274, filed on Feb. 28, 2020.

(51) Int. Cl.
*B33Y 30/00* (2015.01)
*B33Y 10/00* (2015.01)

(56) References Cited

U.S. PATENT DOCUMENTS

| | | |
|---|---|---|
| 5,132,820 A | 6/1992 | Someya et al. |
| 5,403,460 A | 4/1995 | Sala et al. |
| 5,641,391 A | 6/1997 | Hunter et al. |
| 5,998,805 A | 12/1999 | Shi et al. |
| 6,036,834 A | 3/2000 | Clerc |
| 7,839,831 B2 | 11/2010 | Vrcelj et al. |
| 8,168,540 B1 | 5/2012 | Reid et al. |
| 8,681,077 B2 | 3/2014 | Kimura |
| 9,777,385 B2 | 10/2017 | Wirth et al. |
| 10,465,307 B2 | 11/2019 | Pain et al. |
| 10,724,146 B1 | 7/2020 | Pain et al. |
| 10,914,000 B1 | 2/2021 | Pain et al. |
| 10,947,632 B1 | 3/2021 | Pain et al. |
| 11,232,956 B2 | 1/2022 | Pain et al. |
| 2001/0014409 A1 | 8/2001 | Cohen |
| 2003/0006133 A1 | 1/2003 | Metzger |
| 2004/0129573 A1 | 7/2004 | Cohen |
| 2005/0045252 A1 | 3/2005 | Yamasaki et al. |
| 2005/0176238 A1 | 8/2005 | Cohen et al. |
| 2005/0183959 A1 | 8/2005 | Wilson et al. |
| 2005/0202660 A1 | 9/2005 | Cohen et al. |
| 2005/0223543 A1 | 10/2005 | Cohen et al. |
| 2006/0144698 A1* | 7/2006 | Hsu ............... C25D 17/001 204/228.1 |
| 2006/0283539 A1 | 12/2006 | Slater |
| 2007/0068819 A1 | 3/2007 | Singh et al. |
| 2007/0089993 A1 | 4/2007 | Schwartz et al. |
| 2007/0221504 A1 | 9/2007 | Yuefeng |
| 2010/0300886 A1 | 12/2010 | Lin et al. |
| 2011/0210005 A1 | 9/2011 | Van Den Bossche et al. |
| 2015/0211136 A1* | 7/2015 | Boon ............... C25B 15/02 204/229.8 |
| 2017/0145584 A1 | 5/2017 | Wirth et al. |
| 2019/0160594 A1 | 5/2019 | Flamm et al. |
| 2020/0215810 A1* | 7/2020 | Sutcliffe ........... H01L 31/02164 |
| 2021/0047744 A1* | 2/2021 | Biton ............... B33Y 30/00 |

FOREIGN PATENT DOCUMENTS

| | | |
|---|---|---|
| CN | 104593830 | 5/2015 |
| WO | WO-2005033377 A2 * | 4/2005 ............ C25D 17/10 |
| WO | 2017087884 | 5/2017 |
| WO | 2019150362 | 8/2019 |
| WO | 2021041265 | 3/2021 |

OTHER PUBLICATIONS

Stewart et al., "Polysilicon TFT Technology for Active Matrix OLED Displays", IEEE Transactions on Electron Devices, May 2001, pp. 845-851, vol. 48, No. 5.
International Search Report and Written Opinion for PCT/US2020/047531 dated Sep. 29, 2020.
Supplementary International Search Report for PCT/US2020/047531 dated Nov. 22, 2021.
U.S. Appl. No. 17/554,677, filed Dec. 17, 2021.
U.S. Appl. No. 17/535,485, filed Nov. 24, 2021.
U.S. Appl. No. 17/566,546, filed Dec. 30, 2021.
U.S. Appl. No. 17/535,437, filed Nov. 24, 2021.

* cited by examiner

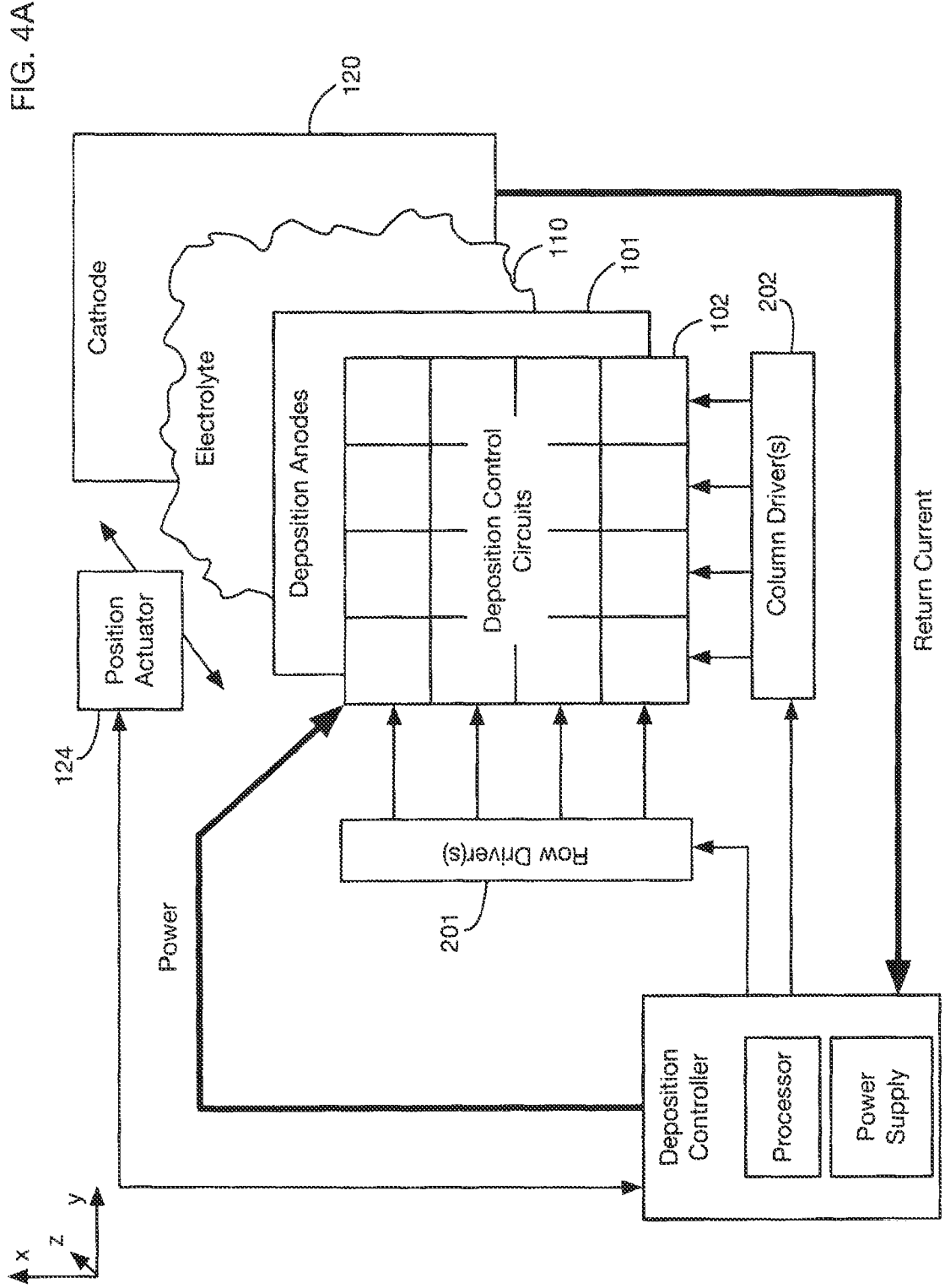

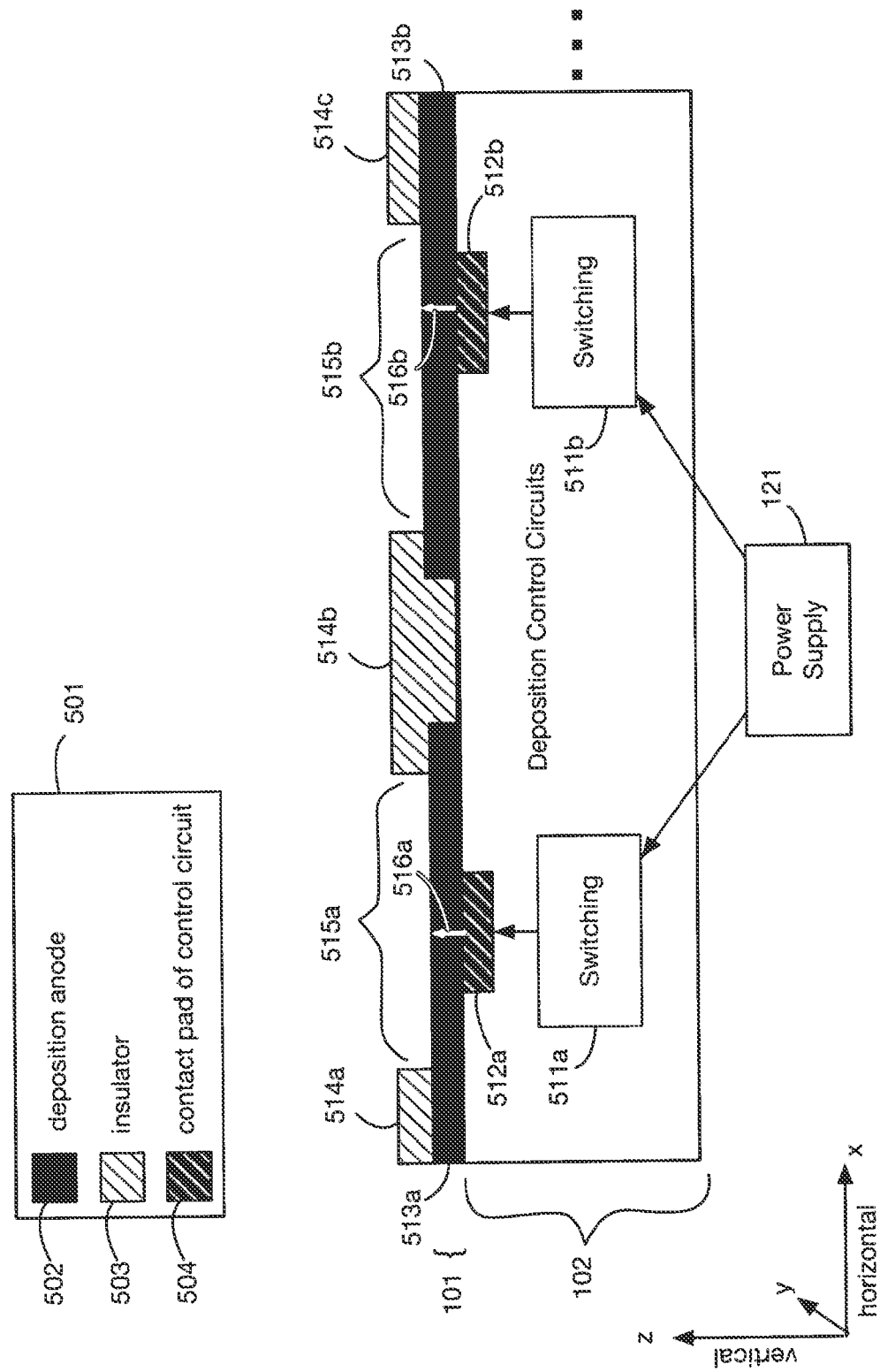

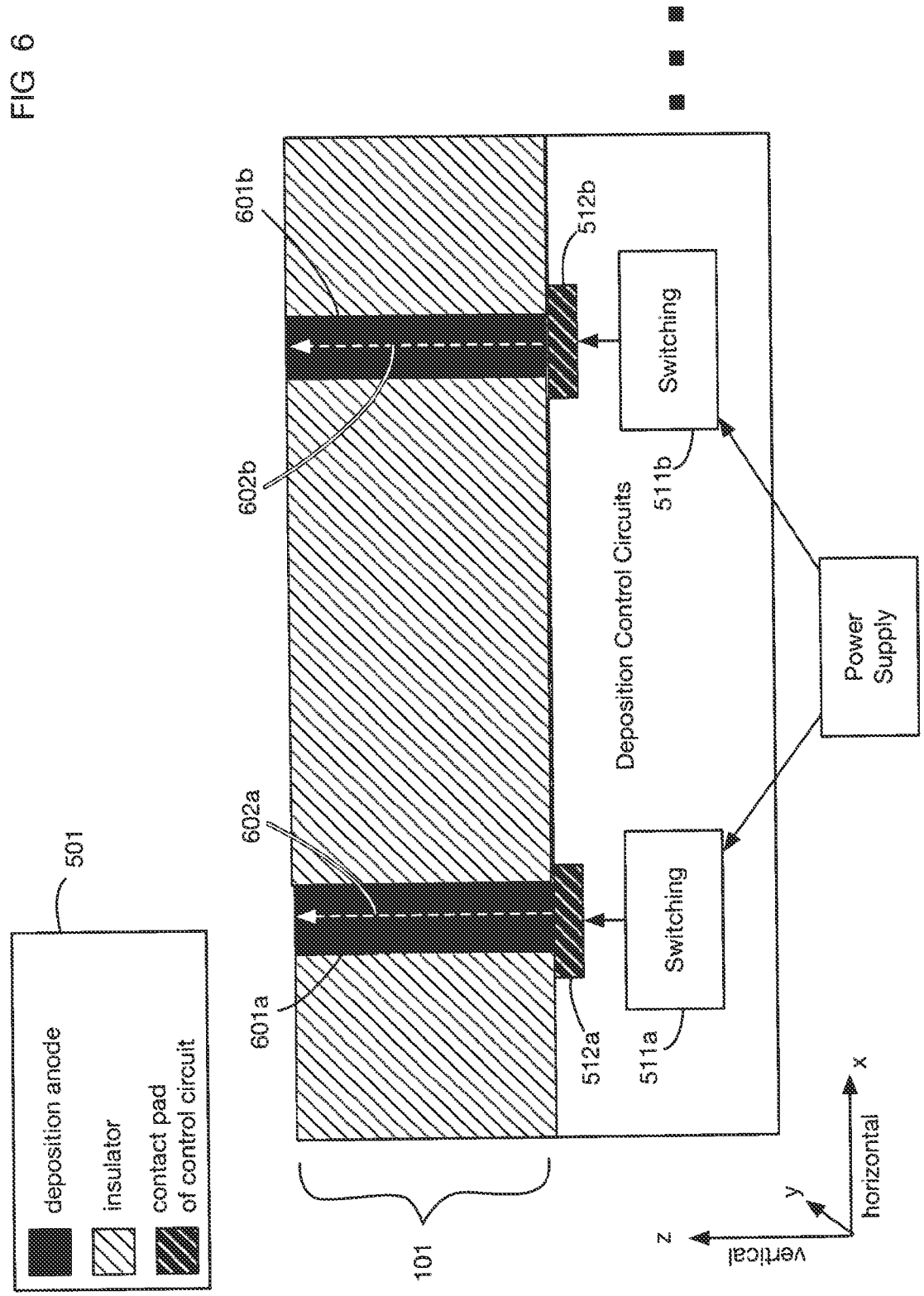

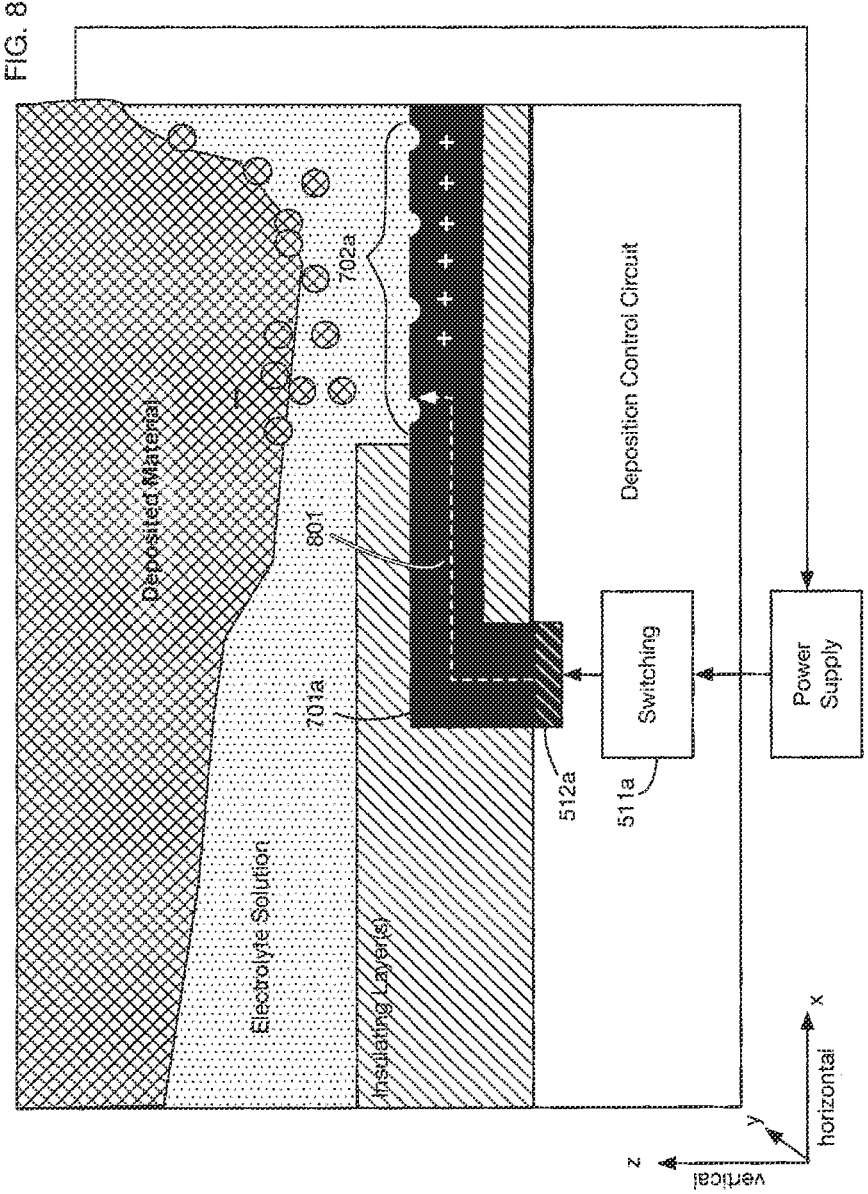

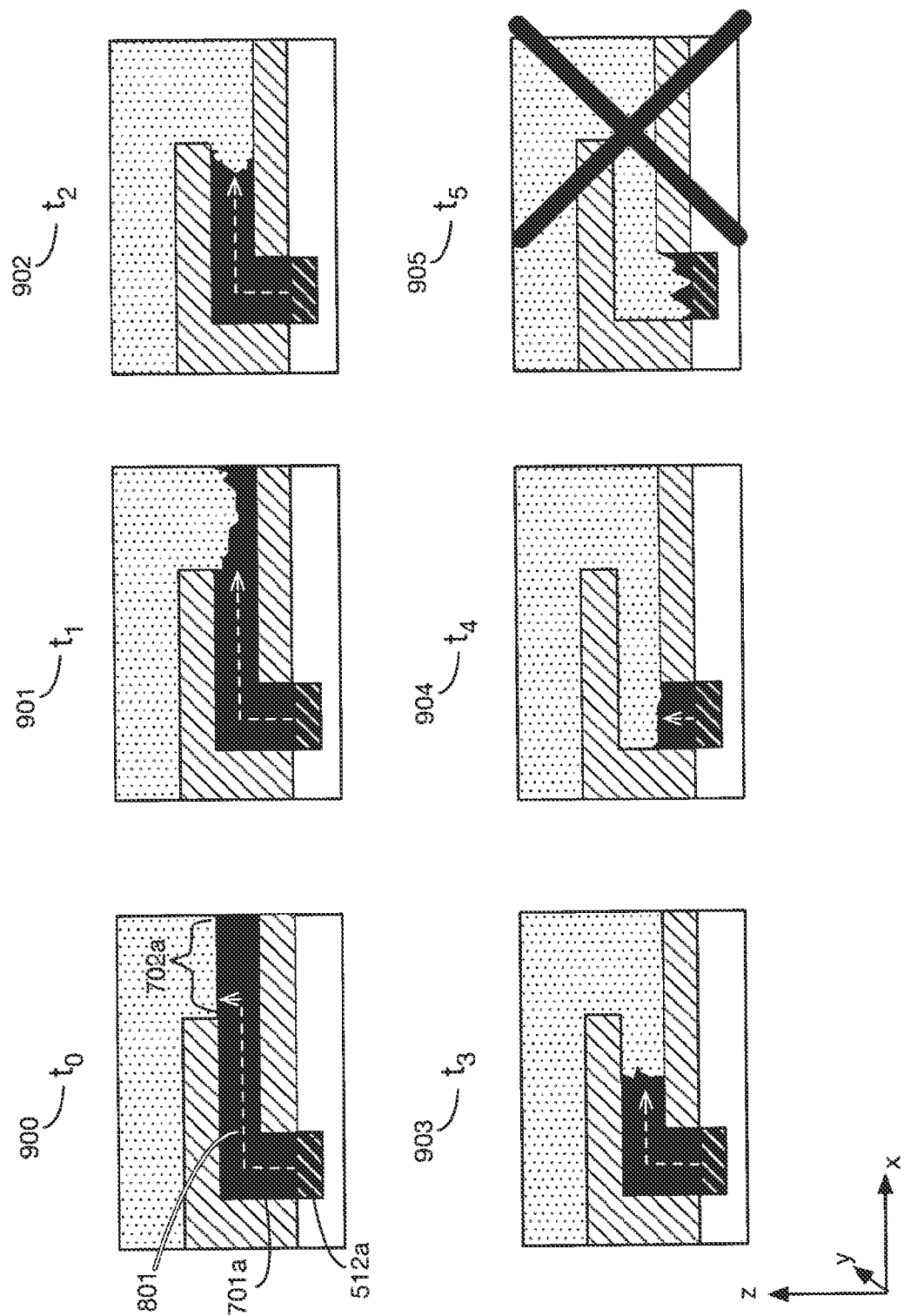

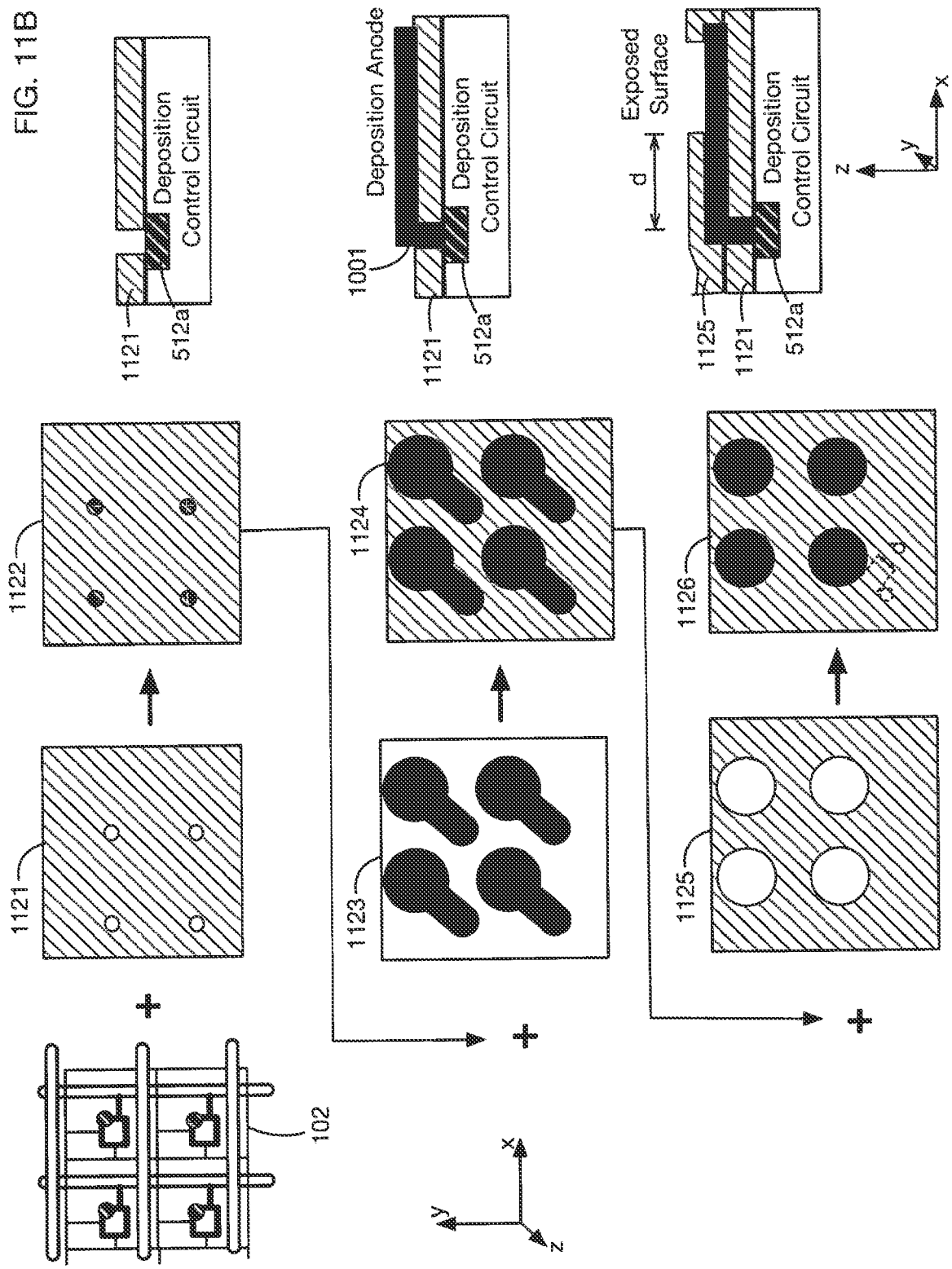

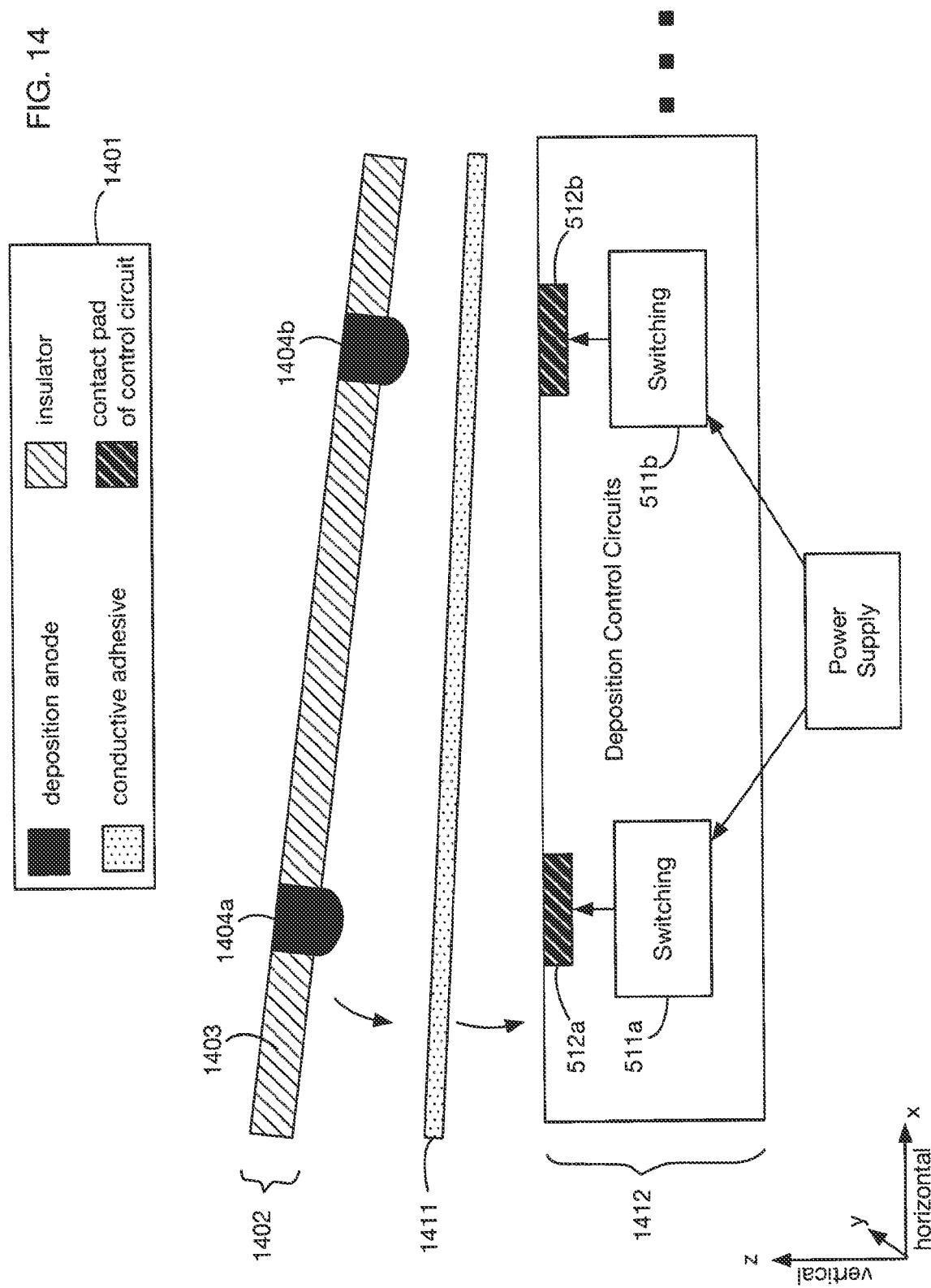

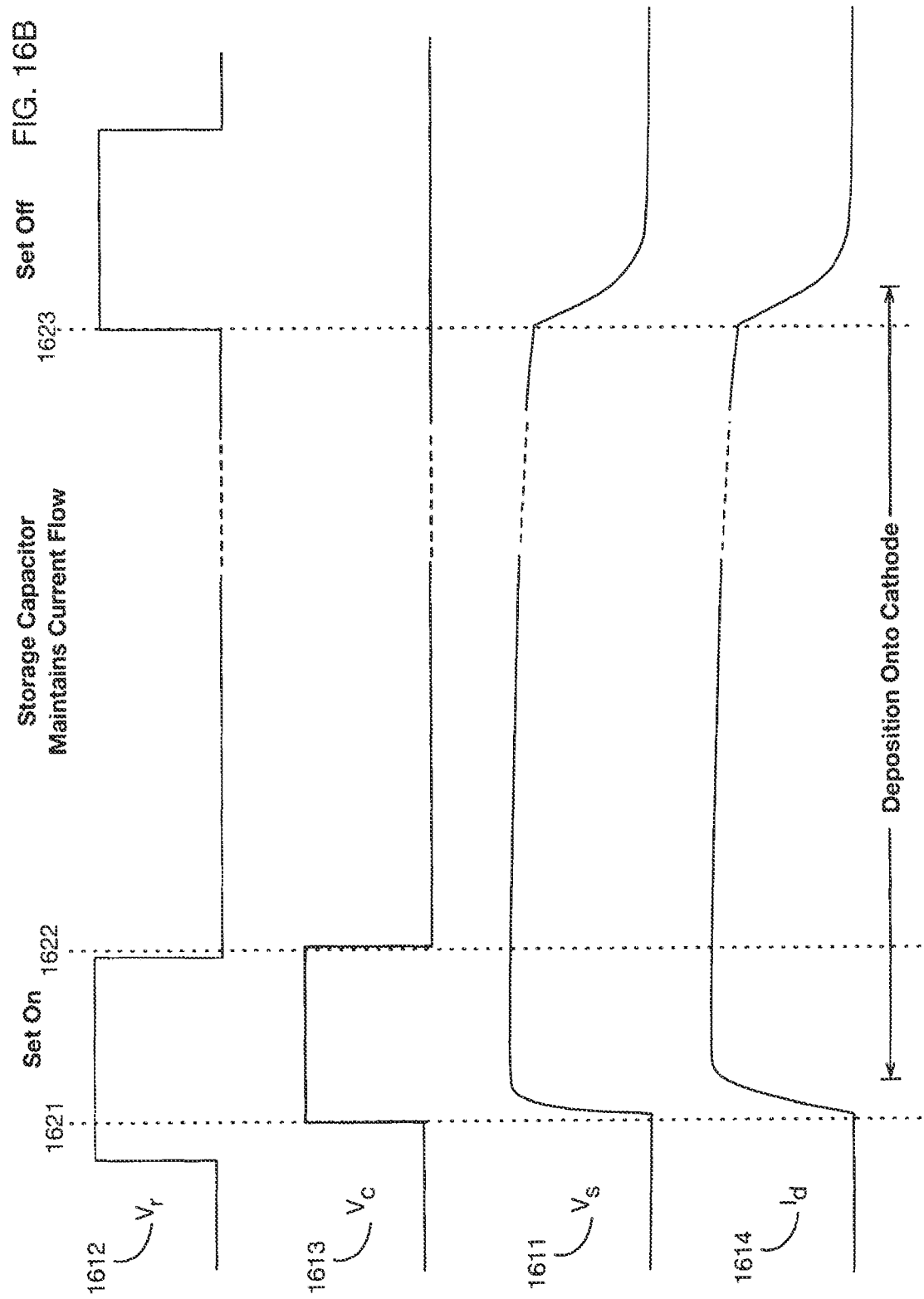

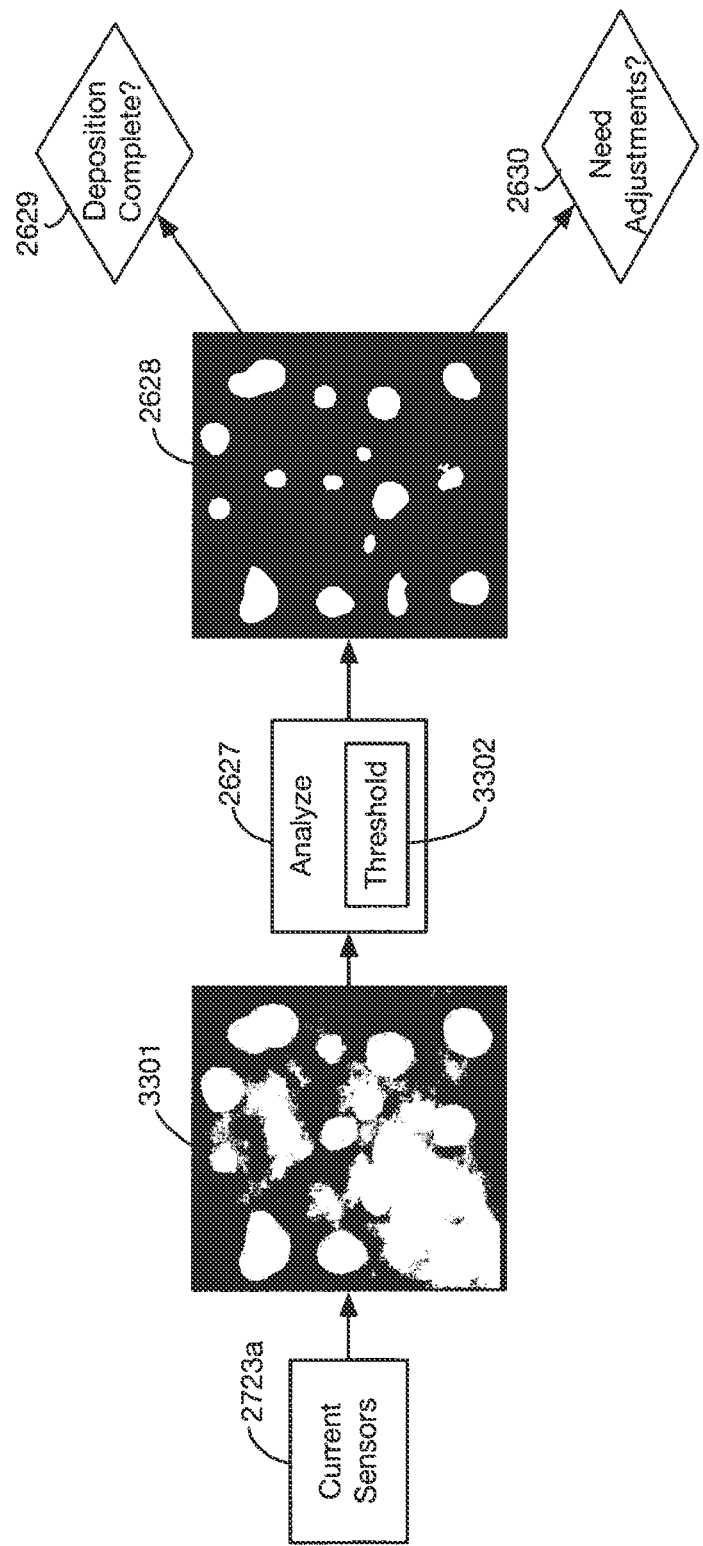

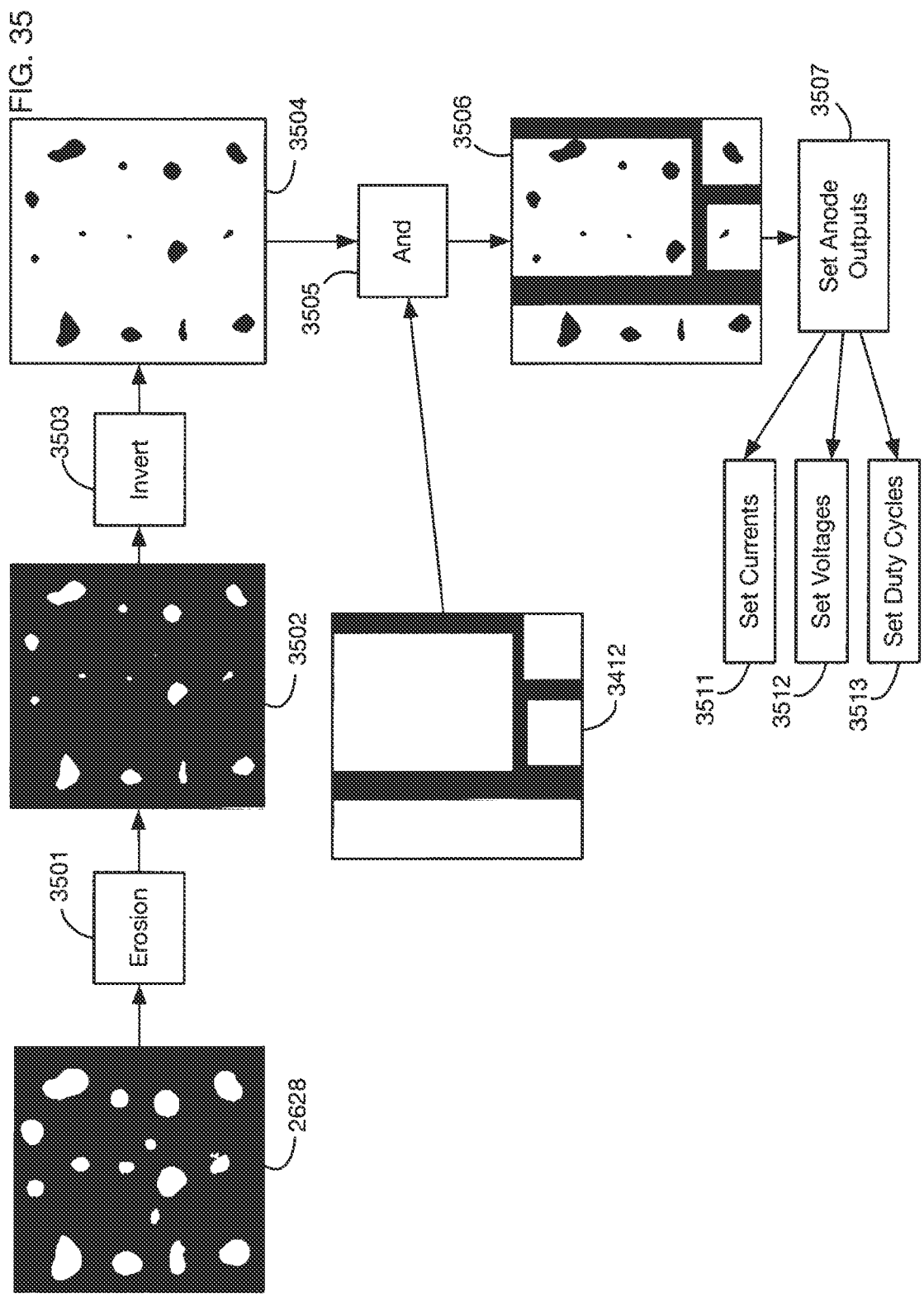

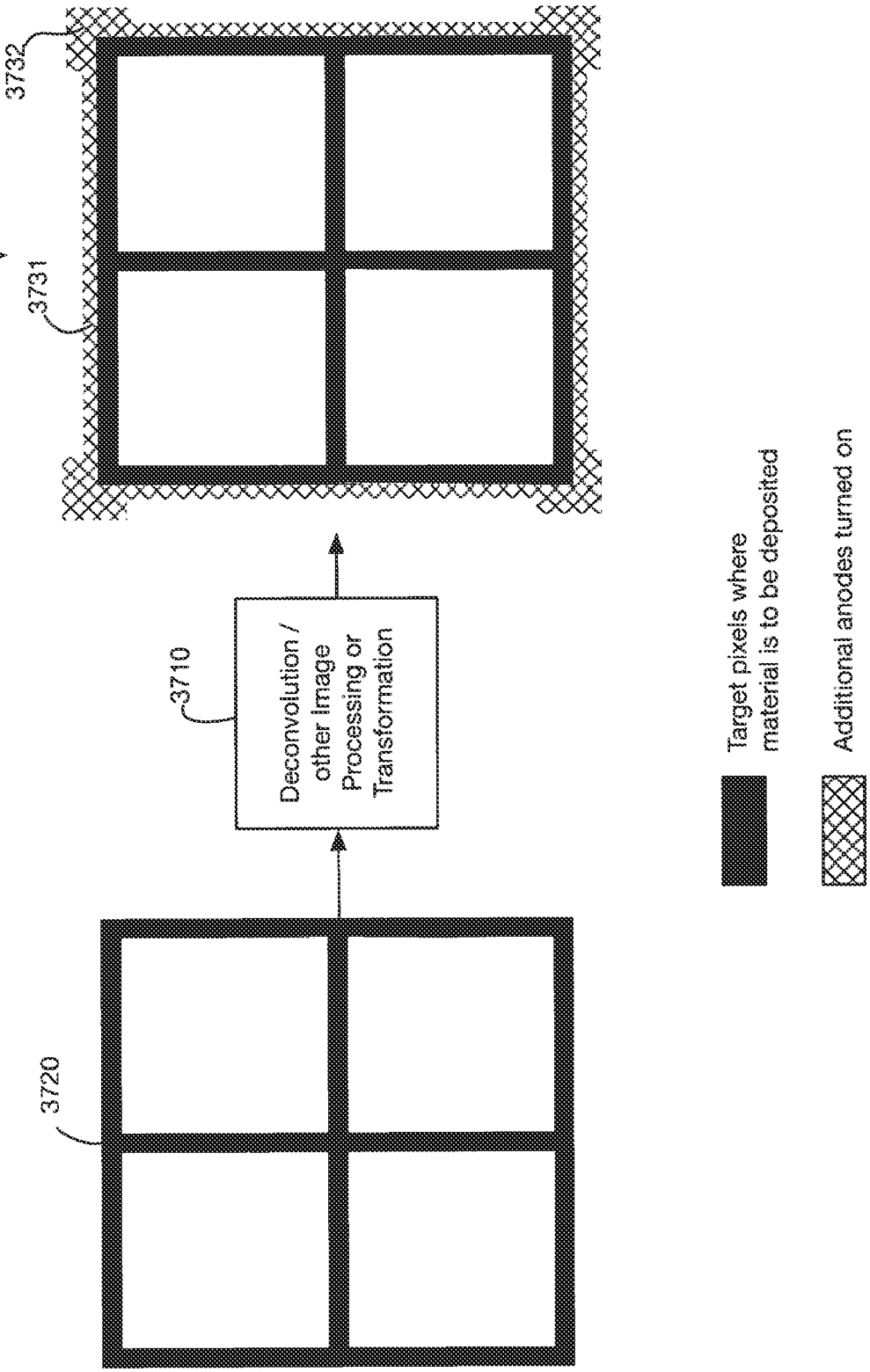

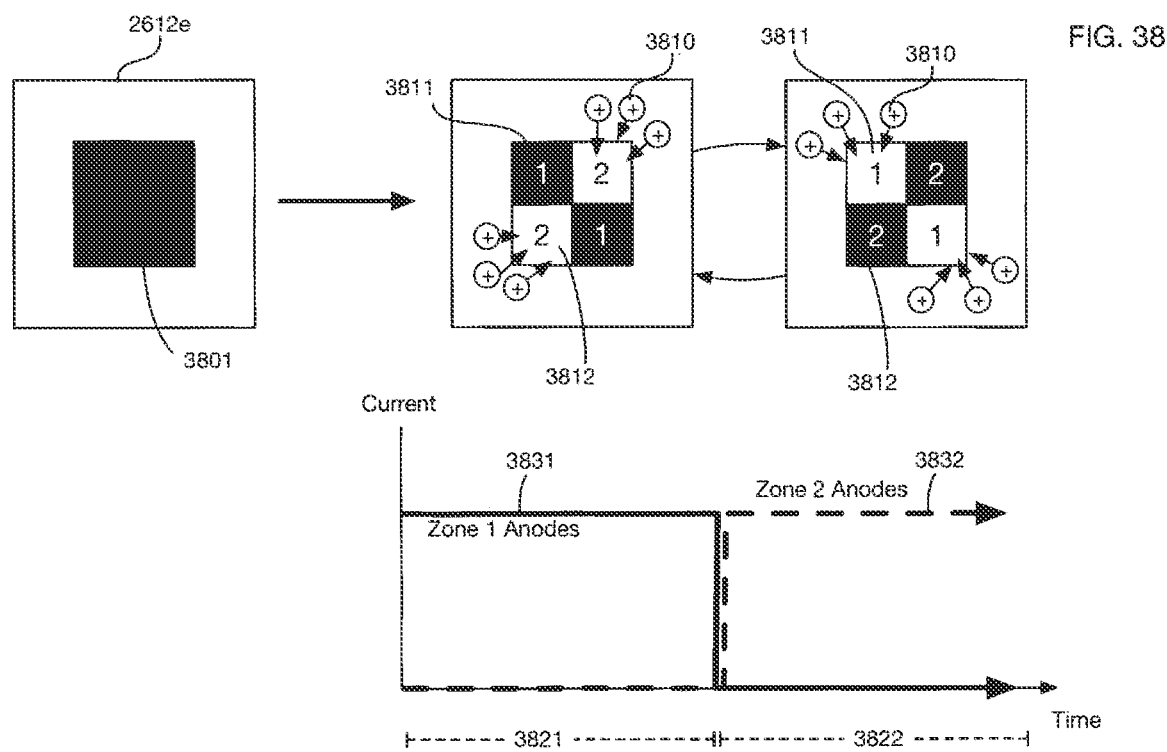

MATRIX-CONTROLLED PRINTHEAD FOR AN ELECTROCHEMICAL ADDITIVE MANUFACTURING SYSTEM

BACKGROUND OF THE INVENTION

One or more embodiments of the invention are related to the fields of electronics and 3D printing. More particularly, but not by way of limitation, one or more embodiments of the invention enable a matrix-controlled printhead for an electrochemical additive manufacturing system. One or more embodiments of the invention enable a method for manufacturing a printhead of an electrochemical additive manufacturing system. One or more embodiments of the invention enable a method of electrochemical additive manufacturing using deposition feedback control.

Additive manufacturing, also known as 3D Printing, is often used for the production of complex structural and functional parts via a layer-by-layer process, directly from CAD (computer aided drafting) models. Additive manufacturing processes are considered additive because materials are selectively deposited on a substrate to construct the product. Additive manufacturing processes are also typically layered meaning that layers of the product to be produced are fabricated sequentially.

Currently, widespread use of metal additive manufacturing techniques is limited due to the high cost associated with selective laser melting (SLM) and electron beam melting (EBM) systems. Further, most metal additive manufacturing devices currently in the industry use powdered metals which are thermally fused together to produce a part, but due to most metals' high thermal conductivity this approach leaves a rough surface finish because unmelted metal powder is often sintered to the outer edges of the finished product.

An emerging alternative for additive metal manufacturing is to use electrochemical reactions. In an electrochemical manufacturing process, a metal part is constructed by plating charged metal ions onto a surface in an electrolyte solution. This technique relies on placing a deposition anode physically close to a substrate in the presence of a deposition solution (the electrolyte), and energizing the anode causing charge to flow through the anode. This creates an electrochemical reduction reaction to occur at the substrate near the anode and deposition of material on the substrate. An illustrative apparatus that enables additive manufacturing via electroplating is described for example in U.S. Pat. No. 10,465,307, "Apparatus for Electrochemical Additive Manufacturing," by the inventors of the instant application. This apparatus demonstrated a novel approach to electrochemical additive manufacturing that uses a printhead with an array of anodes to build portions of each layer of a part in parallel, instead of moving a single anode across a part to sequentially construct portions of the layer.

BRIEF SUMMARY OF THE INVENTION

To address the shortcomings in the art, the inventors of embodiments of the invention have discovered that enormous improvements in part resolution may be achieved by adapting aspects of 2D display driver technology to electrochemical manufacturing which is unknown in the art. 2D displays such as large LCD screens have some similar issues to anode arrays, as display manufacturers have been continually increasing display pixel count and reducing pixel sizes. To achieve these improvements, 2D display drivers have typically used matrix-controlled backplanes (either passive matrix or active matrix), which use a grid of row and column control traces rather than separate control traces running to each pixel. The inventors have adapted matrix control to anode arrays to achieve the desired increases in array resolution and reductions in anode size. The matrix architecture greatly reduces the number of signal connections to the anode control circuits. For instance, in a 512×480 electrode array, direct control of each anode would require 245,760 traces, whereas matrix control via row and column traces requires only 992 traces.

Although the inventors have adapted a matrix control architecture for anode arrays, existing designs for matrix-controlled 2D display drivers are not suitable for anode arrays, since the design objectives for display screens and electrochemical anode arrays are radically different. Major differences include: (1) display drivers control pixels, while the 3D printhead driver control anodes; (2) display driver backplanes are designed to occupy minimum space in each pixel so that the majority of the pixel area may be transparent (e.g., for LCDs) or light-emitting (e.g., for OLEDs), while anode arrays should occupy a large fraction of the grid space to drive the electrochemical reactions; (3) anode arrays must be exposed to an electrolyte solution, while pixel arrays are protected and generally not exposed to anything but air; (4) display drivers are designed to consume the least amount of energy possible, while anode arrays are specifically designed to deliver the maximum amount of current through the anodes. To address these differences, the inventors have developed novel matrix-controlled 3D printhead embodiments optimized for electrochemical reactions, rather than for pixel displays. In particular, embodiments of the printhead are optimized for high current density, which directly affects the rate at which a part can be built by electroplating.

One or more embodiments are related to a matrix-controlled printhead for an electrochemical additive manufacturing system. The printhead may be used for example as part of an additive 3D manufacturing system that constructs metal parts using electroplating. The printhead may contain elements that drive the electroplating reaction, such as anodes that are placed into an electrolyte, and control circuits that control the amount of current flowing through each anode to generate the desired shape of the constructed part. The printhead may support high density of the anode array to generate high quality parts with very fine details.

In one or more embodiments, the printhead may have a deposition grid that is partitioned into grid regions along x-axis and y-axis directions. The grid may be characterized by its grid x resolution (number of grid regions along the x-axis direction), grid y resolution (number of grid regions along the y-axis direction), grid x pitch (length of a grid region along the x-axis direction), grid y pitch (length of a grid region along the y-axis direction), overall grid pitch (minimum of grid x and grid y pitches), and grid region area. In one or more embodiments, the grid x and y resolutions may be 100 and in other embodiments 200 or more or 400 or more. In one or more embodiments, the grid x and y pitches may be 100 microns or less and in other embodiments may be 50 microns or less.

The printhead may include components such as a grid control circuit, a power distribution circuit, and an array of deposition elements aligned with the deposition grid. The grid control circuit may be organized for example as a matrix of an array of row traces and an array of column traces, with a row driver circuit electrically connected to each row trace, and a column driver circuit electrically connected to each column trace. Each deposition element may correspond to a unique grid region of the deposition grid; it may have a deposition anode and a deposition control circuit.

The deposition anode may be made for example of an insoluble conductive material. Illustrative insoluble conductive materials may include for example, without limitation, platinum group metals and their associated oxides, doped semiconducting materials, and carbon based conductors. The deposition anode may have an exposed surface that is configured to be placed in contact with an electrolyte. There may be a conductive path through the deposition anode to the exposed surface. The deposition anodes may for example be one or more layers of the insoluble conductive material added on top of the layer or layers of the deposition control circuits.

Each deposition control circuit may be connected to the corresponding deposition anode, to a row trace, to a column trace, and to the power distribution circuit. The deposition control circuit controls the conductivity or the amount of current flowing through the conductive path of the associated deposition anode. When this current flows through the deposition anode, it may flow to the exposed surface of the anode. When the exposed surface of the anode is in contact with the electrolyte, the current may cause an electrochemical deposition reaction on the cathode that builds the desired part. There may be one or more insulating layers between the deposition control circuit and the electrolyte, for example to protect the deposition control circuit.

In one or more embodiments, the deposition control circuit, the power distribution circuit, and the deposition anode may be configured to supply a relatively high current density, defined for example as the amount of current flowing through a deposition anode divided by the grid region area. For example, when the deposition control circuit sets the current flow through the deposition anode to the maximum level, the current density in one or more embodiments may be 125 mA per square centimeter or more; in one or more embodiments the current density may be 250 mA, 500 mA, 750 mA, 1000 mA per square centimeter or more.

In one or more embodiments, the length of the conductive path through a deposition anode may be 10% or more of the grid pitch. This relatively long conductive path may for example extend the usable life of the anode.

In one or more embodiments, the power distribution circuit may be a lattice of conductive power traces aligned with the deposition grid. These power traces may be connected at points where they cross one another. The width of these power traces in one or more embodiments may be 10% or more of the grid pitch. The power distribution circuit may have a layer of copper for example that is at least one micron thick. In one or more embodiments the power distribution circuit may be a solid plane of conductive material, or a plane of conductive material that is nearly solid (for example with some holes for mounting or routing). The power distribution circuit may have power supply connections on two or more sides.

In one or more embodiments, a deposition anode may have one or more sections that extend horizontally (along a horizontal axis parallel to the deposition grid) and that are covered by one or more insulating layers. The horizontal length of each section may be 10% or more of the grid pitch. In one or more embodiments these sections may have two or more layers at different vertical depths (along an axis perpendicular to the deposition grid). The exposed surface of the deposition anode may be offset horizontally along the horizontal axis from the point where the anode connects to the deposition control circuit. This horizontal offset may be 10% or more of the grid pitch.

One or more embodiments may have two (or more) layers of deposition anode, each horizontally offset from the previous layer. For example, a deposition anode may have a first layer that includes a connection between the anode and the deposition control circuit, and a horizontal section that extends away from this connection. It may then have a second layer that includes a via connecting the second layer to the first layer, with a second horizontal section that extends away from this via toward the exposed surface of the anode. The exposed surface may be offset horizontally from the via, and the via may be horizontally offset from the connection to the deposition control circuit.

In one or more embodiments, the area of the exposed surface of a deposition anode may be 15% or more of the grid region area.

In one or more embodiments, a deposition control circuit may have a first switching element controlled by the row trace, and a second switching element controlled by the column trace when the first switching element is active. The second switching element may control the amount of current flowing through the conductive path of the deposition anode. The switching elements may be for example thin film transistors. They may be made for example of low-temperature polycrystalline silicon. In one or more embodiments they may be made of indium gallium zinc oxide.

In one or more embodiments a deposition control circuit may also have a storage capacitor that is charged when the first switching element is active and when the associated column trace is energized. The storage capacitor may maintain the state of the second switch element after the first switching element is deactivated.

In one or more embodiments, the printhead may be configured to connect to a processor that sets the signals on the row traces and column traces via the row driver circuit and column driver circuit of the printhead. The processor may receive layer slice information describing desired deposition of material onto the cathode, and may set row and column trace signals based on this layer slice information to control the amount of current flowing through the conductive path of each deposition anode. In one or more embodiments the processor may also control a positioning actuator that controls the distance between the array of deposition elements and the cathode. In one or more embodiments the processor may receive data from one or more sensors to determine when the desired deposition of material onto the cathode by each deposition element is complete for a layer; illustrative sensors may include for example a current sensor, a voltage sensor, a force sensor, a pressure sensor, and a timer.

One or more embodiments of the invention may include a process for manufacturing a printhead for a 3D manufacturing system that uses metal electrodeposition to construct parts. The printhead may be constructed by depositing layers on top of a backplane that contains control and power circuits. Deposited layers may include insulating layers and an anode layer that contain deposition anodes that are in contact with the electrolyte to drive electrodeposition. Insulating layers may for example be constructed of silicon nitride or silicon dioxide; the anode layer may contain an insoluble conductive material such as platinum group metals and their associated oxides, highly doped semiconducting materials, and carbon based conductors. The anode layer may be deposited using chemical vapor deposition or physical vapor deposition. Alternatively in one or more embodiments the printhead may be constructed by manufacturing a separate anode plane component, and then bonding the anode plane to the backplane.

One or more embodiments of the invention may enable a process for manufacturing a printhead of an electrochemical additive manufacturing system. Manufacturing the printhead may include coupling one or more layers to a backplane, such as one or more insulating layers and one or more anode layers; these layers may be coupled to the backplane for example by depositing them onto the backplane, or by manufacturing one or more separate components that are then bonded to the backplane. The backplane may contain an array of deposition control circuits aligned with a deposition grid. It may also have a grid control circuit, which may include an array of row traces coupled to a row driver circuit, and an array of column traces coupled to a column driver circuit. It may also have a power distribution circuit. Each deposition control circuit may be coupled electrically to the power distribution circuit and to an associated row trace and column trace. The coupling of the insulating and anode layers to the backplane may result in each anode of the anode layer being coupled electrically to at least one corresponding deposition control circuit through an opening in one or more of the insulating layers.

In one or more embodiments, the manufacturing process may deposit layers onto the backplane to form the completed printhead. These layers may include for example a first insulating layer, an anode layer on top of the first insulating layer, and a second insulating layer on top of the first insulating layer and the anode layer. The first insulating layer may cover portions of the backplane but may leave uncovered a contact pad associated with each deposition control circuit. The anode layer may include an array of deposition anodes made of an insoluble conductive material, each coupled electrically to a corresponding contact pad of at least one corresponding deposition control circuit. The second insulating layer may cover portions of the anode layer except for an exposed surface of each deposition anode, which is configured to contact an electrolyte.

In one or more embodiments, the first insulating layer may have an average thickness of at least 100 nanometers, the anode layer may have an average thickness of at least 50 nanometers, and the second insulating layer may have an average thickness of at least 100 nanometers. In one or more embodiments, the first insulating layer may have an average thickness of at least 800 nanometers, the anode layer may have an average thickness of at least 800 nanometers, and the second insulating layer may have an average thickness of at least 1500 nanometers. In one or more embodiments, the first insulating layer may have an average thickness of at least 800 nanometers, the anode layer may have an average thickness of at least 1600 nanometers, and the second insulating layer may have an average thickness of at least 2000 nanometers.

In one or more embodiments, the insoluble conductive material of the deposition anodes may include one or more of platinum group metals and their associated oxides, highly doped semiconducting materials, and carbon based conductors; one or both of the insulating layers may include one or both of silicon nitride and silicon dioxide.

In one or more embodiments, any or all of the layers may be deposited onto the backplane using one or more of chemical vapor deposition and physical vapor deposition.

An illustrative process for depositing the anode layer that may be used in one or more embodiments may include depositing a seed material, applying a mask over portions of the seed material that correspond to the desired pattern of the deposition anode array, removing the seed material that is not covered by the mask, removing the mask, and depositing the insoluble conductive material on the remaining seed material using chemical vapor deposition. The insoluble conductive material may include for example boron doped diamond.

Another illustrative process for depositing the anode layer that may be used in one or more embodiments may include depositing the insoluble conductive material using chemical vapor deposition, applying a mask over portions of the conductive material that correspond to the desired pattern of the deposition anode array, removing conductive material that is not covered by the mask, and removing the mask. The insoluble conductive material may include for example boron doped diamond.

Another illustrative process for depositing the anode layer that may be used in one or more embodiments may include applying a photoresist layer on top of the first insulating layer, removing the photoresist in regions corresponding to the desired pattern of the deposition anode array, depositing the insoluble conductive material on top of the first insulating layer and the photoresist using physical vapor deposition, and removing the photoresist and the insoluble conductive material on top of the photoresist. The insoluble conductive material may for example include one or more of platinum group metals and their associated oxides.

Another illustrative process for depositing the anode layer that may be used in one or more embodiments may include depositing the insoluble conductive material using physical vapor deposition, applying a mask over portions of the conductive material corresponding to the desired pattern of the deposition anode array, removing the insoluble conductive material not covered by the mask, and removing the mask. Removal of the insoluble conductive material not covered by the mask may for example include etching, which may include wet etching or dry etching.

In one or more embodiments, a printhead may be manufactured by obtaining a backplane (such as the backplane described above), manufacturing a separate anode plane, and then bonding the anode plane to the backplane. The anode plane may be manufactured by obtaining a substrate, creating an array of vias between the top side and bottom side of the substrate, filling the vias with electrically conductive via material, depositing an anode layer onto the top side of the substrate so that each deposition anode is coupled electrically to at least one corresponding via, depositing an insulating layer on top of the anode layer and leaving an exposed surface of each deposition anode to contact an electrolyte, and depositing an array of bonding bumps on the bottom side of the substrate that are each coupled electrically to a corresponding via. The anode layer may be deposited onto the substrate using for example chemical vapor deposition or physical vapor deposition. In one or more embodiments, bonding of the anode plane to the backplane may be done using one or more of eutectic bonding, thermocompression bonding, or controlled collapse solder bonding, or by joining the two using an anisotropic conductive adhesive.

Additive manufacturing processes known in the art typically add material in pre-programmed patterns. For example, material may be emitted from a printhead for a preprogrammed period of time at a preprogrammed rate to construct a layer of a part. In electrochemical manufacturing, the rate and pattern of material deposition depends on many dynamic factors, such as the distance between the printhead and each location of the part, the local density of metal ions in the electrolyte, and electrolyte flow patterns. As a result, it is difficult or impossible to achieve high quality parts using strictly preprogrammed ("open loop") control. However, feedback control methods for electrochemical additive manufacturing processes are not well-developed.

One or more embodiments of the invention may include a method of additive manufacturing that deposits material onto a cathode by transmitting current from an anode array through an electrolyte to the cathode; the method uses feedback to control the manufacturing of successive layers of a part. For example, feedback signals may be a map of current across the anode array; this current map may be processed using morphological analysis or Boolean operations to determine the extent of deposition across the layer. Feedback data may be used to determine when a layer is complete, and to adjust process parameters such as currents and voltages during layer construction. Layer descriptions may be preprocessed to generate maps of desired anode current, to manipulate material density, and to manage features such as overhangs. Feedback signals may also trigger execution of maintenance actions during the build, such as replenishment of anodes or removal of films or bubbles.

One or more embodiments described in the specification are related to an electrochemical additive manufacturing method using deposition feedback control. An object to be manufactured may be constructed by placing a cathode and an anode array into an electrolyte solution. Deposition anodes of the anode array may provide current that flows from the anode to the cathode through the electrolyte solution, resulting in deposition of the material onto the cathode. The manufacturing process may use a build plan with a layer description for multiple layers of the object; each layer description may include a target map, which describes the presence or absence of material at locations within the layer, and one or more process parameters that affect the layer build. Manufacturing of a layer may begin by setting or confirming the position of the cathode relative to the anode array. Then control signals may be sent to the anode array based on the layer description. One or more feedback signals may be measured across the anode array, and these signals may be analyzed to generate a deposition analysis that indicates the extent to which deposition has progressed at locations within the layer. The deposition analysis may be used to determine whether the layer is complete, and to modify the process parameters associated with the layer. When a layer is complete, manufacturing may continue for a subsequent layer.

In one or more embodiments, the layer description of one or more layers may be modified before manufacturing the layers. For example, layer densities may be changed.

Analysis of feedback signals may apply one or more transformations to these signals, such as morphological filters or Boolean operators.

Feedback signals may for example include a map of current across the anode array. The deposition analysis may be generated by applying a thresholding operation to this current map.

Determining whether a layer is complete may for example include comparing the number of actual deposited pixels to the number of desired deposited pixels within the layer. In one or more embodiments, a layer may be complete when the ratio of actual to desired deposited pixels reaches or exceeds a threshold value. In one or more embodiments, a layer may be complete when a desired fraction of the desired deposited pixels are within a threshold distance from an actual deposited pixel. In one or more embodiments, the layer may be divided into components, and completion tests may be applied to each component; a layer may be considered complete when all components are complete. For example, a component may be complete when the ratio of actual to desired deposited pixels within the component reaches or exceeds a threshold value, or when a desired fraction of the desired deposited pixels within the component are within a threshold distance from an actual deposited pixel.

In one or more embodiments, a layer description may include identification of whether a layer has an overhang. Manufacturing of a layer with an overhang may include successively depositing portions of the overhang so that they extend laterally from one or more previously deposited portions.

In one or more embodiments, a layer target map may be divided into regions, and construction of the layer may include alternately activating deposition anodes associated with each region.

In one or more embodiments, manufacturing of a layer may include calculating a map of desired current output from each deposition anode, so that this current output will generate deposition corresponding to the layer's target map. This current map calculation may involve applying one or more transformations to the layer target map.

In one or more embodiments, modification of process parameters associated with a layer may include calculation of voltage, current, or time of activation for one or more deposition anodes.

In one or more embodiments, setting or confirming the position of the cathode relative to the anode may include obtaining sensor signals that vary based on this relative position, such as a current value or a voltage value.

In one or more embodiments, manufacturing of a layer may include one or more maintenance actions that maintain the condition of the anode array or the electrolyte solution. For example, these maintenance actions may replace material onto one or more deposition anodes that have eroded. Maintenance actions may activate one or more deposition anodes to remove a film that has formed. Maintenance actions may include removal of bubbles from the electrolyte solution.

BRIEF DESCRIPTION OF THE DRAWINGS

The above and other aspects, features and advantages of the invention will be more apparent from the following more particular description thereof, presented in conjunction with the following drawings wherein:

FIGS. 4A and 4B show two approaches that may be used in one or more embodiments to construct the 3D printhead: in FIG. 4A, a layer of deposition anodes is constructed above a grid of deposition control circuits; in FIG. 4B, the deposition anodes are integrated into the grid of deposition control circuits.

FIG. 5 shows an illustrative set of layers for the approach described in FIG. 4A; anode and insulation layers are constructed above the deposition control circuits layer.

FIG. 6 shows a different embodiment of deposition anodes that uses a deep vertical layer of deposition anodes to increase deposition anode lifetime.

FIG. 8 shows a conceptual view of an individual anode element of the embodiment of FIG. 7 in operation during electroplating, showing that the insulating layer or layers protect the deposition control circuit from the electrolyte solution, and that the horizontal offset of the deposition anode creates a longer conductive path between the electrolyte and the deposition control circuit.

FIG. 9 shows a potential benefit of the horizontally offset deposition anodes illustrated in FIGS. 7 and 8: as anode material erodes, the anode can remain operational for a longer period of time.

FIG. 11B shows successive addition of layers using the mask of FIG. 11A.

FIG. 14 shows an embodiment in which the deposition control circuit layers and the deposition anode and insulator layers are manufactured as separate units, and are then joined using a conductive adhesive.

FIG. 16B shows a timing diagram for the control of current flow through the anode of FIG. 16A.

FIG. 17 shows the overall process; FIG. 18 shows the process to construct a single layer; and FIG. 19 shows the process to measure layer deposition and adjust the build process accordingly.

FIG. 33 shows an illustrative map of current sensor feedback signals, and processing of these signals to form a map of deposition areas within a layer.

FIG. 35 illustrates update of anode outputs based on the current sensor feedback signals of FIG. 33.

FIG. 37B shows an illustrative two-dimensional example of calculating a pattern of anode currents to obtain a desired deposition pattern.

FIG. 38 shows an illustrative embodiment that alternates anode output across different regions.

DETAILED DESCRIPTION OF THE INVENTION

While effective in low resolution, the apparatus described in the '307 patent did not address certain challenges encountered in scaling electrochemical additive manufacturing to parts of very small feature size, with sufficient throughput to enable efficient part construction. Specifically, achieving smaller features requires a 3D printhead with smaller anodes packed more densely into the anode array of the printhead. The complexity of the control circuits and of the manufacturing process to create such anode arrays is prohibitive with existing approaches to printhead design. In particular, the apparatus described in the '307 patent relied on direct control over each electrode element, i.e. if an array consisted of an 8×8 grid of electrodes the controller would use 64 signal traces between the controller and the array. While this approach works for small electrode grids, routing and controlling individual control traces for each anode in a large, densely packed anode array may not scale to anode arrays of hundreds of thousands or millions of anodes.

For at least the limitations described above the inventors of the instant invention have realized that there is a need for a matrix-controlled printhead for an electrochemical additive manufacturing system. There is also a need for a manufacturing process for constructing such a printhead.

A matrix-controlled printhead for an electrochemical additive manufacturing system, and a manufacturing process to create such a printhead, will now be described. The printhead may be used for example in an apparatus that 3D prints metal parts using electrodeposition. The printhead may contain a dense 2D grid of anodes that provide a high density of current through an electrolyte to facilitate rapid 3D printing of metals in high resolution. In the following exemplary description, numerous specific details are set forth in order to provide a more thorough understanding of embodiments of the invention. It will be apparent, however, to an artisan of ordinary skill that embodiments of the invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
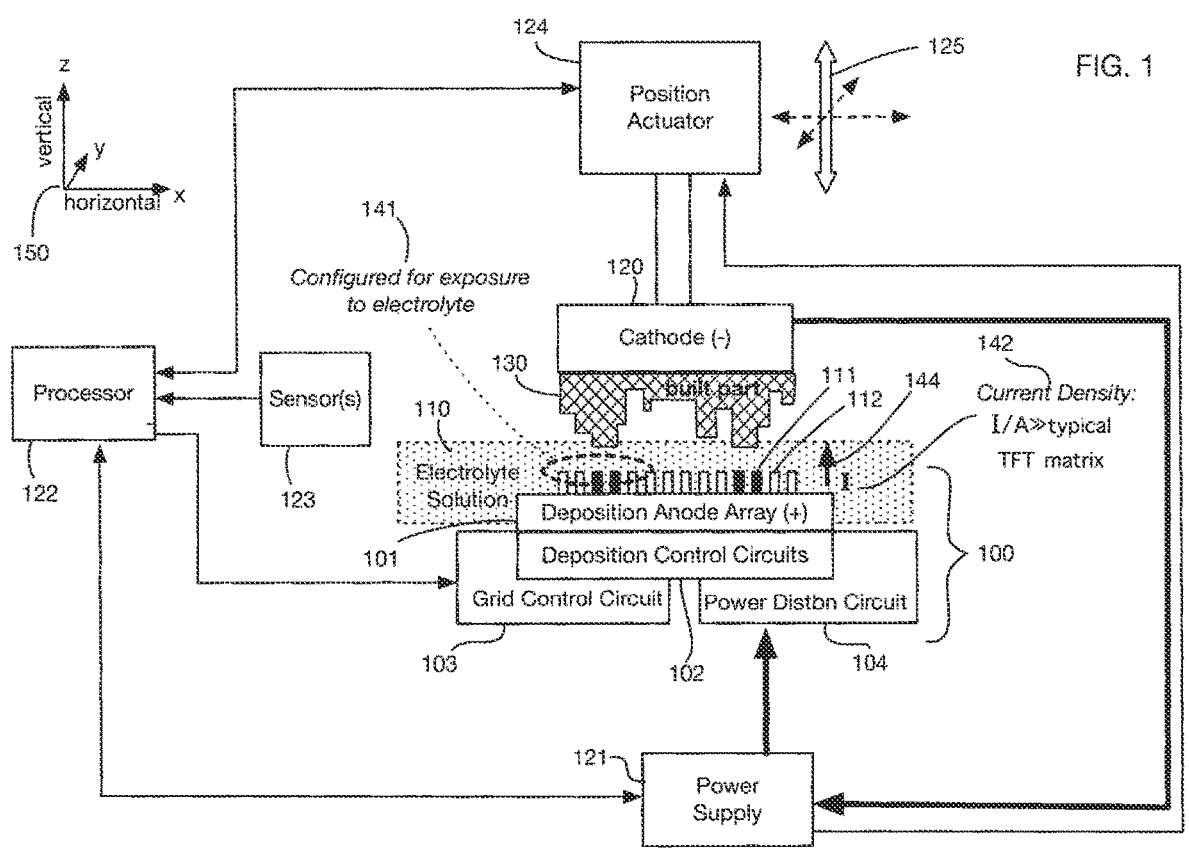
FIG. 1 shows a block diagram of an embodiment of an electrochemical additive manufacturing system with a matrix-controlled 3D printhead containing an anode array.

FIG. 1 shows an architectural diagram of a printhead 100 integrated into an illustrative electrochemical additive manufacturing system. The components and interconnections of the system are illustrative; a printhead as described in this application may be used in any type of system, including but not limited to a 3D printing system as shown in FIG. 1. Printhead 100 contains an array 101 of deposition anodes, and a corresponding array 102 of deposition control circuits for the deposition anodes. As described below, the deposition control circuits 102 may be organized in a matrix arrangement, thereby supporting high resolution anode arrays. The deposition anode array 101 may be organized in a two-dimensional grid, as shown in the figures below; FIG. 1 shows a cross sectional view. A grid control circuit 103 transmits control signals to the deposition control circuits 102 to control the amount of current flowing through each deposition anode in anode array 101. Current flowing through the anodes is provided by a power distribution circuit 104 that routes power from one or more power supplies 121 to the deposition control circuits and then to the anodes. Printhead 100 may also contain other elements such as insulation layers, as described below.

The deposition anode array 101 of printhead 100 may be placed in an electrolyte solution 110. Electrochemical reactions may then cause plating of metal onto a manufactured part 130 that is coupled to cathode 120. Intricate and detailed shapes may be built in part 130 by modifying the current flowing through each anode of deposition anode array 101. For example, in the snapshot shown in FIG. 1, anode 111 is energized, so that metal is being deposited onto part 130 near this anode, but anode 112 is not energized so no metal is being deposited near that anode.

In one or more embodiments, printhead 100 may be integrated with a processor 122. This processor may transmit signals to grid control circuit 103, which sends signals to the individual deposition control circuits 102 to turn anodes in deposition anode array 101 on or off (or to modify the intensity of current flow through each anode). Processor 122 may be for example, without limitation, a microcontroller, a microprocessor, a GPU, a FPGA, a SoC, a single-board computer, a laptop, a notebook, a desktop computer, a server, or a network or combination of any of these devices. Processor 122 may communicate with one or more sensors 123 that may be used to measure the progress of metal deposition on part 130. Sensors 123 may include for example, without limitation, current sensors, voltage sensors, timers, cameras, rangefinders, scales, force sensors, or pressure sensors. Either or both of cathode 120 and printhead 100 may be attached to one or more position actuators 124, which may control the relative position of the cathode and the deposition anode array. Position actuator 124 may control vertical movement 125, so that the cathode may be raised (or alternatively the anode lowered) as the part 130 is built in successive layers. In one or more embodiments position actuator 124 may also move the cathode or deposition anode array horizontally relative to one another, for example so that large parts may be manufactured in tiles.

Printhead 100 may be connected to a power supply (or multiple power supplies) 121, which supplies current 144 that flows through the deposition anode array to drive metal deposition on part 130. Current may be distributed throughout the array of deposition control circuits via power distribution circuit 104, which may for example include one or more power busses. The speed at which part 130 is built depends largely on the amount of current 144 that flows from the deposition anode array 101. To support efficient, rapid manufacturing of metal parts, one or more embodiments of printhead 100 may be configured to provide a very high current density 142, defined for example as the maximum amount of current 144 per area that can flow through a portion of deposition anode array 101, when that portion of the array is supplying maximum current. The high current density supported by one or more embodiments of the invention represents a significant advance over known devices. In particular, existing matrix-controlled anodes (such as those found in thin film transistor backplanes for displays) typically have current densities that are orders of magnitude lower than the current density provided by one or more embodiments of the invention.

In addition to the high current density 142 supported by printhead 100, the deposition anode array 101 is configured for exposure 141 to electrolyte solution 110. This feature of printhead 100 also represents a significant advance over known devices. Existing matrix-controlled arrays, such as those in display drivers, would not function and would be quickly destroyed in an electrolyte solution. The control circuits of those arrays might short-circuit, and even if parts were protected from short circuits, exposed parts might rapidly erode and decay when exposed to the electrolyte. Printhead 100 may be configured for robust operation in the environment of the electrolyte during an electrochemical reaction.

In one or more embodiments, the system may also include a fluid chamber to contain the electrolyte solution (not shown in FIG. 1), and a fluid handling system (also not shown). The fluid system may include for example a tank, a particulate filter, chemically resistant tubing and a pump. Analytical equipment may enable continuous characterization of bath pH, temperature, and ion concentration using methods such as conductivity, High Performance Liquid Chromatography, mass spectrometry, Cyclic Voltammetry Stripping, spectrophotometer measurements, or the like. Bath conditions may be maintained with a heater and/or an automated replenishment system to replace solution lost to evaporation and/or ions of deposited material.

Although the system shown in FIG. 1 has a single array of deposition anodes, one or more embodiments may incorporate multiple deposition anode arrays. These multiple anode arrays may for example operate simultaneously in different chambers filled with electrolyte solution, or they may be tiled in a manner where the anode arrays work together to deposit material on a shared cathode or series of cathodes.

Reference frame 150 in FIG. 1 shows axes that are used in subsequent figures to indicate the orientation from which the parts of printhead 100 are viewed. The vertical z-axis of frame 150 is the direction along which current generally flows from deposition anode array 101 to cathode 120. Deposition anode array 101 may be organized as a horizontal grid along the x and y axes, as described below.

Figure 2:
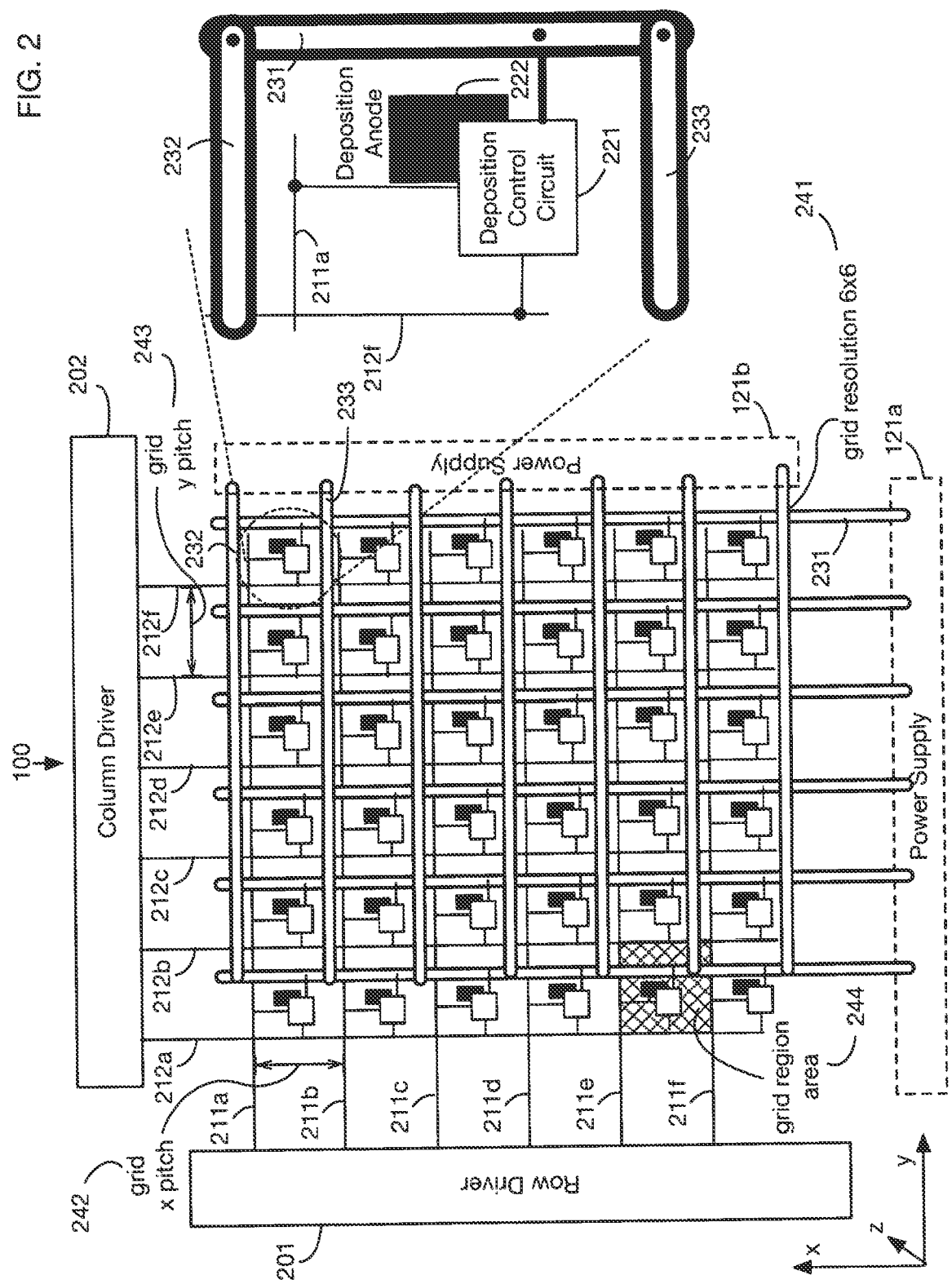
FIG. 2 shows a conceptual circuit diagram of a small 6×6 grid of anode control circuits that control a corresponding array of deposition anodes.

FIG. 2 shows a diagram of selected elements of an illustrative matrix-controlled printhead 100. For ease of exposition, a very small printhead of resolution 6×6 is shown, and a closeup view is shown of the deposition element in the upper right corner. In applications, embodiments of the printhead may contain thousands or millions of deposition elements. Deposition elements of the printhead may be aligned with a two-dimensional grid. The grid may be partitioned along two axes (labeled as the x-axis and y-axis in FIG. 2) into grid regions. Associated with each grid region may be a deposition element that may include a deposition anode and a deposition control circuit. Grids may be of any size, resolution, and shape. Grid regions may be uniform, or they may vary across the grid. Density of deposition elements may vary across the grid in one or more embodiments. Deposition elements may be aligned with the grid at any points and in any directions or orientations.

The grid on which deposition elements are aligned has a resolution 241, which indicates the number of grid regions along the x axis (x resolution) and along the y axis (y resolution). In one or more embodiments, grids may not be regularly spaced throughout the grid, and resolution may vary across grid regions. For a regular grid such as that shown in FIG. 2, each grid region has an associated grid x pitch 242 (the length of a grid region along the x axis), an associated grid y pitch 243 (the length of a grid region along the y axis), and an associated grid region area 244. For a rectangular grid region, the grid region area 244 may be for example the product of the x-pitch 242 and the y-pitch 243. In one or more embodiments, grid regions need not be rectangular, the grid dimensions may be for example maximum or average diameters along different axes, and the grid region area may be defined as the area occupied by a grid region of any shape. A grid pitch may also be associated with the grid; the pitch may be for example the minimum of the grid x pitch and the grid y pitch. In this description and in other descriptions in this application, the dimensions x and y and the definitions of row and column may be swapped by the designer.

The matrix-controlled architecture of the printhead allows the grid to scale to very large sizes. Grid sizes may be for example at least 400×400 in one or more embodiments. Individual grid regions may have x pitch and y pitch of 50 microns or less in one or more embodiments.

The printhead 100 of FIG. 2 is matrix-controlled by a grid control circuit that contains an array of row traces 211a through 211f and an array of column traces 212a through 212f. Each deposition control circuit is connected to one associated row trace and to one associated column trace. For example, illustrative deposition control circuit 221 is connected to row trace 211a and to column trace 212f. This deposition control circuit 221 controls the flow of current to the associated deposition anode 222. The current flow through the anode is controlled by signals on the associated row trace and column trace, as described below. Deposition control circuit 221 provides functionality to control conductivity or turn the associated deposition anode 222 on or off or to modify the amount of current flowing through anode 222. The circuit 221 may be in a conducting state, when current flows through deposition anode 222, or in a non-conducting state, when current does not flow through deposition anode 222. (A small amount of leakage current may flow even in the non-conducting state.) In one or more embodiments the deposition control circuit may provide control of the amount of current that flows through the deposition anode, rather than just binary on/off control.

Row traces 211a through 211f are connected to row driver 201, and column traces 212a through 212f are connected to column driver 202. The row and column drivers set the signals on the row and column traces, respectively, to control the entire set of deposition control circuits in the printhead. The matrix control provided by the row and column grid structure of the printhead simplifies wiring, since individual control traces need not be routed to every individual deposition control circuit. This simplification allows the printhead to scale up to large size arrays with very small grid regions, enabling manufacturing of large parts with very small feature size. The repeating pattern of the grid may also simplify manufacturing and scaling of the printhead.

Row traces and the column traces may be both driven by gate row driver integrated circuits (ICs) and column driver ICs. These gate and source driver ICs may be for example Serial In Parallel Out (SIPO) shift registers whose inputs are digital control signals that control each of the row and column drivers' outputs. In certain configurations these drive IC's may be discrete components that are bonded to the deposition element array, but in others this drive circuitry may be embedded into the edges of the electrode array itself. In some embodiments, the row and/or column drivers may be high voltage drivers, which may increase the amount of power flowing through the deposition element array thereby maximizing the rate at which parts may be built.

In one or more embodiments, the row driver IC and the column driver IC may be installed with their outputs driving in an open-ended configuration into the array, with the row traces being perpendicular to the column traces, thus driving the active area from two sides only. In other embodiments, the device may have additional column driver ICs and row driver IC's with some configurations having row driver ICs on two sides and column driver ICs on two sides. Such configurations may be used to increase the amount of power supplied (or increase power uniformity) into a given row or column trace, as a given trace may be driven by the outputs of two drive ICs rather than one. In this configuration, active area driving may be provided on all four sides of the active area. One or more embodiments may have double ended supply of either the row or column traces while remaining single ended on the other (either row or column) supply traces.

It is also possible to utilize techniques such as supplying the gate and column traces from multiple sides, with a given row or column trace not being connected all the way through the active area, thus allowing row or column drive ICs installed on opposite sides of the active area to be independently driving the active area rather than having sets of drive ICs concurrently driving the same traces. In this way, subsets of drive ICs may independently address different regions of the active area which may provide benefits such as faster addressing of the array. In some embodiments, every other row or column may be driven from opposite sides, for example.

Row driver ICs and column driver ICs may be selected and configured such that their output drive voltages are capable of addressing the switch elements in the deposition element array, relative to the main process (power supply) voltage. For embodiments that use for example N-Type Field Effect Transistors (FETs) as switching elements, the voltage supplied to the gate should exceed a threshold voltage which is defined as the input voltage of the transistor drain contact plus an additional voltage value which is defined by the semiconductor material and other transistor parameters. This threshold voltage is often up to 3V. In an example where the process voltage is 5V, the gate voltage should be greater than the process voltage plus the threshold voltage, in this case at least 8V to cause the FET to allow charge to flow. Additionally, the addressing switching element should now be given sufficient voltage at its gate to enable this 8V voltage to flow through to the gate of the main switching element. In this example, the voltage supplied to the gate of the addressing switch element could also have a threshold voltage of 3V, requiring its gate voltage to be 11V or greater to allow charge to flow.

In the embodiment shown in FIG. 2, the grid for the printhead deposition elements coincides with the grid defined by the row traces and the column traces. In one or more embodiments, the grid of deposition elements may be aligned in any desired manner relative to row traces and column traces. In one or more embodiments, row traces and column traces need not be evenly spaced or straight, and row and column traces need not be perpendicular.

Printhead 100 has a power distribution circuit that contains a lattice of power traces, which are electrically connected to power supplies 121*a* and 121*b*. One or more embodiments may distribute power throughout the grid using any type of power grid, busses, backplane, or routing circuits. For example, in one or more embodiments instead of the power trace lattice shown in FIG. 2, a power backplane may be used, which may be for example a continuous solid plane of copper parallel to the grid. The power distribution circuit may be connected to one or more power supplies in multiple locations, for example at different edges of the grid; the illustrative embodiment shown in FIG. 2 has connections to power supply 121*a* on the lower edge of the power trace lattice, and separate connections to power supply 121*b* on the right edge of the power trace lattice.

In one or more embodiments, the power lattice may be partitioned into multiple sublattices, each of which may be driven by a separate power supply for example. Power traces may consist for example of vertical and horizontal power busses that are electrically connected at each crossover point. Each deposition control circuit may be connected to the power trace lattice at one or more points. For example, deposition control circuit 221 is connected to vertical power trace 231. The crossbar (horizontal) power traces, such as traces 232 and 233, may assist in distributing power evenly throughout the grid, for example with connections to vertical trace 231 and other vertical traces. Effectively the lattice of interconnected vertical and horizontal power traces may serve as an integrated power bus that routes power efficiently to any or all of the individual deposition control circuits in the grid. This power trace lattice architecture may for example contribute to the high current density achieved by one or more embodiments of the printhead. This architecture represents a significant change from lower current matrix-controlled circuits such as display drivers, where it is undesirable and typically unnecessary to have a high current capacity lattice of power traces.

In one or more embodiments, the width of the power traces may also contribute to high current density of the printhead. For example, in one or more embodiments the power traces may have a width in a substrate plane that is 10% or greater of the grid pitch. The thickness of power traces may also be set to increase current density; for example, in one or more embodiments the power traces may have a thickness (perpendicular to the substrate) of one micron or more. Power traces may also be constructed of a highly conductive material such as copper, molybdenum, aluminum, or the like. In one or more embodiments, power traces may be manufactured as one or several additional metal layers on top of the switching or charge storage elements, underneath the switching or charge storage elements, or using a conductive material as a substrate on top of which to fabricate the device. In one or more embodiments, power traces may also be fabricated in between row traces on a metal layer and/or between column traces on a metal layer. There may be multiple power busses for example, which could allow for measuring current at multiple deposition anodes simultaneously.

Another method that may be used in one or more embodiments to increase the current density is to rearrange the location of the external power supply connections relative to the array. In some embodiments, power supply traces may be externally connected to the device in multiple locations to increase electrical current across the entirety of the device.

The combination of any or all of these factors—a lattice of power traces (or a single power backplane containing a solid conductive plane), power traces with substantial width relative to the grid pitch, power trace layers of substantial thickness, use of highly conductive materials, separate power trace layers, and arrangement of power connections to supply current from multiple locations—may for example contribute to current densities for one or more embodiments of the invention that are orders of magnitude greater than that of traditional matrix-control circuits for applications such as displays. For example, in one or more embodiments the current density of a printhead, defined for example as the potential current output by a deposition anode divided by the grid area, may be 125 milliamps per square centimeter or more, with densities of 1000 milliamps per square centimeter or more in one or more embodiments. In contrast, typical display drivers have current densities of substantially less than 100 milliamps per square centimeter.

Figure 3A:
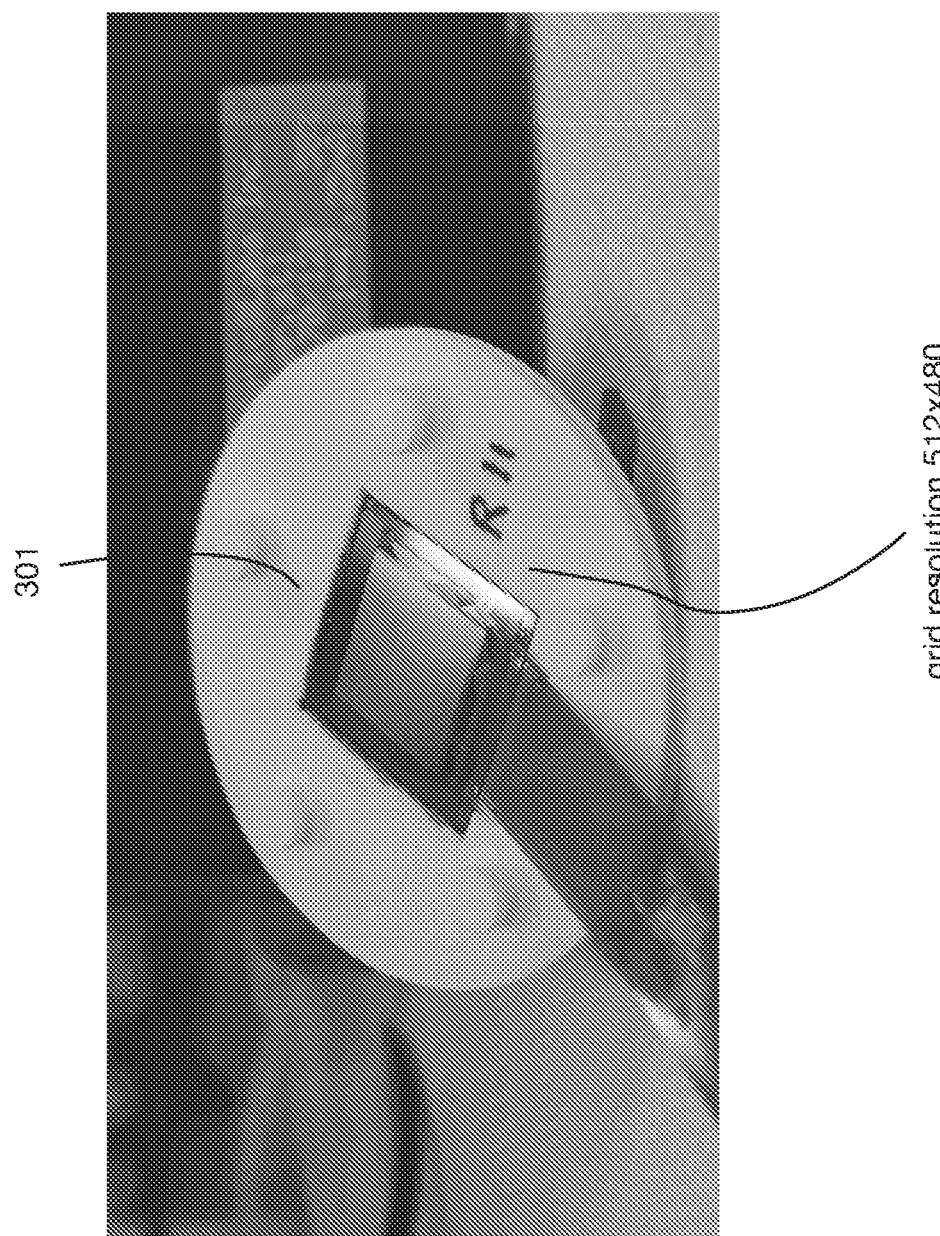
FIG. 3A shows a photograph of an implementation of an embodiment of a matrix-controlled 3D printhead with a resolution of 512×480 and a grid pitch of 50 microns.

FIG. 3A shows a photograph of an illustrative printhead 301. This printhead has a grid resolution of 512×480, and a grid pitch of 50 microns. It is constructed on a rigid glass substrate approximately 0.5 mm thick. At the outer edges of the deposition element array on the glass substrate, the column addressing and row addressing traces may be exposed in a series of contact pads. Along with these, contact pads for various power supply and communications may also be exposed. Row driver ICs and column driver ICs may then be bonded to these exposed contact pads using a suitable adhesive such as an anisotropic electrically conductive adhesive consisting of conductive particles suspended in an epoxy resin. A flexible cable that delivers the various power supplies and data signals to the device from external circuitry may also be assembled to the device using a similar adhesive such as an anisotropic electrically conductive adhesive. The printhead may be integrated into a plastic carrier for further integration with a deposition system.

Figure 3B:
FIG. 3B shows an illustrative metal part created using the printhead of FIG. 3A.

FIG. 3B shows a photograph of a metal part (with a one inch scale indicated) that was manufactured with printhead 301 integrated into an electrochemical additive manufacturing apparatus such as the apparatus shown in FIG. 1.

Figure 4B:
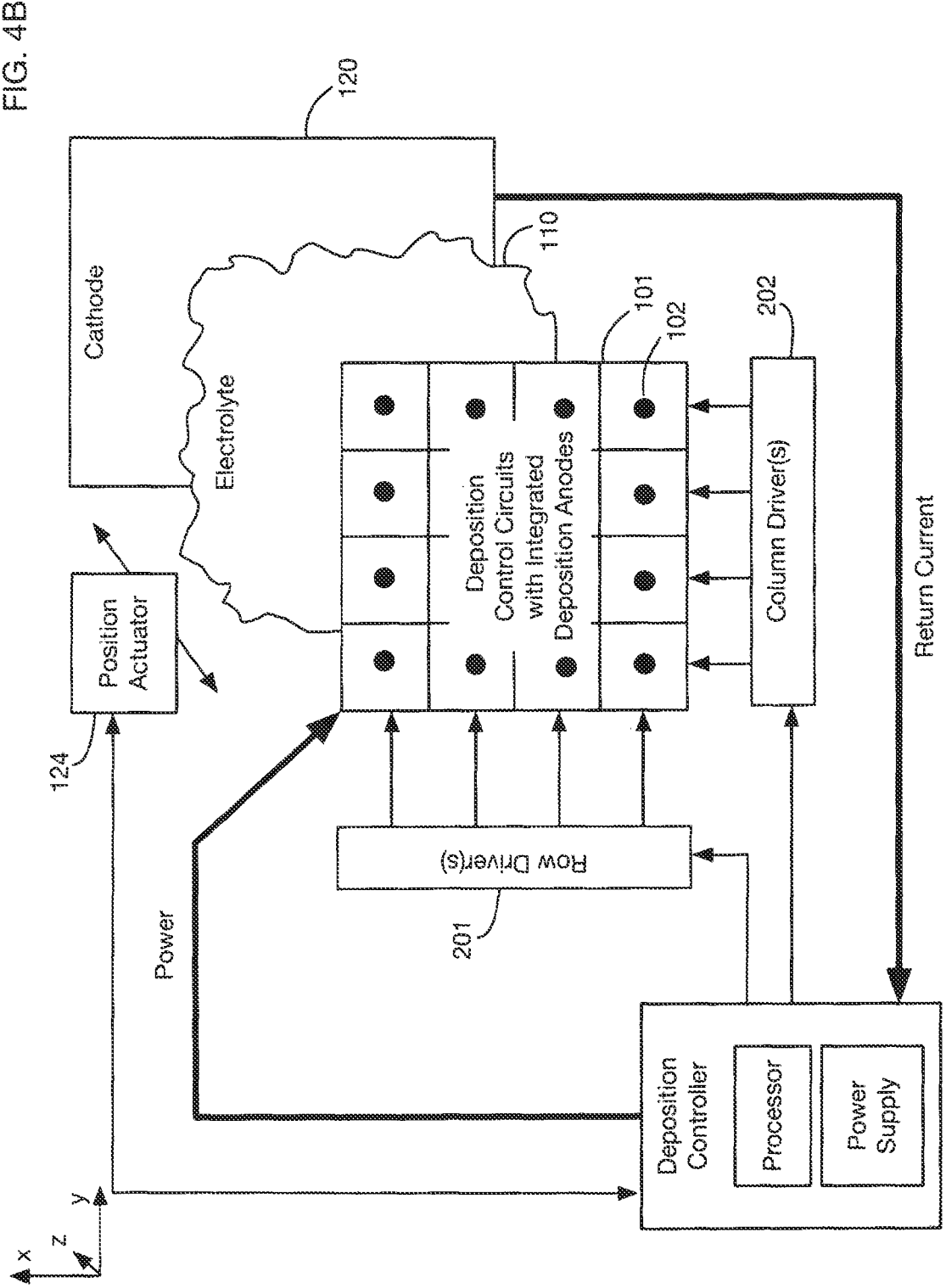

FIGS. 4A through 14 describe various approaches for designing and constructing the circuitry of the printhead that may be used in one or more embodiments. FIGS. 4A and 4B show two different approaches that may be used. In the embodiment shown in FIG. 4A, deposition anodes 101 are configured as a separate layer or layers above (closer to the cathode) a layer or layers of deposition control circuits 102. For example, the deposition control circuits may be fabricated using typical thin film semiconductor manufacturing processes (such as those used to create display backplanes), and the deposition anodes may be separately manufactured on top of the deposition control circuits. Electrical connections between the deposition anodes and the deposition control circuits may be made for example using vias that connect the control circuits to the anodes. Alternatively, the deposition anode layer or layers may be constructed first, and the deposition control circuits may be added below the anode layer or layers afterwards. Regardless of the order of manufacturing steps, in operation the deposition anodes 101 contact the electrolyte 110, but the deposition control circuit layer(s) are isolated (electrically and chemically) from the electrolyte.

In the embodiment shown in FIG. 4B, the deposition anodes 102 are integrated directly into the deposition control circuits 101, and the entire assembly is in contact with electrolyte 110. In this embodiment, deposition control circuits are built such that the power switching transistor elements are constructed of materials that are capable of direct contact with the electrolyte bath. One or more embodiments may use either of these two approaches (or combinations thereof).

FIG. 5 shows an illustrative embodiment of the approach of FIG. 4A with a separate layer of deposition anodes. This figure is shown as a vertical cross section to illustrate the layers. A small section of the total printhead is shown. Legend 501 indicates the materials that may be used in the various layers: a conductive metal material 502 may be used for deposition anodes, an insulating material 503 may be used for one or more insulating layers, and a conductive material 504 may be used for contact pads on deposition control circuits to which the deposition anodes are attached.

The lowest layer or layers contain deposition control circuits 102. Two illustrative control circuits are shown. The first has switching circuit 511a attached to power supply 121; this circuit may be attached also to a row trace and column trace (not shown). Switching circuit 511a is connected to a terminal contact pad 512a. When switching circuit 511a is in a conducting state (as set for example by the associated row and column traces), the conductivity from power supply 121 to contact pad 512a is such that deposition current can flow under the right conditions. Similarly switching circuit 511b is connected to contact pad 512b. Typical embodiments of switching elements may include semiconducting transistor structures fabricated using materials such as doped or undoped Silicon, Amorphous Silicon, Low Temperature Polycrystalline Silicon (LTPS), and metal oxides such as Indium Gallium Zinc Oxide (IGZO).

On top of the deposition control circuit layers one or more layers of anode metal material 502 may be added. The deposition anode layers are electrically coupled to the corresponding contact pads of their associated deposition control circuits. For example, deposition anode 513a is coupled to pad 512a, and deposition anode 513b is coupled to pad 512b. The geometry and materials of the deposition anodes may impact the quality of the resulting deposit as well as the lifetime of the anode array. Deposition anodes may be made of material of various levels of solubility.

During deposition (when current is flowing through a deposition anode), soluble materials erode at a rate significantly higher than an electrode constructed out of insoluble materials. This erosion rate often correlates directly to the usable lifetime of the deposition anode array. Soluble anodes may be constructed of materials such as, without limitation, Brass, Chrome, Copper, Nickel, Gold, Silver, Stainless Steel, Tin, Zinc and the like. Insoluble anodes may be constructed for example, without limitation, of platinum group metals (such as Platinum, Iridium, Tantalum, Ruthenium, Titanium) or their associated oxides, doped diamond, highly doped silicon or other semiconductors, carbon-based materials such as glassy carbon, diamond like carbon, carbon based conductors (such as carbon nanotubes for example) and the like. These materials may be added to the printhead by techniques such as vapor deposition, electrodeposition, thermal decomposition, spin coating, spray coating, blade coating, or other methods typical of similar devices.

One or more insulating layers may be added on top of portions of the deposition control circuits and on top of portions of the deposition anodes. In the embodiment shown in FIG. 5, region 514a of insulation covers a portion of deposition anode 513a, region 514b covers a portion of deposition anodes 513a and 513b and of deposition control circuits, and region 514c covers a portion of deposition anode 513b. Insulating layers may also separate the switching elements from portions of the deposition anode. Since the deposition control circuits may not be configured to be exposed directly to the electrolyte solution, insulating layers may lie between the deposition control circuits and the electrolyte. Insulating layers may incorporate a dielectric material which provides protection from the electrodeposition chemistry and deposition environment. Typical materials used for insulating layers may include for example, without limitation, ceramics such as Silicon Nitride, Silicon Dioxide, Silicon Oxynitride, Aluminum Oxide or organic materials such as polyimide, epoxy, photoresist, parylene, other polymers, or the like. Insulating structures may consist of one or more of these materials or combinations of materials; these layers may be deposited by vapor deposition, spin coating, spray coating, thermal decomposition, blade coating, or other methods typical of similar devices.

Insulating layers may cover a portion of the deposition anodes, leaving an exposed surface for each anode that is in contact with the electrolyte. For example, in FIG. 5, deposition anode 513a has exposed surface 515a, and deposition anode 513b has exposed surface 515b. The non-exposed surfaces of the deposition anodes may be covered by insulator or may be in contact with the contact pads or with other parts of the deposition control circuits.

Even with the use of relatively insoluble conductive materials for deposition anodes, anodes may erode over time as current flows through the anodes to drive the electroplating process. To increase the longevity of a printhead, one or more embodiments may increase the amount of material between the switching elements and the active deposition anode surface. Device lifetime may be approximately correlated to the thickness and/or volume of deposition anode material. More specifically, the lifetime of a deposition anode may be related to the length of the conductive path through the deposition anode, beginning at the interface to the contact pad of the control circuit and ending at the exposed surface of the deposition anode that faces the electrolyte (the distance between the deposition control circuit and the exposed anode surface). Increasing the length of this conductive path may increase the lifetime of the deposition anode, and hence of the entire printhead. One or more embodiments may therefore deliberately lengthen this conductive path to improve longevity. This objective is in marked contrast to typical designs utilized for other purposes (for example for display drivers), where minimizing the length of conductive paths is usually the goal.

In the embodiment shown in FIG. 5, the conductive path for deposition anode 513a is path 516a. This path is the vertical distance between the top of the contact pad 512a and the exposed surface 515a of the anode. The length of this path 516a represents an amount of anode material that may erode before the electrolyte reaches the contact pad, which may render the anode unusable.

In one or more embodiments, the length of the conductive path may be increased, thereby increasing anode lifetime, for example by increasing the thickness of deposited anode material on top of the switching element or by alternating layers of insulating and conductive material wherein the connection between the conductive layers is offset horizontally to increase the distance that erosion would need to travel prior to reaching the switching elements underneath. FIGS. 6 through 13 illustrate various approaches that may be used in one or more embodiments to obtain this increase in deposition anode lifetime.

FIG. 6 shows a variation on the anode layer and insulating layer design of FIG. 5, where the anode and insulation layers are much thicker than in FIG. 5. The conductive paths 602a and 602b of deposition anodes 601a and 601b, respectively, are much longer than the conductive paths 516a and 516b in the anodes of FIG. 5. While a much thicker anode layer (and thicker insulating layer(s)) may be effective at extending anode lifetime, a potential drawback of this approach is manufacturability, since layer deposition technologies are typically optimized for relatively thin layers. In one or more embodiments, a glass substrate may serve as an insulating layer as suggested in FIG. 6. In one or more embodiments the anodes may be extended horizontally instead of vertically, which allows for an increase in the conductive path without requiring very thick layers to be constructed as in FIG. 6.

Figure 7:
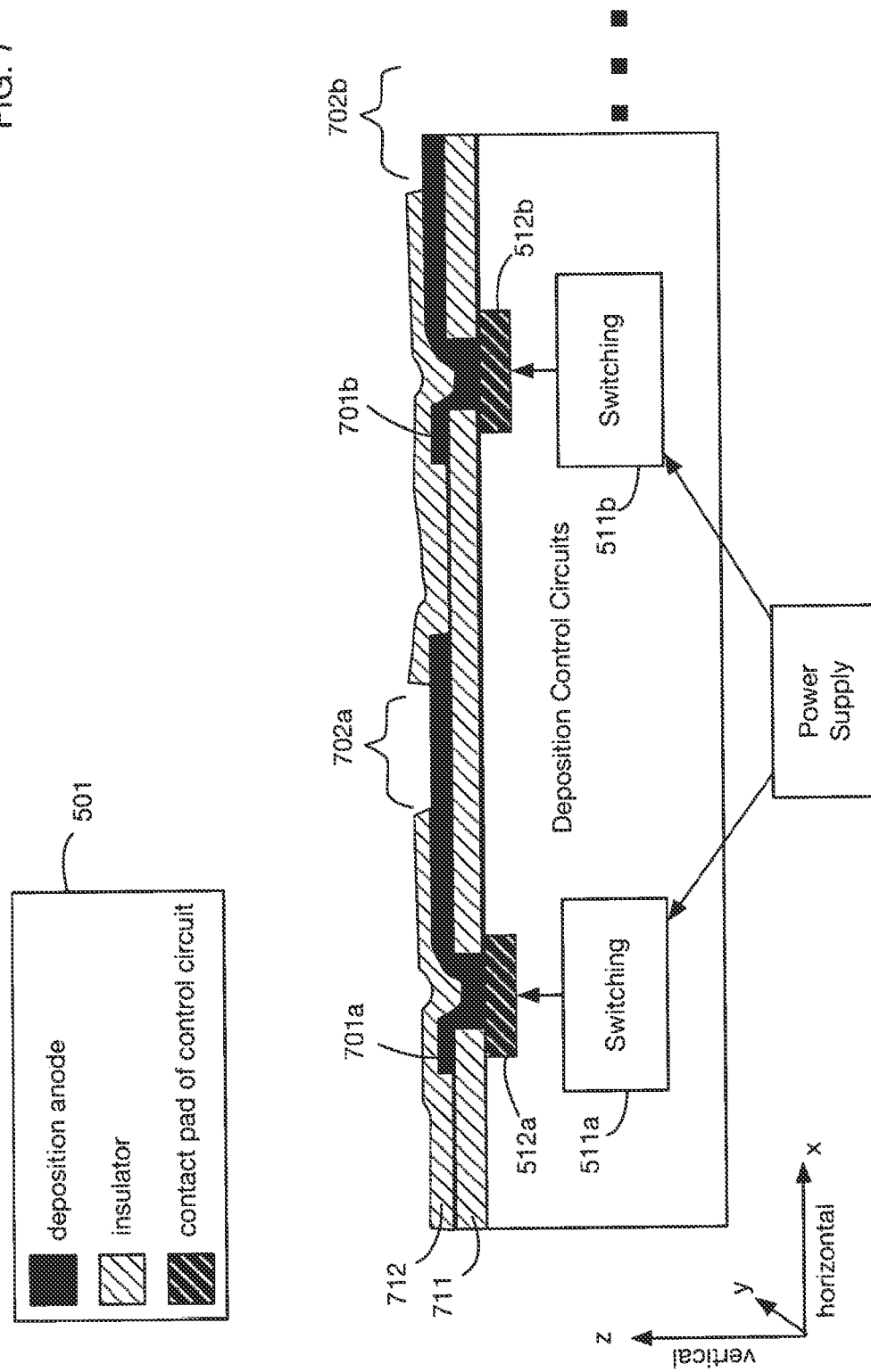
FIG. 7 shows a variation on the design of FIG. 6, where the deposition anodes are offset horizontally from their point of connection with the deposition control circuits.

FIG. 7 shows an illustrative embodiment with horizontally extended anodes. In this embodiment, a first protective insulating layer 711 is placed on top of the deposition control circuits, with vias exposing contact pads 512a and 512b. Insulating layer 711 may include for example one or more layers of chemically vapor deposited Silicon Dioxide and Silicon Nitride that are deposited and patterned to form a protective passivation layer between the switching elements and the anode material. Anodes 701a and 701b may be deposited next, and they may extend horizontally away from the via connections to the contact pads. The anode layer (or layers) may for example include a layer (or layers) of physically vapor deposited Platinum deposited and patterned to form the insoluble deposition anode at each array location. A second layer of insulation 712 (which may be for example more layers of chemically vapor deposited Silicon Nitride and Silicon Dioxide) may then be added on top of portions of anodes and insulating layer(s). The second insulating layer 712 may not completely cover the anodes, since the exposed surfaces must make contact with the electrolyte. In the embodiment of FIG. 7, exposed surfaces 702a and 702b of anodes 701a and 701b, respectively, are offset horizontally (along an axis in the x-y plane) from the point where they connect to the contact pads. This effectively increases the distance erosion needs to travel prior to reaching the switching elements rather than relying on the comparatively thin vertical dimension of the vapor deposited electrode metal.

FIG. 8 shows a simplified view of an anode, for example that of one of the anodes 701a of FIG. 7 in operation during an electrochemical reaction. The conductive path through anode 701a starts in the vertical direction, and then continues horizontally until it reaches the exposed surface 702a of the anode that is contact with the electrolyte. Much of the horizontal portion of conductive path 801 is covered by the insulating layer on top of the non-exposed portion of anode 701a. As charge leaves the surface 702a, some material of the anode may erode from this surface over time.

FIG. 9 shows successive erosion of anode material from the anode 701a at successive points in time 900 through 905. At time 901, anode material has eroded from the top of the exposed surface 702a, but the length of the conductive path 801 has not yet changed. At time 902, anode material has begun to erode underneath the insulating layer, and this continues at time 903. At time 904, anode material begins to erode from the vertical via connecting the anode to the contact pad underneath. At time 905, enough anode material has eroded to expose the contact pad, and the anode quickly becomes unusable. The time required for the progression from stage 901 to stage 905 is roughly proportional to the length of the original conductive path 801. An important factor contributing to longevity is that the horizontal portion of conductive path 801 between the via to the contact pad 512a and the exposed anode surface 702a is covered by insulating material; this ensures that the erosion of this portion of the anode cannot occur until the area under the exposed surface has eroded, and it ensures that erosion proceeds effectively along the conductive path 801 rather than perpendicular to this path.

FIGS. 10A through 11B show a specific anode geometry that may be used in one or more embodiments to implement the horizontal offset approach shown conceptually in FIGS. 7, 8, and 9. A deposition anode 1001 is shown from a top view (FIG. 10A) and from a side view (in vertical cross section) (FIG. 10B), both before a top insulating layer is added (upper) and after a top insulating layer is added (lower). Section 1002 of the anode 1001 extends horizontally away from vertical via 1003 that connects the anode to the contact pad 512a. This section is covered by the top insulating layer, leaving exposed surface 1004. The length 1005 of this horizontal section forms a portion of the conductive path length for the anode.

Figure 10B:
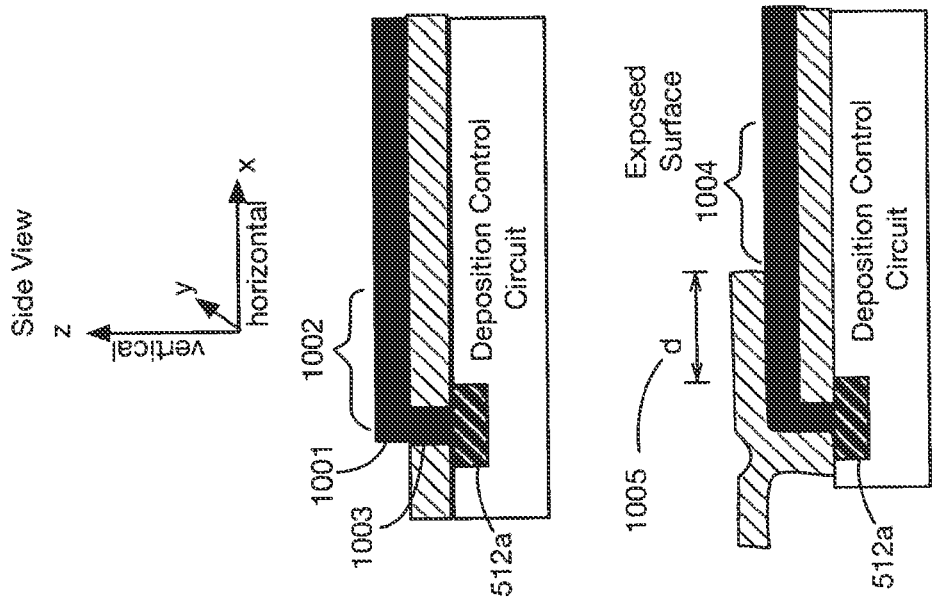
FIGS. 10A and 10B show an illustrative shape of a horizontally offset deposition anode, shown from the top in FIG. 10A and in vertical cross section in FIG. 10B with the other layers of the 3D printhead.
Figure 10A:
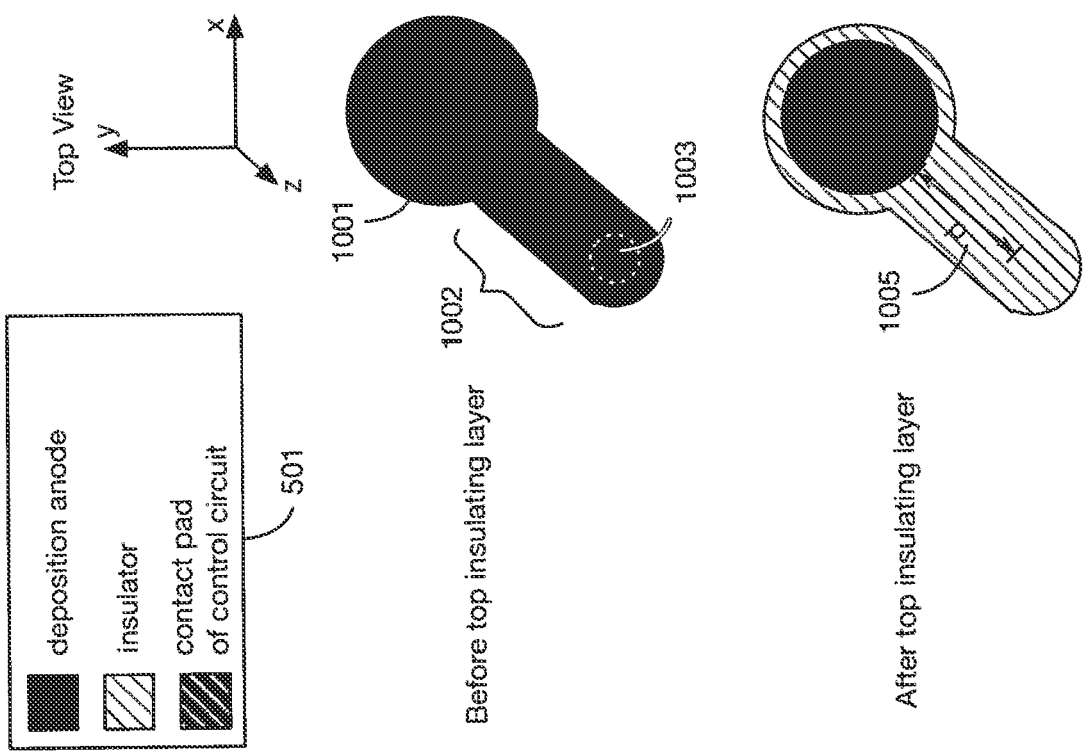
Figure 11A:
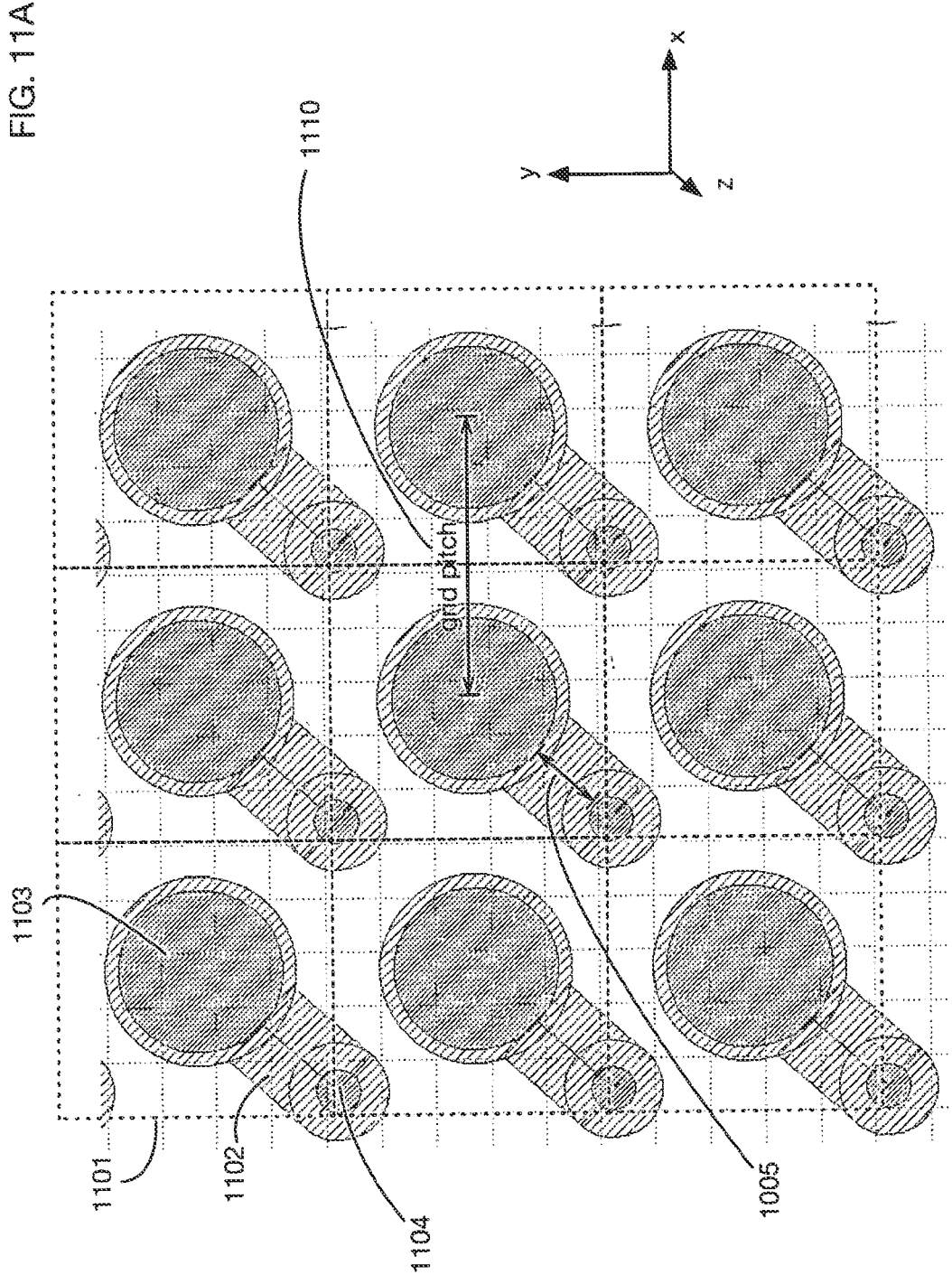
FIG. 11A shows an illustrative mask for deposition anodes, along with vias in insulating layers that allow the deposition anodes to connect below to the deposition control circuits, and above to the electrolyte.

FIGS. 10A and 10B show a single deposition anode of the example shape. FIGS. 11A and 11B show a small portion of a grid of these anodes, illustrating an example of the relative size of the grid pitch and the deposition anode components. FIG. 11A shows masks that may be used for example in the construction of a deposition anode layer and insulation layers on top of a layer (or layers) containing deposition control circuits (and layers that may include for example grid control circuits such as row and column traces, and power distribution circuit traces). The shape of the deposition anodes in the mask corresponds to that of the anode 1001 of FIG. 10A. A grid 1101 is overlaid onto the mask for exposition. The lighter shaded areas 1102 of the anode are covered by the insulating layer(s). The large darker shaded area 1103 is a hole in the upper insulating layer that corresponds to the exposed surface of the deposition anodes. The small darker shaded area 1104 is a hole in the lower insulating layer that exposes the contact pad of the deposition control circuit to the deposition anode. The grid has pitch 1110. The distance 1005 corresponds to the horizontal offset section as described with respect to FIGS. 10A and 10B. In this illustrative example, the horizontal offset distance 1005 is a significant fraction (10% or more) of the grid pitch 1110. One or more embodiments may use a large horizontal offset distance (relative for example to the grid pitch) to increase the length of the anode conductive path, thereby increasing anode longevity.

The size of the exposed surface of the deposition anodes, corresponding to circle 1103 in FIG. 11A, is also large compared to the grid region area. In the embodiment shown, the exposed surface area is more than 15% of the grid region area (which may be for example the square of the grid pitch 1110). This large exposed surface relative to the grid region area provides a potential benefit of increasing anode longevity, since the current that flows from the exposed surface is spread over a larger surface area; the current density at any point on the exposed surface is therefore reduced, thereby reducing the rate of erosion, for example vertical erosion, during deposition reactions.

FIG. 11B illustrates how the masks of FIG. 11A may be used to construct the layers of a complete printhead. A small 2×2 portion of the printhead is shown for ease of exposition. Deposition control circuits 102 are first covered by a lower insulating layer 1121, which has holes corresponding to hole 1104 in FIG. 11A, yielding insulated circuit 1122, which exposes only the contact pads of the deposition control circuits. Deposition anode layer 1123 is then added on top of circuit 1122, yielding circuit 1124, which has fully exposed deposition anodes that are connected to the contact pads underneath. Finally, top insulating layer 1125 is added to cover the horizontal offset portions of the deposition anodes, while leaving the exposed anode surfaces in final printhead 1126.

Figure 12:
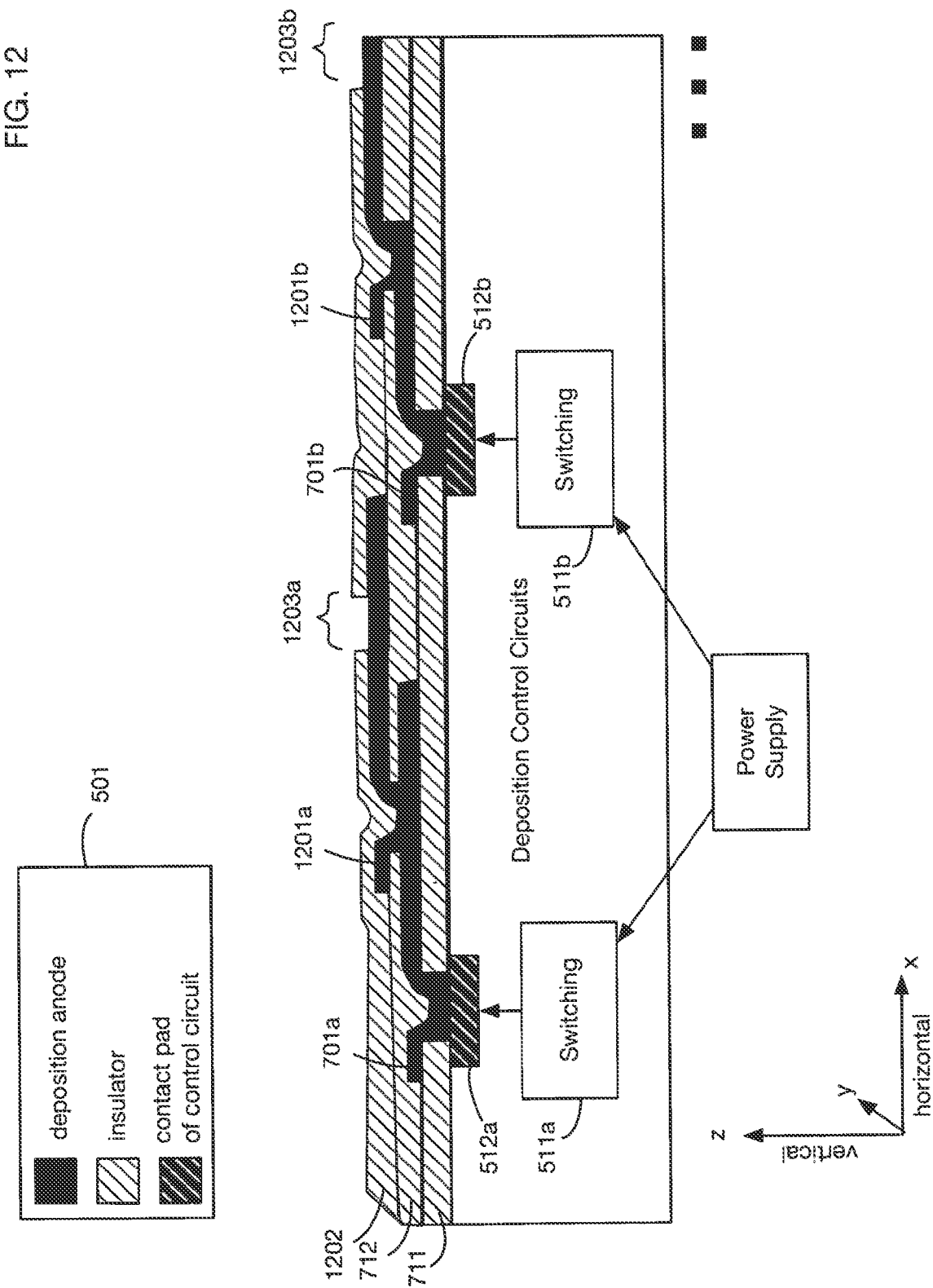
FIG. 12 shows a variation of the horizontally offset anode design of FIG. 7, with two layers of horizontally offset anode material.

In one or more embodiments, the length of the conductive path within a deposition anode may be further extended using multiple deposition anode layers. Each layer may be horizontally offset from the connection to the previous layer of anode or contact pad. FIG. 12 shows an illustrative embodiment that uses two deposition anode layers that are horizontally offset relative to one another. The first three layers of the embodiment of FIG. 12 are similar to those of the embodiment of FIG. 7: a first insulating layer 711 is added on top of the deposition control circuits, leaving conductive pads 512a and 512b exposed; a deposition anode layer is then added, forming metal sections 701a and 701b, and a second insulating layer 712 is added on top of the metal layers, leaving portions of the metal exposed. In this embodiment, a second layer of deposition anode material is then added, attaching sections 1201a and 1201b to sections 701a and 701b, respectively. These top metal layer sections are horizontally offset from the first metal layer sections. A final insulating layer 1202 is then added on top, leaving exposed surfaces 1203a and 1203b for the two deposition anodes shown in the figure. In this embodiment, the exposed areas of each anode are horizontally offset from the vertical vias that connect the top anode layer to the bottom anode layer, and these vias are also horizontally offset from the vertical vias that connect the bottom anode layers to the contact pads of the control circuits. This process of stacking anode layers on top of one another may continue in one or more embodiments, and anodes of any number of layers may be created. Each layer may be horizontally offset from the layer below, thereby lengthening the conductive path with each new layer by the amount of the offset.

Figure 13:
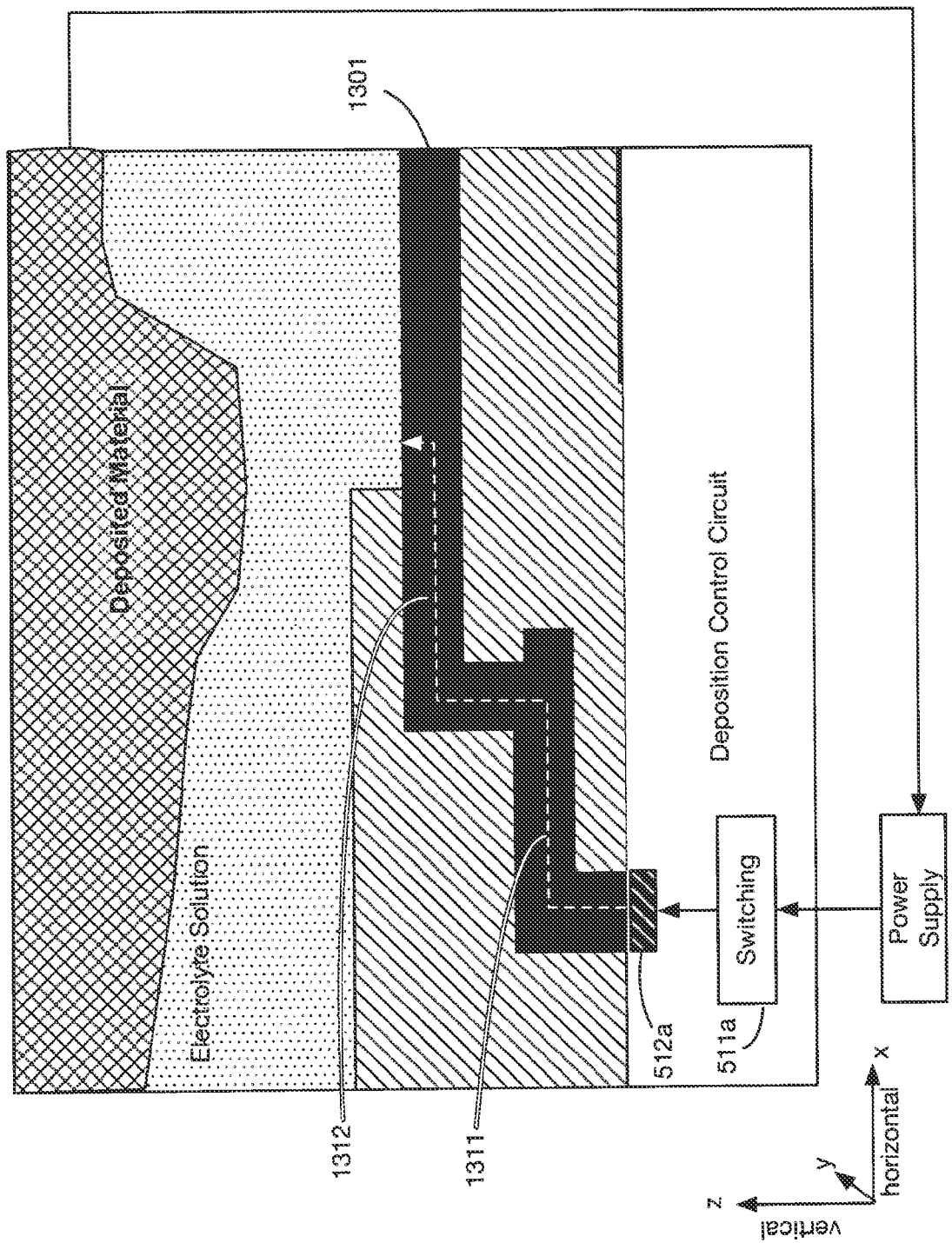
FIG. 13 shows how the two layers of anode material of FIG. 12 increase the length of the conductive path from the deposition control circuit to the exposed surface of the anode.

FIG. 13 shows the conductive path through a two-layer deposition anode 1301 that is similar to the anodes illustrated in FIG. 12. This path includes a first horizontal section 1311 through the first layer of the anode, and a second horizontal section 1312 through the second layer of the anode. Because each of these horizontal sections is covered by one or more insulating layers, the erosion of the anode must proceed roughly along the conductive path of each section before reaching the section below. The lengths of the horizontal offsets of the two anode layers therefore affect the longevity of the anode.

In one or more embodiments, the deposition control circuits and the deposition anode array may be fabricated as separate components that are then joined afterwards into a complete printhead. FIG. 14 shows an illustrative embodiment that uses this approach. Deposition anode array component 1402, which contains for example deposition anodes and insulation, may be fabricated as a separate part using thick film techniques typically used for semiconductor packaging or wafer bonding. Deposition control circuits component 1412 may be fabricated for example using thin film transistor technologies. The two parts may be joined by electrically bonding the locations in the switching array to locations in the electrode array component using processes such as anisotropic conductive adhesive, controlled collapse solder bonding, anodic bonding, or other bonding processes typically used in semiconductor packaging or wafer bonding. In the example shown in FIG. 14, a layer of conductive adhesive 1411 is placed between the assemblies 1402 and 1412 to physically join the assemblies and to electrically couple deposition anode 1404a to contact pad 512a, and to electrically couple deposition anode 1404b to contact pad 512b.

Figure 15A:
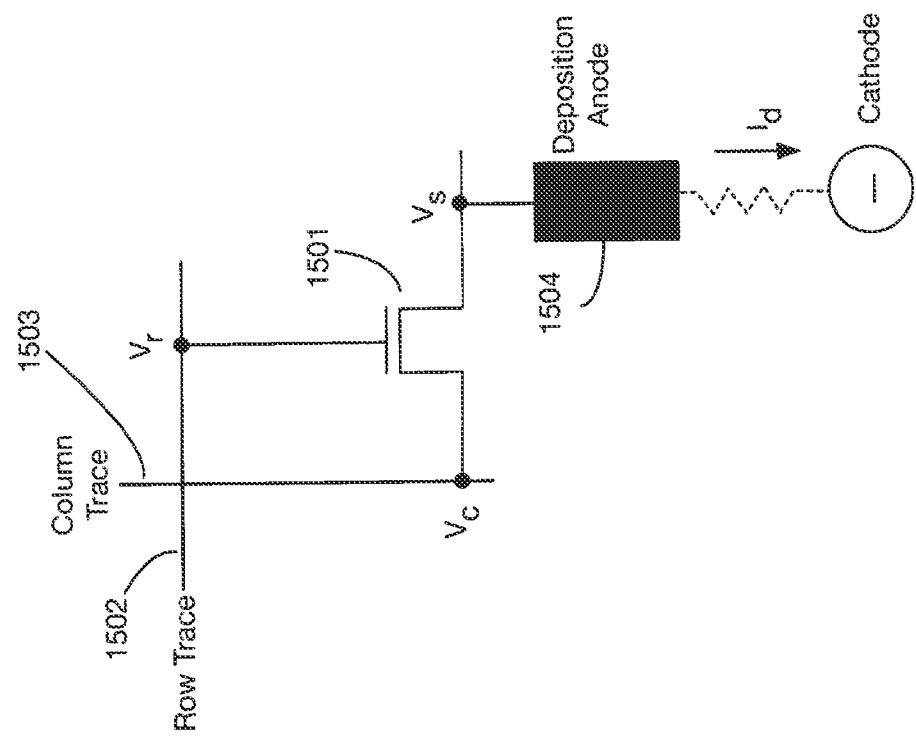
FIG. 15A shows an illustrative passive matrix control circuit for an individual deposition anode.
Figure 15B:
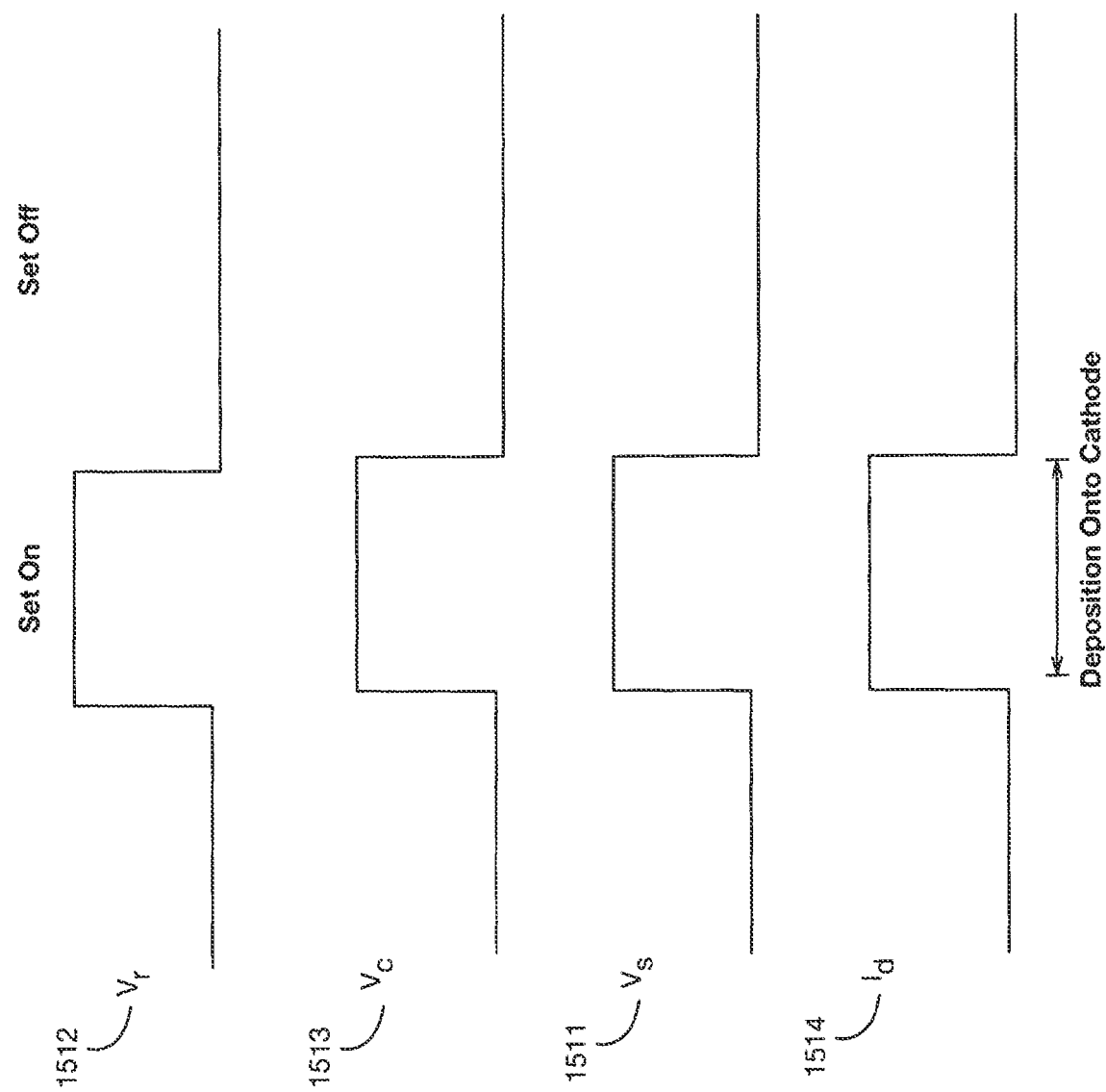
FIG. 15B shows a timing diagram for control of current flow through the anode of FIG. 15A; this diagram illustrates that the duty cycle of an anode in a passive matrix configuration may be limited.
Figure 16A:
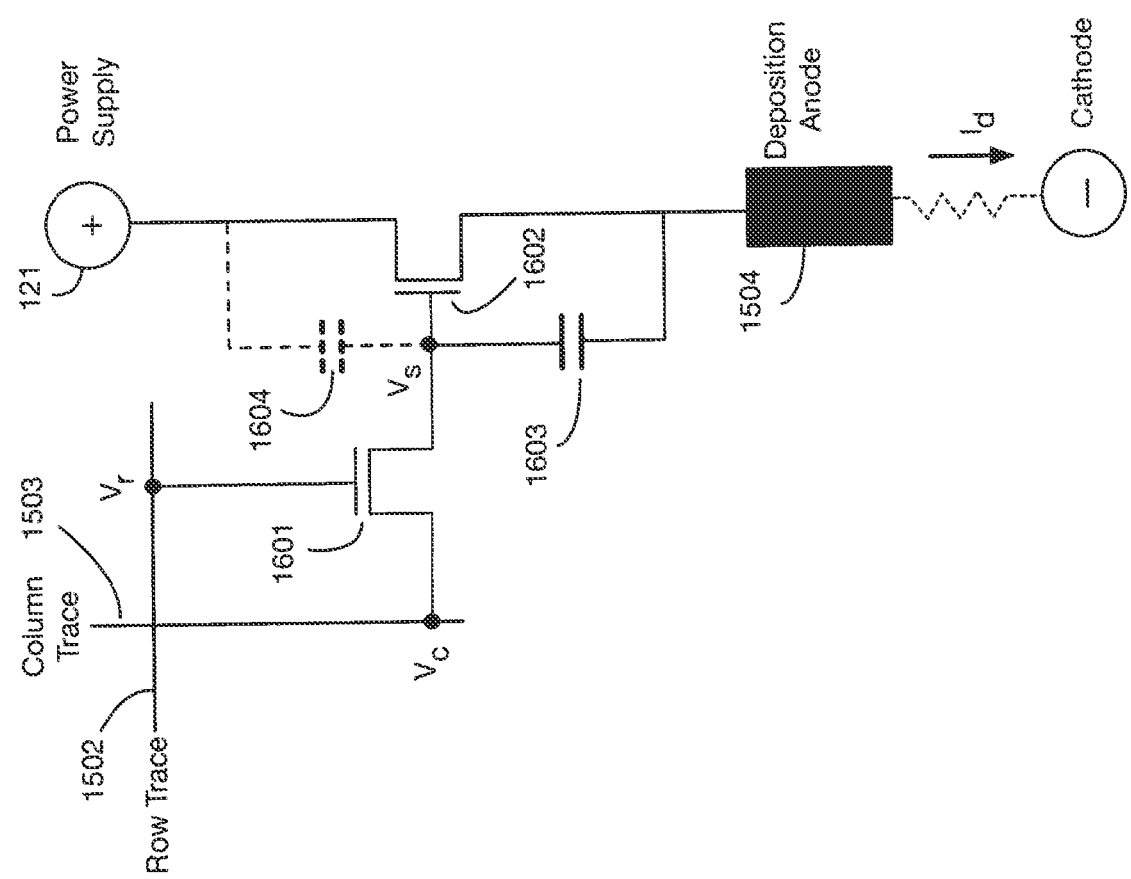
FIG. 16A shows an illustrative active matrix control circuit for an individual deposition anode, which includes a storage capacitor to maintain current flow through the anode.

Using the matrix control of deposition control circuits via row and column traces, two different classes of driving embodiments are generally considered: passive matrix (PM) and active matrix (AM). FIGS. 15A and 15B show illustrative circuits and timing diagrams that may be used for one or more embodiments that use a passive matrix architecture, and FIGS. 16A and 16B show illustrative circuits and timing diagrams that may be used for one or more embodiments that use an active matrix architecture. In the illustrative deposition control circuits shown in FIGS. 15A and 16A, the switching elements of the circuits are shown as transistors. One or more embodiments may use any types of switching elements or other circuit components to implement deposition control circuits. Illustrative transistors that may be used in one or more embodiments include for example, without limitation, N-type field effect transistors (FET) whose semiconducting material is low temperature polysilicon (LTPS). In illustrative embodiments, the LTPS (or other semiconductor) material may be deposited onto a substrate of glass or another substrate material, and doped during subsequent processing steps.

In an illustrative passive matrix architecture as illustrated in FIG. 15A, a single switching element or transistor 1501 may be used which allows charge to flow only when provided an excitation (activation) voltage on both the row trace 1502 and column trace 1503 associated with a particular deposition anode 1504. As noted previously, rows and columns may be interchanged.

A deposition controller may control a passive matrix by activating a single row signal trace (from all of the row traces), and then activating the column traces corresponding to anodes in the row whose deposition is required. The control system may sequentially step through the array row by row to address the entire array. While this architecture is relatively simple and requires as few as one switching element per anode, one drawback is that as the control system scans a row/column trace to address the anodes in one trace, all of the remaining anodes are forced off. In this way, the duty cycle for any one anode may be much less than 100%. This phenomenon is illustrated in FIG. 15B, which shows the deposition current 1514 flowing through deposition anode 1504 as a function of the signal 1512 on row trace 1502, the signal 1513 on column trace 1503, and the output voltage 1511 from transistor 1501 over time. When the row trace 1512 is switched off (deactivated), current 1514 stops; therefore the duty cycle of the anode 1504 is very short as the deposition controller scans successive rows of the passive matrix.

One alternative to passive matrix array multiplexing is active matrix. In this architecture, a charge storage element may be added to deposition control circuits in the deposition element array. The addition of this charge storage element allows the deposition anode location in the array to remain energized while the controller is addressing subsequent anodes during an array addressing scan. An illustrative active matrix element is shown in FIG. 16A. This element includes two switching elements 1601 and 1602, and one charge storage element 1603.

This architecture may be implemented as a "2T-1C" design, which may include for example two transistors (1601 and 1602) as the switch elements and one capacitor (1603) (two example capacitor locations shown in the figure) as the charge storage element. The charge storage element 1603 in each deposition control circuit may be supplied, for example, by the inherent capacitance of the Field Effect Transistor gate oxide.

The circuit shown in FIG. 16A is illustrative; one or more embodiments may employ variations of this design with different numbers and locations of transistors (or other switching elements) and capacitors (or other storage elements). In particular, any of the active matrix circuits used in display driver technology may be used (with appropriate adaptations) as deposition control circuits. A specific variation is shown with an alternate location 1604 for storage capacitor 1603.

In the design shown in FIG. 16A, one of the switching elements, the addressing transistor 1601 (horizontal), still performs the same function as the switching element 1501 used in the passive matrix design of FIG. 15A, allowing charge to flow only when both the row 1502 and column 1503 associated with that location in the array are both addressed (activated, for example held at a high voltage) at the same time. Charge is then allowed to flow into the charge storage capacitor 1603 (or 1604), and into the gate of the primary drive transistor 1602 (vertical). When substantial charge exists on the gate of the primary drive transistor 1602, process current is allowed to flow from power supply 121 through the primary drive transistor and to deposition anode 1504, which cause deposition to occur at the manufactured part attached to the cathode. In one or more embodiments, the primary drive transistor may be used for variable control of the amount of current allowed to flow through the anode. For example, changing the voltage supplied to column trace 1503 may modify the amount of current that flows through transistor 1602 and thus through deposition anode 1504.

Storage capacitor 1603 maintains the signal to the primary transistor 1602, which allows it to continue passing charge from the power supply 121 even when the controller is not actively addressing the array location. This persistence of the anode current is illustrated in FIG. 16B. Row signal 1612 and column signal 1613 are both on at time 1621, which drives up the control voltage 1611 of the primary drive transistor 1602, and charges storage capacitor 1603. Current 1614 then flows through deposition anode 1504. Row and column traces are then set low at time 1622 (for example, for addressing scans of other anode rows in the array), but current 1614 continues to flow (although it declines gradually over time as the storage capacitor discharges).

To control an entire array of deposition control circuits in an active matrix configuration similar to the that shown in FIG. 16A, the system's processor may cycle through rows and columns as follows. The processor may command a row driver to set a single row select trace to high (for example to +12 volts) while the remainder of the row select traces are held low (for example at −5 volts). The processor then commands a column drive IC to set the column traces associated with the deposition anodes to be energized in that row to high (for example to +8 volts), setting the remainder of the column traces to low (for example to 0 volts). The microcontroller then commands the row driver IC to advance the single row set to high to the next row, and commands the column driver IC to energize (or de-energize) the columns associated with deposition anodes to be energized (or de-energized) in that row. This process is repeated until all active rows have been addressed to activate all required deposition anodes in the active area and is then repeated at appropriate intervals to maintain a required level of charge in each deposition control circuit's charge storage element.

In one or more embodiments, the deposition control circuits may control the amount of current flowing through the deposition anodes, in addition to providing on/off switching. For example, in the active matrix circuit of FIG. 16A, the amount of voltage on column trace 1503 may control the conductivity of transistor 1602, providing variable current control on the flow of current from power supply 121 through transistor 1602 and then through deposition anode 1504. Storage capacitor 1603 may store this control voltage to maintain the conductivity of the transistor even when the row and column traces are deactivated.

An active matrix element can be disabled (for example to stop deposition so that measurement of the deposition progress can occur) by removing the power supply to that element. (In one or more embodiments, different power supplies may be used for different areas of the deposition element array.) There are many other ways to accomplish this that may be used in one or more embodiments. For example, FIG. 16B shows at time 1623 that activating a row (bringing the row signal 1612 to a positive voltage) and deactivating a column (bringing the column signal 1613 to a low voltage) will cause the output current 1614 to shut off. This happens because the current flows out of the storage element capacitor 1603 to ground through the horizontal addressing transistor 1601. Once the voltage at the gate of the vertical primary drive transistor 1602 drops, the output current through deposition anode 1504 shuts off.

Figure 17:
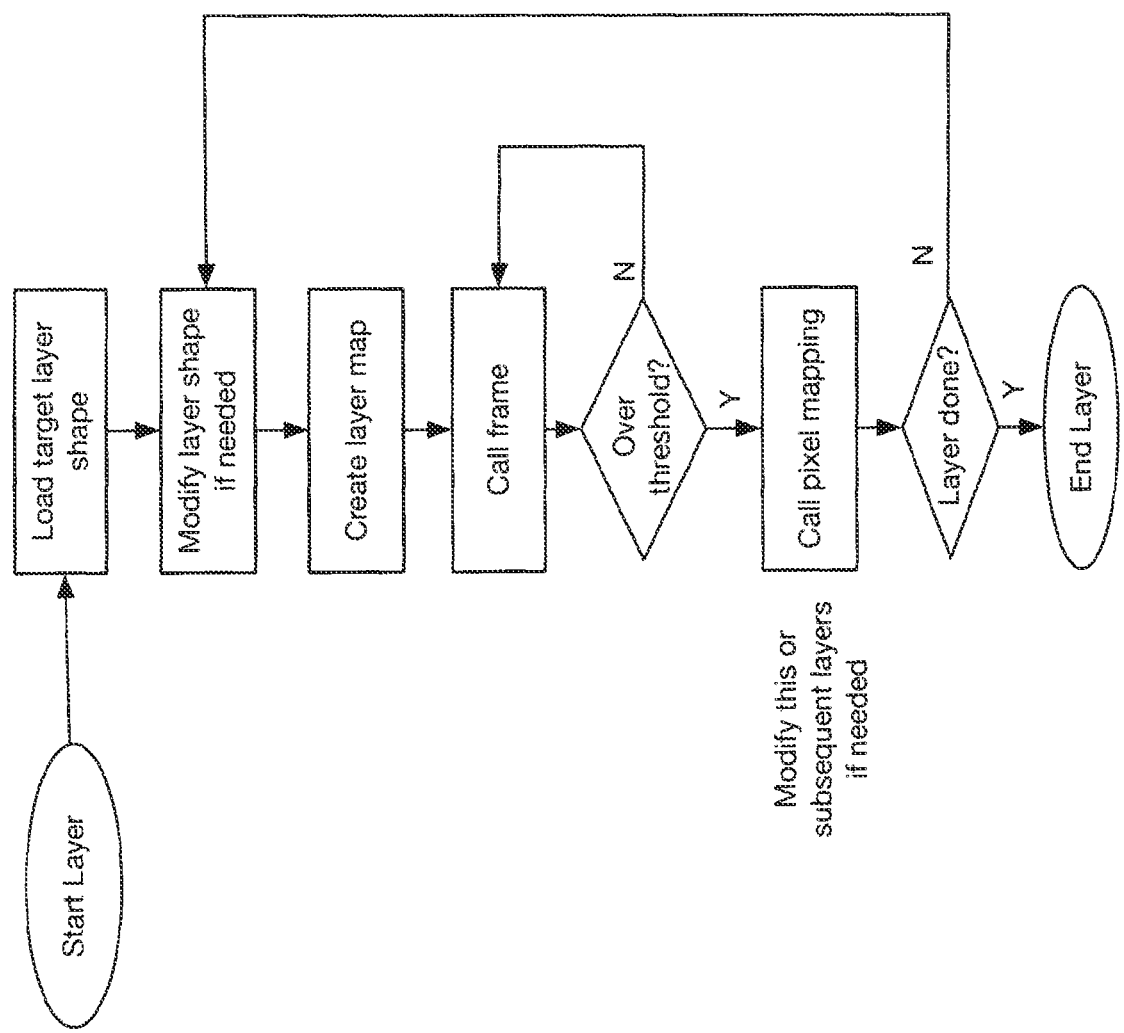
FIGS. 17, 18, and 19 show flowcharts for illustrative processes to construct a 3D part using for example an apparatus with a 3D printhead as shown in FIG. 1.
Figure 18:
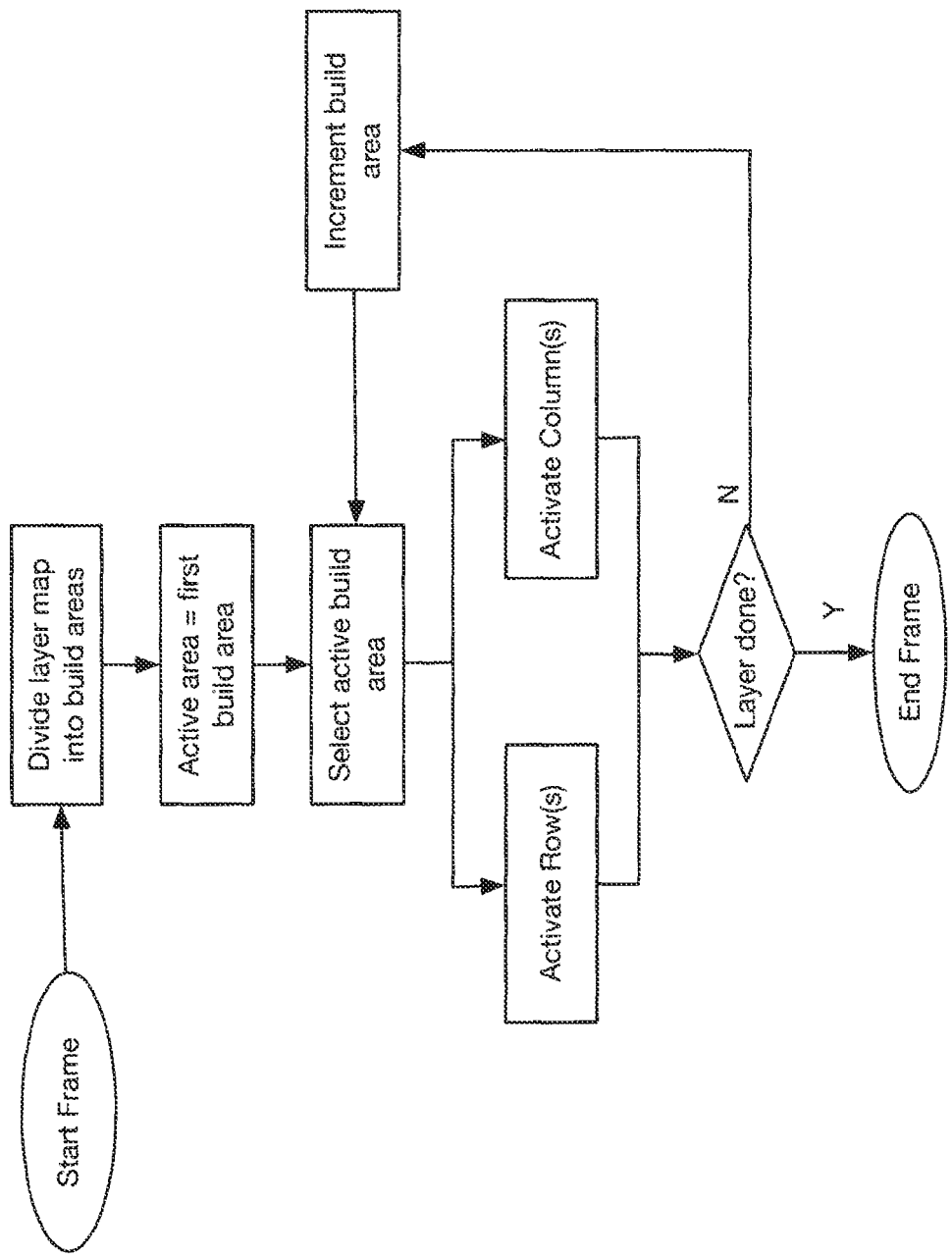
Figure 19:
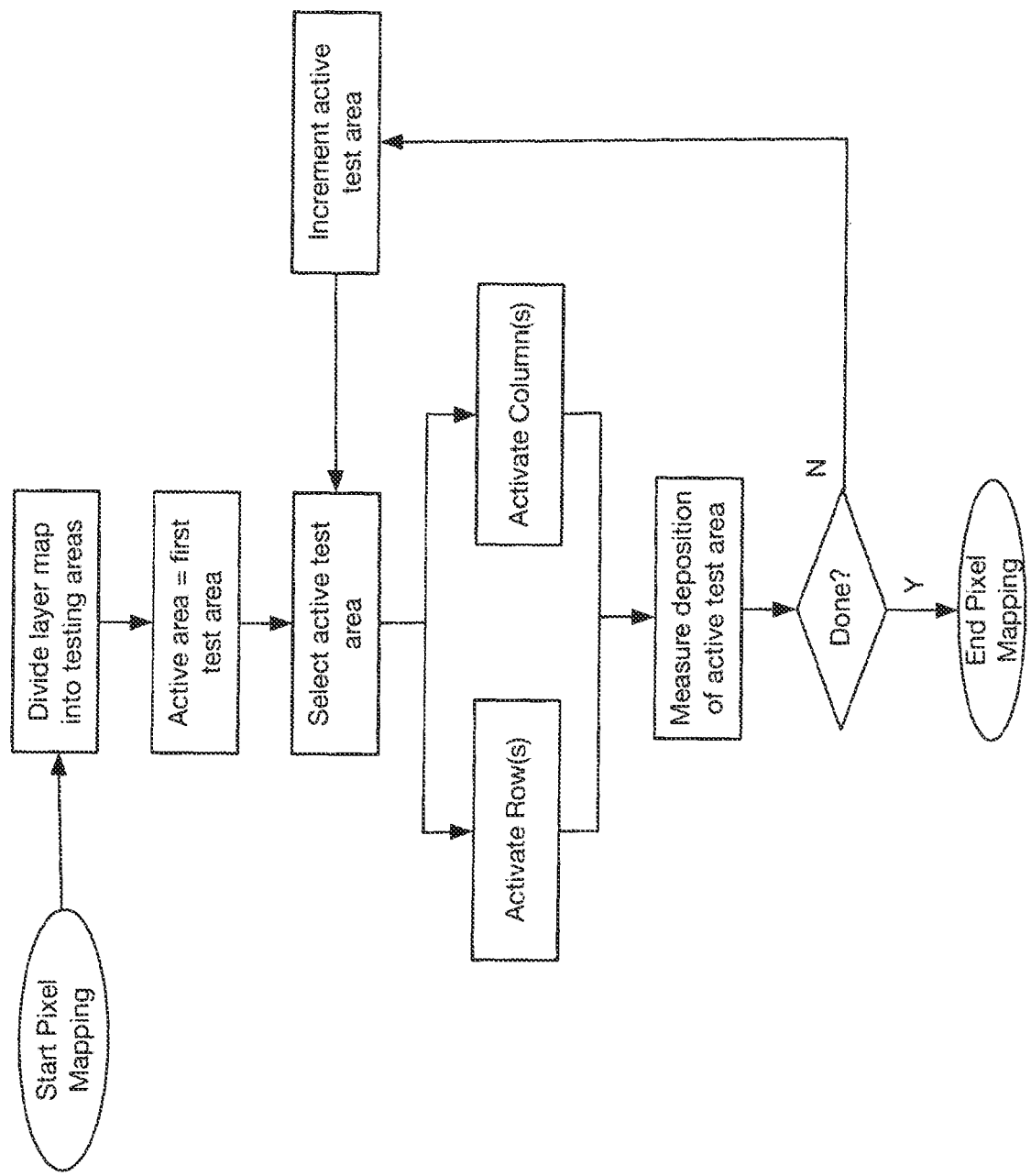

FIGS. 17 through 19 show illustrative flowcharts of a manufacturing process that may use, for example, a printhead as described above within an apparatus such as that illustrated in FIG. 1. There are several methods of operating such an apparatus to control the amount of material deposited onto a manufactured part. One method is activating a pattern of deposition anodes in the array for a set period of time. Another is activating the relevant anodes and allowing them to deposit material until the deposited material fills the gap between the substrate and the anode array, at which time the impedance of the material between the substrate and anode array changes, which causes a change in voltage or current, indicating deposition is complete. A third method is to sequentially activate deposition anodes in the anode array, and measure the electrical current flowing through the array at various periods during the deposition and measuring changes in the impedance between the anode surface and the substrate. These methods, or combinations of these methods may be used by a deposition controller to make determinations as to the state of the deposit on a particular layer or at specific locations across the active area.

In an illustrative layer deposition process illustrated in FIG. 17, a target layer shape is loaded into a controller. The layer shape may be modified to account for manufacturing issues before the layer deposition begins (in some cases due to known characteristics of the deposition process and/or due to results obtained on earlier layers as explained below). The layer shape may be mapped into a frame and then a frame deposition process (explained below) occurs. During the frame deposition process, characteristics of the deposition process may be monitored using techniques such as current measurement, voltage measurement, time measurement, and the like. If it is determined that deposition has reached its target value for one or more deposition anodes in the frame (as indicated by the 'over threshold' decision block) then the pixel mapping process is run (as explained below) that may modify this or subsequent layer maps. If the layer is determined to be complete, then the layer process finishes. If not, then the layer shape is modified if needed based on the pixel mapping and the frame process is called again.

Techniques such as varying the plating input voltage and reading the resulting current flowing through the entire system, performing an averaging calculation and modifying the input voltage to meet a target overall current or target current per electrode may be used to control the process current.

Most typically, the target layer shape, electrode gap between the electrode array and substrate, and process current/voltage may be set as to cause a localized deposition of one layer of material which matches the target layer profile. However, there may be times in which the system is purposefully commanded to periodically increase the electrode gap between the anode array and the substrate so as to more easily allow for generated gas to leave the active build area and for fresh solution to enter. This method can also be combined with the use of the anode array to allow for less localized deposition of material, or non-localized (i.e. uniform plating) deposition of material. This technique may sometimes be used as a means to help connect or combine otherwise discrete or disconnected deposits of material to help them form into one uniform deposit.

FIG. 18 shows a flowchart of an illustrative frame deposition process. When the frame process starts, it may separate the layer map into build areas. These build areas may correspond to the matrixing techniques used to drive the TFT array and may be all distinct, all overlapping, or a combination of distinct and overlapping. They can range in size from one pixel to the entire layer.

A first build area is selected to be active and then the rows and columns corresponding to that active area are activated. For example, build areas may be selected by rows. In this case, all the columns with active pixels on the active row may be activated simultaneously with the active row. In some active matrix embodiments, row and column drivers are used to charge capacitors that will allow TFT power supply (or supplies) to supply deposition current continuing after the active period of the selected build area. If the frame (layer) is done, the frame deposition process ends. If there are more build areas in the active frame (layer), however, the next active build area is selected, and the activation process is repeated.

In an illustrative pixel mapping process shown in FIG. 19, the process starts with a layer map that has been divided into testing areas. These testing areas may correspond to the matrixing techniques used to drive the TFT array and may be all distinct, all overlapping, or a combination of distinct and overlapping. They may range in size from one pixel to the entire layer. As discussed previously, in some active matrix embodiments, row and column drivers may be used to charge hold-up capacitors that will allow TFT power supply or supplies to supply deposition current continuing after the active period of the selected build area. In those cases, a method may be used to stop that deposition current before the mapping process begins (not shown in the figure for clarity). Such techniques may include waiting for the deposition current to decay naturally, removing the power supply, shorting the hold-up capacitors, etc.

Similar to the illustrative frame process of FIG. 18, a first test area is selected to be active and then the rows and columns corresponding to that active area are activated. For example, a test area may be a single pixel selected by a single active row and a single active column. The deposition state of the active test area is then estimated through techniques such as measuring current, measuring voltage, or the like. For example, a large current may indicate that the test area deposition has reached the anode, which generally means that the test area is done with deposition for this layer.

If all the test areas have been measured, the pixel mapping process ends. If there are more test areas in the active layer) however, the next active test area is selected, and the pixel mapping process is repeated.

In one example method of pixel mapping, a single anode location is energized and the power consumption at that location is measured. In other embodiments, multiple anode locations may be energized at one time. In some embodiments, a device may have different regions of power supply traces, each region capable of being independently monitored, or sets of drive ICs capable of independently driving various regions of the active area, or a combination of these things. In such embodiments, the power consumption at multiple points may be measured simultaneously, thus greatly speeding up the characterization of a device relative to one wherein only a single anode location can be measured at a time.

One or more embodiments of the invention may enable a method to manufacture a printhead such as the ones described above.

In a broad form of a first aspect the invention provides a method for manufacturing a printhead of an electrochemical additive manufacturing system, including depositing a first insulating layer onto a backplane, wherein said backplane includes a grid control circuit with an array of row traces, an array of column traces, a row driver circuit coupled electrically to said row traces, and a column driver circuit coupled electrically to said column traces, a power distribution circuit, an array of deposition control circuits aligned with a deposition grid, wherein each deposition control circuit of said array of deposition control circuits is coupled electrically to said power distribution circuit, to an associated row trace of said row traces, and to an associated column trace of said column traces, wherein said first insulating layer does not cover a contact pad associated with each deposition control circuit of said array of deposition control circuits, depositing an anode layer on top of said first insulating layer, said anode layer including an array of deposition anodes corresponding to said array of deposition control circuits, wherein each deposition anode of said array of deposition anodes includes an insoluble conductive material that is coupled electrically to a corresponding contact pad of at least one corresponding deposition control circuit of said array of deposition control circuits, and depositing a second insulating layer on top of said first insulating layer and on top of said anode layer, wherein said second insulating layer does not cover an exposed surface of each deposition anode of said array of deposition anodes that is configured to contact an electrolyte.

In a second aspect of the invention said first insulating layer has an average thickness of at least 100 nanometers, said anode layer has an average thickness of at least 50 nanometers, and, said second insulating layer has an average thickness of at least 100 nanometers.

In a third aspect of the invention said first insulating layer has an average thickness of at least 800 nanometers, said anode layer has an average thickness of at least 800 nanometers, and, said second insulating layer has an average thickness of at least 1500 nanometers.

In a fourth aspect of the invention said first insulating layer has an average thickness of at least 800 nanometers, said anode layer has an average thickness of at least 1600 nanometers, and, said second insulating layer has an average thickness of at least 2000 nanometers.

In a fifth aspect of the invention said insoluble conductive material includes one or more of platinum group metals and their associated oxides, highly doped semiconducting materials, and carbon based conductors.

In a sixth aspect of the invention said depositing said anode layer comprises chemical vapor deposition.

In a seventh aspect of the invention said depositing said anode layer further includes depositing a seed material, applying a mask over portions of said seed material that correspond to a desired pattern of said array of deposition anodes, removing said seed material that is not covered by said mask, removing said mask, and, depositing said insoluble conductive material on said seed material using said chemical vapor deposition.

In an eighth aspect of the invention said insoluble conductive material includes boron doped diamond.

In a ninth aspect of the invention said depositing said anode layer further includes depositing said insoluble conductive material using said chemical vapor deposition, applying a mask over portions of said insoluble conductive material that correspond to a desired pattern of said array of deposition anodes, removing said insoluble conductive material that is not covered by said mask, and, removing said mask.

In a tenth aspect of the invention said depositing said anode layer comprises physical vapor deposition.

In an eleventh aspect of the invention said depositing said anode layer further includes applying a photoresist layer on top of said first insulating layer, removing said photoresist layer in regions corresponding to a desired pattern of said array of deposition anodes, depositing said insoluble conductive material on top of said first insulating layer and said photoresist layer using said physical vapor deposition, and, removing said photoresist layer and said insoluble conductive material on top of said photoresist layer.

In a twelfth aspect of the invention said depositing said anode layer further includes depositing said insoluble conductive material using said physical vapor deposition, applying a mask over portions of said insoluble conductive material that correspond to a desired pattern of said array of deposition anodes, removing said insoluble conductive material that is not covered by said mask, and, removing said mask.

In a thirteenth aspect of the invention said removing said insoluble conductive material that is not covered by said mask includes etching.

In a fourteenth aspect of the invention said etching includes wet etching.

In a fifteenth aspect of the invention said etching includes dry etching.

In a sixteenth aspect of the invention, one or both of said first insulating layer and said second insulating layer include one or both of silicon nitride and silicon dioxide.

Figure 20:
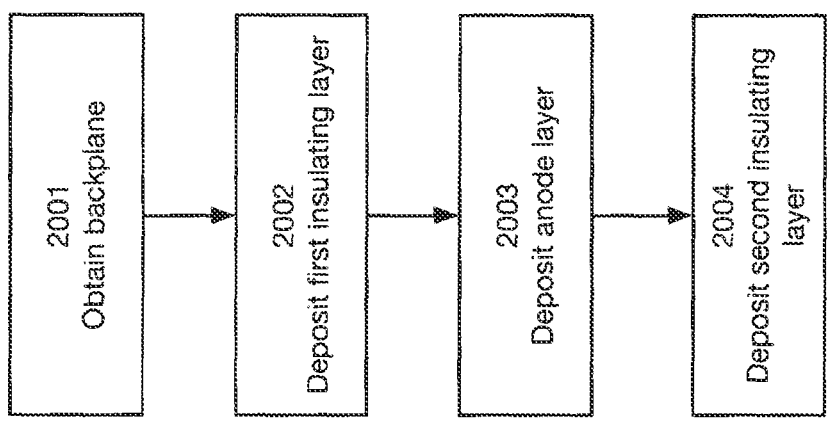
FIG. 20 shows a high-level flowchart for an illustrative manufacturing process that builds a printhead by depositing layers on top of a backplane.

FIGS. 20 through 25 illustrate one or more manufacturing processes that may be used in one or more embodiments to create a printhead such as the ones described above. FIG. 20 shows a high-level flowchart of an embodiment of a printhead manufacturing process that generates a printhead by depositing layers on top of a backplane. A backplane is first obtained in step 2001. This backplane may contain for example deposition control circuits and associated grid control and power circuits. The grid control circuit may include row and column lines and row and column drivers, as illustrated for example in FIG. 2. In one or more embodiments, the backplane may be manufactured for example by adapting display matrix backplane technologies that may be used to generate backplanes for LCD or OLED monitors. Layers may then be deposited on top of the backplane to form the complete printhead. In one or more embodiments, a first insulating layer may be deposited onto the backplane in step 2002, an anode layer may be deposited in step 2003, and a second insulating layer may be deposited in step 2004. The layers may be deposited so that each anode makes an electrical connection with one or more corresponding deposition control circuits of the backplane. The second insulating layer may leave an exposed area of each deposition anode so that it can contact the electrolyte when the printhead is used to manufacture a part. In one or more embodiments, additional steps may add any number of additional anode layers or any number of additional insulating layers. For example, a total of two anode layers and three insulating layers may be added on top of the backplane as shown in FIG. 12.

Figure 21:
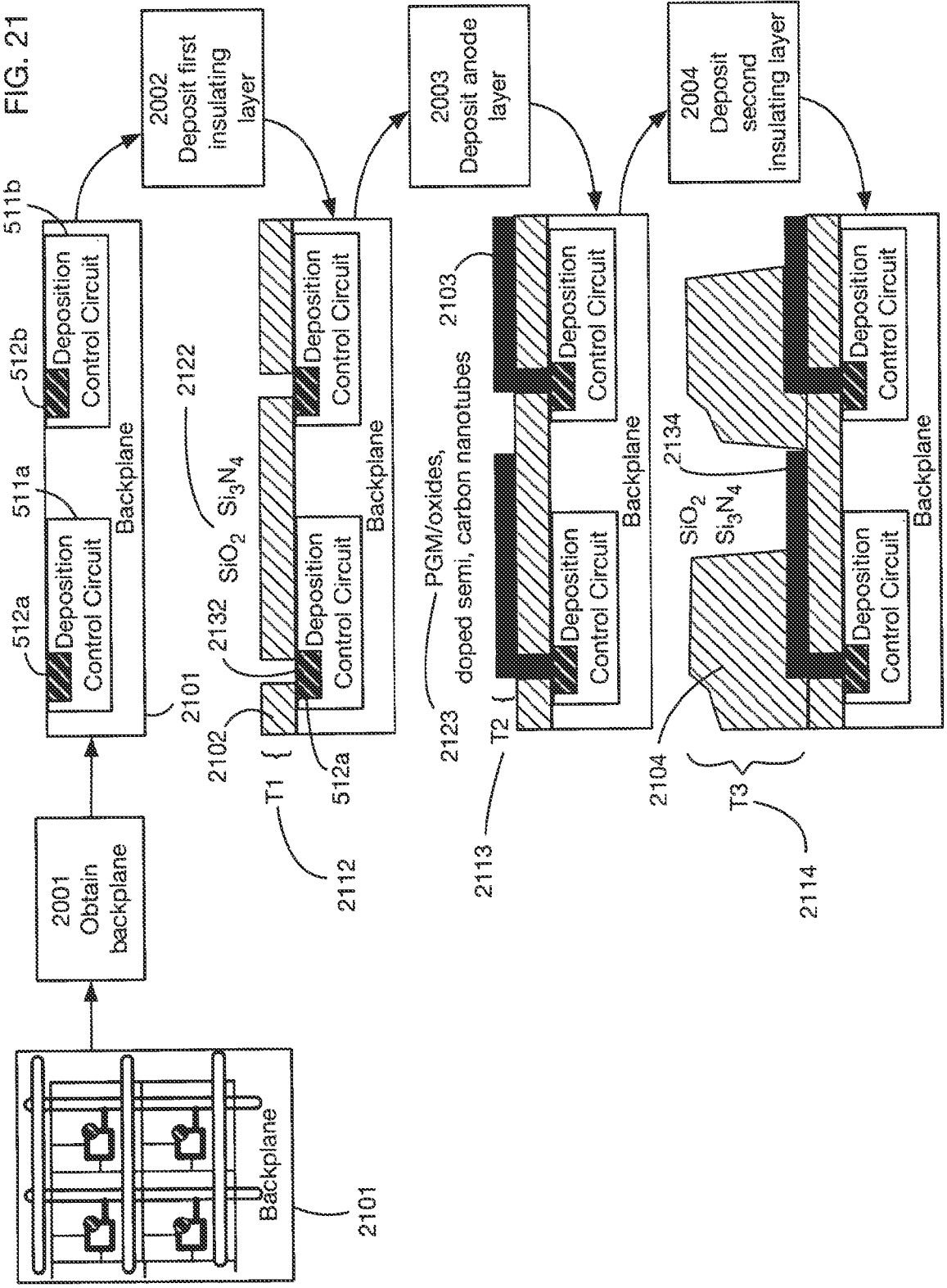
FIG. 21 illustrates the printhead manufacturing steps shown in FIG. 20, with illustrative layer thickness and materials.

FIG. 21 illustrates steps 2001 through 2004 of FIG. 20. Backplane 2101 is obtained in step 2001. Each deposition control circuit in the backplane is connected to an associated row line and column line, and to a power distribution circuit. A contact pad is associated with each deposition control circuit for connection to the deposition anode. A side cross-section view of a small portion of backplane 2101 shows two deposition control circuits 511*a* and 511*b*, with associated contact pads 512*a* and 512*b*.

Step 2002 deposits a first insulating layer 2102 onto backplane 2101. The first insulating layer's primary purpose is to increase the mechanical and chemical resilience of the backplane to the electrolyte solution. In one or more embodiments, first insulating layer 2102 may include for example materials 2122 (Silicon Nitride, Silicon Dioxide, or alternating layers of Silicon Dioxide and Silicon nitride). The average thickness 2112 (T1) of this insulating layer may be at least 100 nanometers in one or more embodiments; in one or more embodiments the average thickness 2112 may be as much as 20 micrometers (20,000 nanometers). In one or more embodiments the first insulating layer 2102 may be deposited through a Plasma Assisted Chemical Vapor Deposition (PECVD) process.

The resulting dielectric layer 2102 may then be patterned to allow for an electrical connection through the layer between the anode layer and the contact pads of the deposition control circuits. For example, a gap 2132 in the insulating layer may expose contact pad 512a. In one or more embodiments, patterning of the insulating layer may be done by selectively masking the region and exposing a portion of the dielectric region to an etching process. This etching process may be done with either wet or dry etching processes. Illustrative wet etching processes may include submerging the masked substrates in solutions of hydrofluoric acid. Illustrative dry etching processes may involve placing the substrates in a plasma environment where select gases are introduced. These gases may include for example SF6, O2, CF4, Nitrogen, or Argon.

In one or more embodiments the insulating layer may be constructed using techniques other than chemical vapor deposition, including for example, without limitation, spin on glass, atomic layer deposition (ALD) of a dielectric such as Al2O3, deposition of permanent photosensitive epoxy or polymers such as SU8 or BCB, or deposition of other organic dielectric layers such as polyimide.

In step 2003, anode layer 2103 is deposited on top of insulating layer 2102 (and on top of exposed portions of the deposition control circuits). Each deposition anode is coupled electrically to the corresponding contact pad of the deposition control circuit below. In one or more embodiments, a deposition anode may be coupled electrically to the contact pads of multiple deposition control circuits; this may allow multiple deposition control circuits to drive a single anode, either separately or collectively. In one or more embodiments the anode layer may consist of or include insoluble conductive materials 2123, such as Platinum, Iridium, Tantalum, other Platinum group metals, or their associated oxides, highly doped semiconductor materials, or carbon based conductors. The average thickness 2113 (T2) of this anode layer 2103 may be 50 nanometers or more in one or more embodiments; in one or more embodiments this average thickness 2113 may be as much as 2 millimeters (20,000,000 nanometers). The anode layer may be constructed using various techniques such as physical vapor deposition (PVD, or, sputtering) or chemical vapor deposition (CVD), as illustrated below.

In step 2004, a second insulating layer 2104 is deposited on top of portions of the anode layer 2103. An exposed portion 2134 of each deposition anode is left uncovered (or the insulation covering it is removed) so that the deposition anode can contact the electrolyte. In one or more embodiments, the process and materials of the second insulating layer may be similar to those of the first insulating layer 2102. The average thickness 2114 (T3) of this second insulating layer may be the same as or different from the average thickness 2112 of the first insulating layer. In one or more embodiments the average thickness 2114 of the second insulating layer may be at least 100 nanometers, and may be as much as 20 micrometers (20,000 nanometers).

Preferred or desired thickness of the insulating and anode layers may depend on material properties; as material performance is improved, layer thicknesses may be reduced while still maintaining the desired performance and longevity of the printhead. With current materials, layer thicknesses (in nanometers) are shown in the table below for four illustrative embodiments A, B, C, and D:

| Embodiment | T1 (nm) | T2 (nm) | T3 (nm) |
| --- | --- | --- | --- |
| A | 800 | 800 | 1500 |
| B | 800 | 1600 | 1500 |
| C | 800 | 800 | 2000 |
| D | 800 | 1600 | 2000 |

Figure 22:
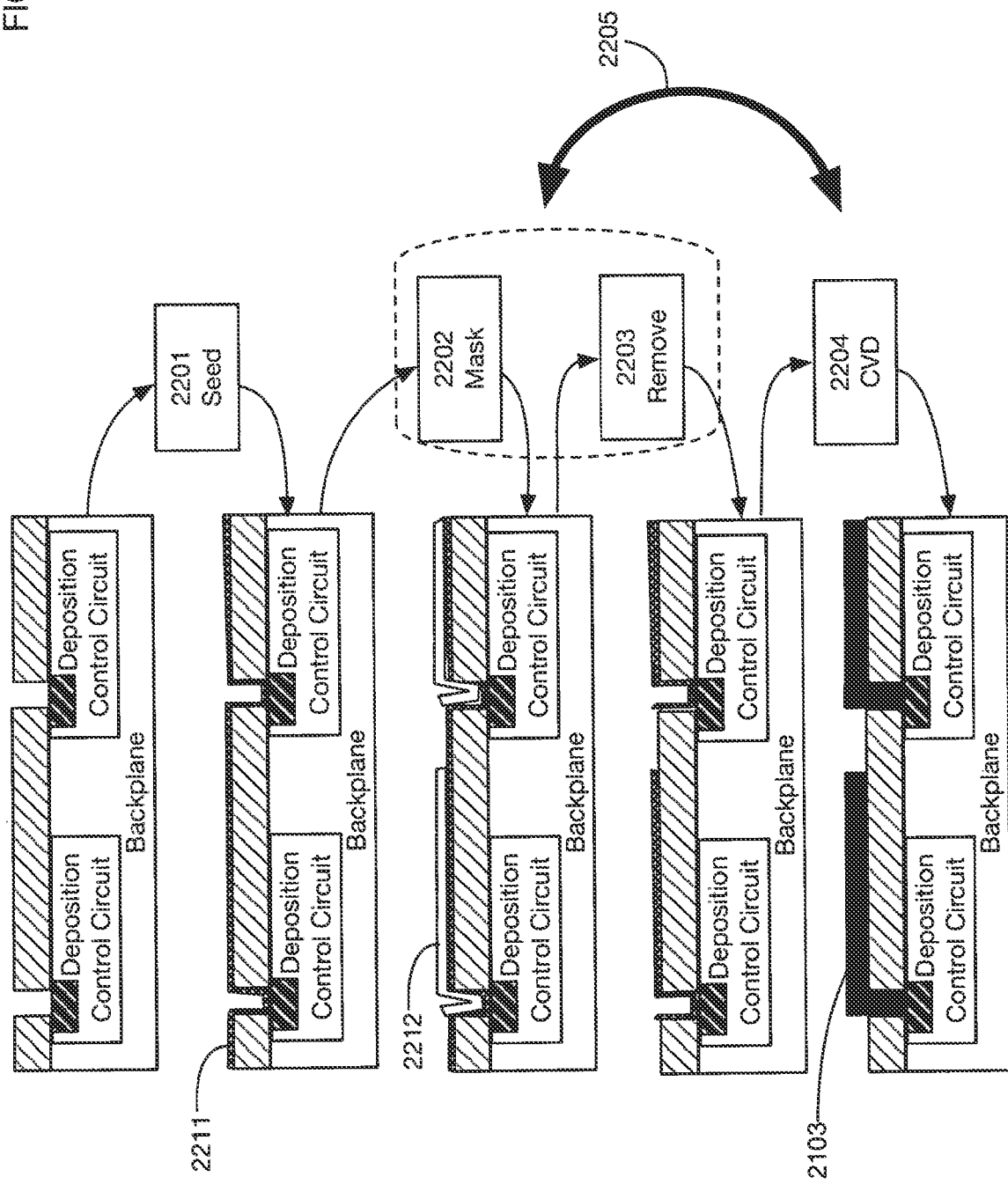
FIG. 22 shows an illustrative process for depositing an anode layer that uses chemical vapor deposition.
Figure 23:
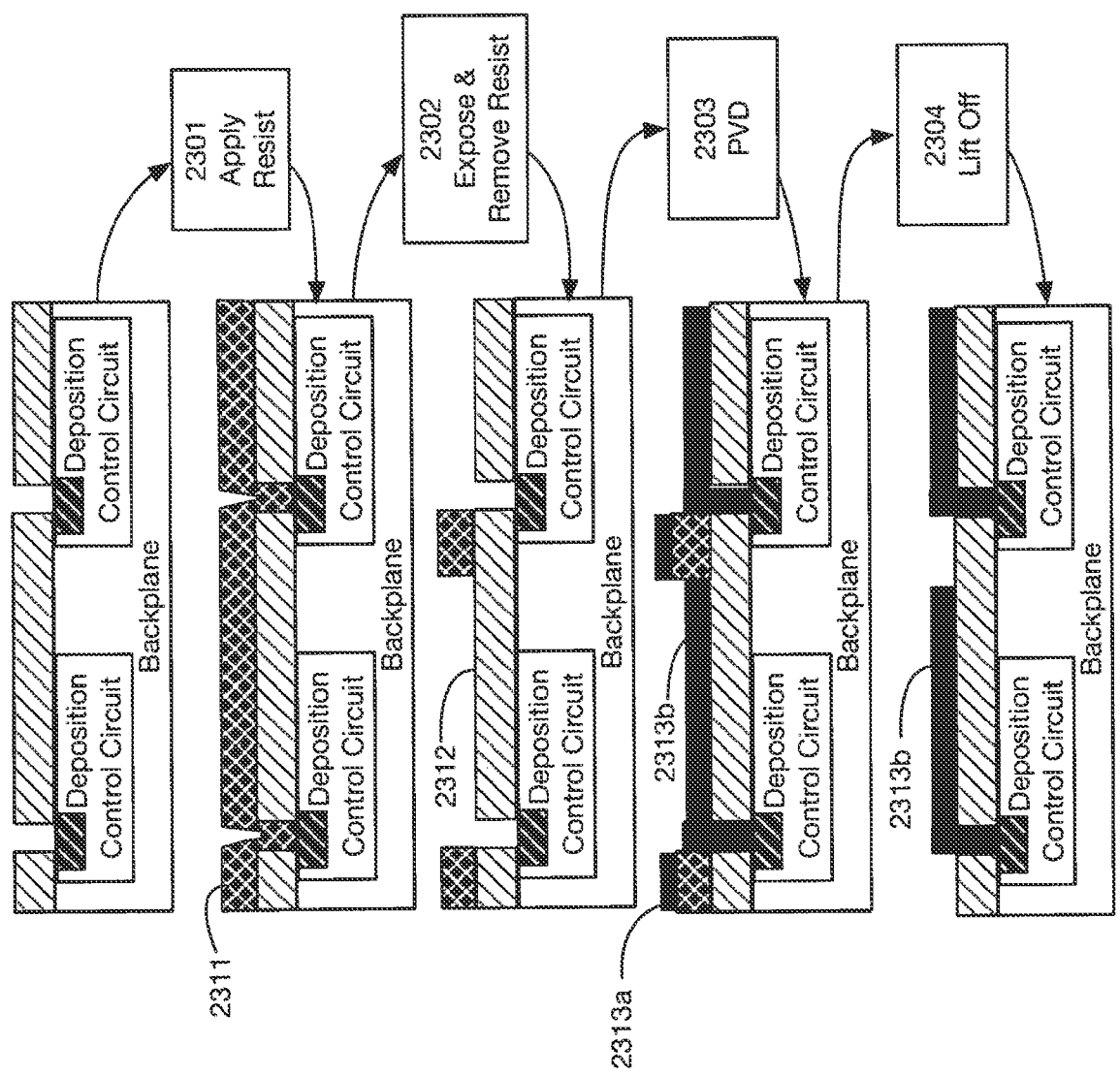
FIG. 23 shows another illustrative process for depositing an anode layer that uses physical vapor deposition.

FIGS. 22 and 23 show illustrative techniques that may be used in one or more embodiments to construct the anode layer: FIG. 22 shows chemical vapor deposition and FIG. 23 shows physical vapor deposition. In the process illustrated in FIG. 22, step 2201 first deposits a seed layer 2211 on top of the first insulating layer. This seed layer may for example include Niobium or Titanium Nitride, onto which a suspension of diamond nanoparticles is applied. In step 2202, a mask 2212 may be applied over the seed layer in the pattern of the desired deposition anodes. The mask may be sputtered for example, and may for example be made of Aluminum. In step 2203, the material not covered by the mask may be removed, and then the mask may be removed, leaving only the seed layer in the desired pattern of the deposition anode array. Mask removal may be performed for example using photoresist and wet etching to remove the Aluminum not under the photoresist, followed by a quick oxygen plasma to remove the newly exposed diamond seed particles, followed by removal of the remaining Aluminum, leaving the diamond seed particles only in desired anode locations. In step 2204, the anodes may be constructed on top of the remaining seed material using chemical vapor deposition. The substrate may be placed into a CVD reactor, and process gases including boron dopant may cause boron doped diamond to grow at each seed crystal location. Deposition may continue until at least a continuous film is formed, but it may continue as long as desired to create an anode layer of the desired thickness.

In one or more embodiments, the masking and removal steps may be interchanged 2205 with the chemical vapor deposition step, so that patterning is performed after deposition. For example, CVD may be performed over the entire seed layer, and then a mask may be applied over the resulting boron doped diamond (BDD) layer to mask the regions that correspond to the desired deposition anodes. The part may then be exposed for example to Oxygen plasma that removes the exposed boron doped diamond. Suitable mask materials may include those that are typically resistant to oxygen plasma, such as metals Al and Mo.

FIG. 23 shows an illustrative process that uses physical vapor deposition (PVD) to construct the anode layer. In step 2301, a resist 2311 is applied over the first insulating layer. This resist layer 2311 may be a bi-layer photoresist, with the top layer being a typical photosensitive resist, and the bottom layer a non-photosensitive polymer. During the development process the two different resist materials may form a strongly undercut profile which allows for a technique known as "lift-off" In step 2302, a portion of the photoresist is exposed and removed, leaving portions 2312 of the first insulating layer uncovered by the resist. In step 2303, physical vapor deposition may be used to apply the anode layer material. Portions 2313a of the anode material may be over the remaining photoresist, and other portions 2313b may be over the insulating material (or in contact with the contact pads of the deposition control circuits). Then in step 2304, the "lift off" step, the part may be submerged in a solvent which releases the photoresist and the anode layer film from regions 2313a, leaving the desired anode structures 2313b. In one or more embodiments, instead of masking regions with photoresist prior to PVD, anode material may be first deposited using PVD and then wet or dry etched for patterning. Illustrative dry etching processes may involve placing the substrates in a plasma environment where select gases are introduced. These gases may include for example SF6, O2, CF4, Nitrogen, or Argon. Illustrative wet etching chemistry is "Aqua regia", a mixture of nitric acid and hydrochloric acid, with Cr used as a hard masking layer as it resists the wet etch chemistry and is readily patterned with typical photoresist and Cr patterning operations.

Figure 24:
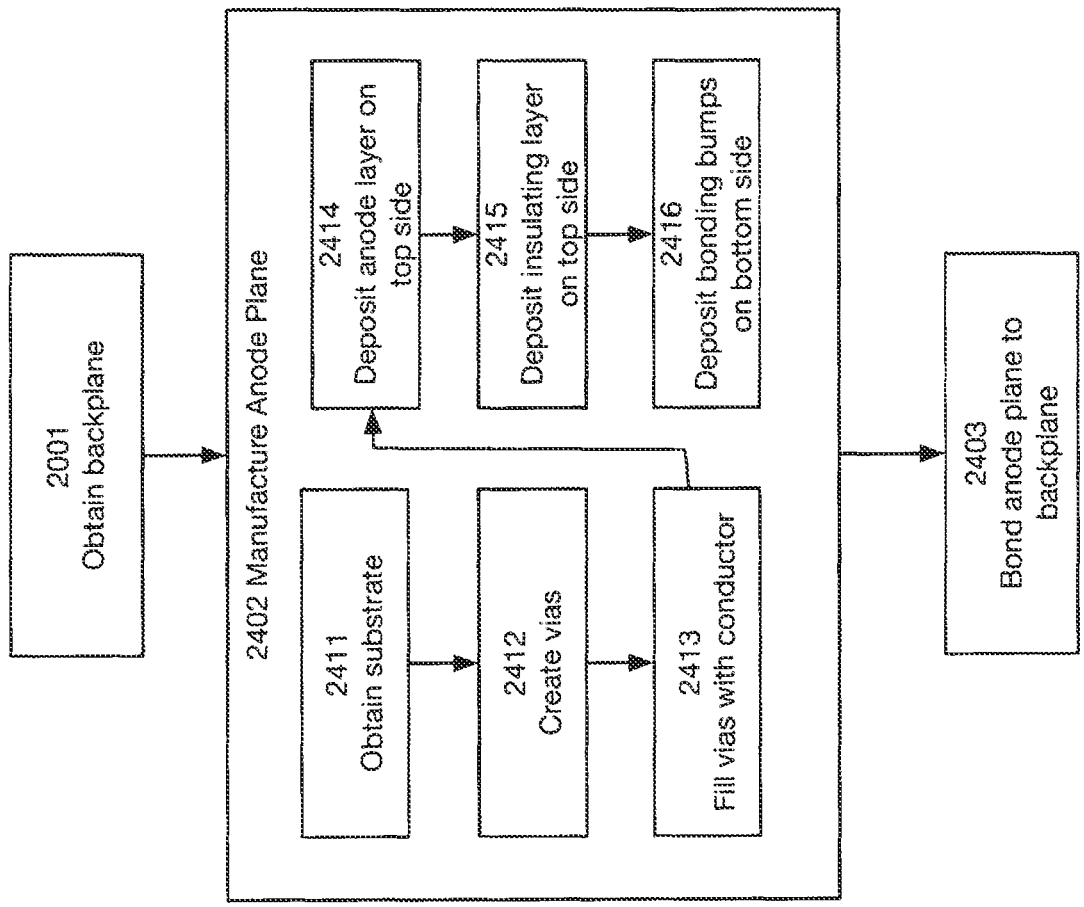
FIG. 24 shows a high-level flowchart for an illustrative manufacturing process that builds a printhead by manufacturing a separate anode plane and then bonding the entire anode plane to the backplane.
Figure 25:
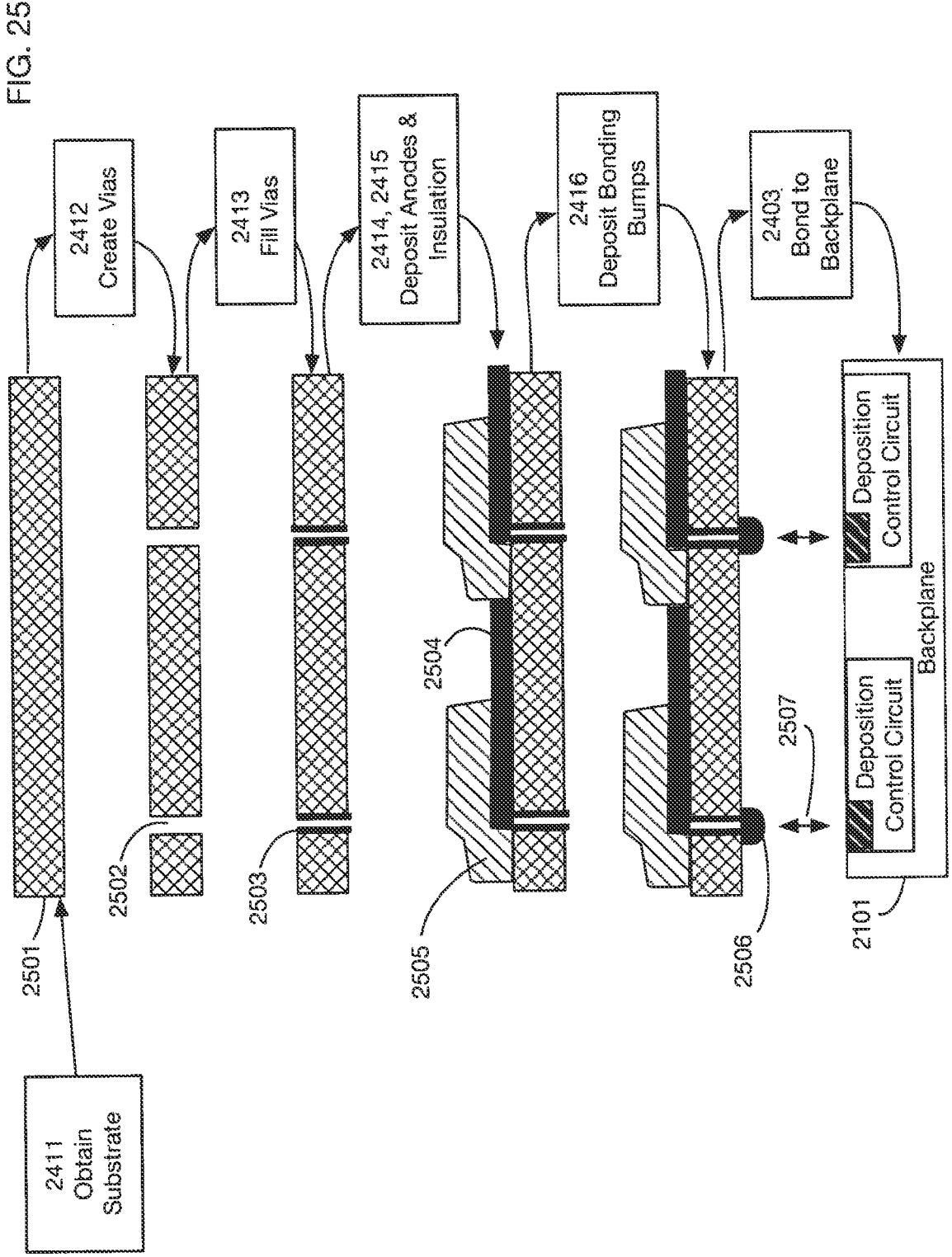
FIG. 25 illustrates the steps shown in FIG. 24.

FIGS. 24 and 25 illustrate a different technique for manufacturing a printhead that may be used in one or more embodiments, which constructs a separate anode plane component and then bonds the anode plane to a backplane. FIG. 24 shows a flowchart of high-level steps of such a process. A backplane may be obtained in step 2001, as described above. A separate anode plane may then be constructed in steps 2402. Anode plane manufacturing may first include step 2411 of obtaining a substrate. A substrate may be selected that is compatible with the process; for example it may be a thin glass or silicon substrate with low conductivity. The thickness of the substrate impacts the minimum pixel pitch due to some of the process steps, so in one or more embodiments it may be relatively thin: on the order of 200-500 microns, for example. In step 2412, openings, or "vias", may be created through this substrate at each deposition anode location. Vias may be created for example using an etching technique, either a dry (plasma) etch, or wet (liquid) etch process. These openings are then filled in step 2413 with an electrically conductive material to allow an electrical connection between a deposition anode on one of side of the anode plane to communicate electrically with the other side of the anode plane. Vias may be filled with electrodeposited materials such as copper, silver, platinum, nickel, gold; with materials deposited via chemical vapor deposition such as tungsten; or with systems of metal and ceramic powders which are fired to the ceramic's melting point, creating a matrix to hold the metal powders and create a hermetic seal across the substrate opening. The metal/ceramic powder matrix systems may have great flexibility in the materials and ceramics which can be used, with one combination being platinum powder and 'glass frit'.

After the vias are filled, depending on the fill method one or both sides of the substrate may be polished to create a flat surface. On a "top" side of the substrate, anode materials may be deposited and patterned in step 2414 using for example the same materials and techniques as described above, such as PVD with platinum group metals, Electroplated Platinum, or CVD with BDD. Each anode may be coupled electrically to one or more vias. An insulating layer may be deposited on top of the anode layer in step 2415. In one or more embodiments, additional anode layers or insulating layers may be deposited onto the top side of the anode plane. In step 2416, a bump for bonding each deposition anode location is attached to the bottom side of the substrate. Bonding bumps may be deposited for example using a thick photomask, and a deposit of bump material may be left at each anode location. Bump material may be for example gold, copper, silver, lead, tin or some mixture depending on bump methodology.

In step 2403, the anode plane and the backplane are bonded together to form the complete printhead. The anode plane and the backplane must be aligned; then they are bonded to create an electrical connection between each deposition control circuit in the backplane and each deposition anode location in the anode plane through the bump. This bonding may be done for example with eutectic bonding, thermocompression bonding, controlled collapse solder bonding, or with the aid of an anisotropic conductive adhesive.

FIG. 25 illustrates the steps of the process shown in FIG. 24, showing a side cross-section view of the components. Substrate 2501 is obtained in step 2411. Step 2412 creates vias such as via 2502 through the substrate, and step 2413 fills the vias with conductive material 2503. In steps 2414 and 2415 an anode layer 2504, and an insulating layer 2505, are deposited on top of the substrate. Step 2416 deposits bumps such as 2506 onto the bottom of the substrate so that they are in electrical contact with the vias. The anode plane is then complete, and in step 2403 it is bonded to backplane 2101 by making electrical connections 2507 between the bonding bumps and the control pads of the deposition control circuits.

In an electrochemical additive manufacturing process, a metal part is constructed by reducing charged metal ions onto a surface in an electrolyte solution. This technique relies on placing a deposition anode physically close to a substrate in the presence of a deposition solution (the electrolyte), and energizing the anode causing charge to flow through the anode. This creates an electrochemical reduction reaction to occur at the substrate near the anode and deposition of material on the substrate. A particular challenge of electrochemical manufacturing is that the rate and quality of deposition of material may be highly variable, and may vary across time and across locations based on multiple factors such as current density, electrolyte composition, fluid flows within the electrolyte, and distances between anodes and previously deposited material. For this reason, the inventors have discovered that an important factor in constructing high-quality parts with electrochemical additive manufacturing is to employ a "closed loop" feedback control system that monitors deposition throughout the manufacturing process, and that adjusts manufacturing parameters accordingly. This approach contrasts with a typical "open loop" additive manufacturing process used by most 3D printers, for example, where layers are constructed successively based on pre-programmed commands.

In a broad form of a first aspect the invention provides an electrochemical additive manufacturing method using deposition feedback control, including placing a surface of a cathode into an electrolyte solution, wherein an object to be manufactured is constructed by electrochemically depositing material onto the cathode, placing an anode array in contact with the electrolyte solution, wherein the anode array comprises a plurality of deposition anodes and each deposition anode of the plurality of deposition anodes is configured to provide current that flows from the deposition anode to the cathode through the electrolyte solution, resulting in deposition of the material onto the cathode, obtaining a build plan that includes a layer description of each layer of a plurality of layers of the object to be manufactured, wherein the layer description includes a target map including a desired presence or absence of the material at a plurality of locations within an associated layer, and one or more process parameter values that affect a manufacturing process for the associated layer, manufacturing each layer of the plurality of layers, wherein manufacturing a layer of the plurality of layers includes setting or confirming a position of the cathode relative to the anode array to begin the manufacturing of the layer, transmitting control signals to the anode array based on the layer description of the layer, measuring one or more feedback signals across the anode array, analyzing the one or more feedback signals to produce a deposition analysis that comprises am extent to which deposition has progressed at the plurality of locations within the layer, determining whether deposition of the layer is complete based on the deposition analysis, when deposition of the layer is not complete, determining whether to modify one or more of the one or more process parameter values associated with the layer, and, when deposition of the layer is complete and when a subsequent layer of the plurality of layers has not been manufactured, manufacturing the subsequent layer.

A second aspect of the invention further includes modifying the layer description of one or more layers of the plurality of layers before manufacturing the one or more layers.

In a third aspect of the invention modifying the layer description includes changing the density of the one or more layers.

In a fourth aspect of the invention analyzing the one or more feedback signals includes applying one or more transformations to the feedback signals, wherein the one or more transformations include one or more of morphological filters and Boolean operations.

In a fifth aspect of the invention the one or more feedback signals include a map of current across the anode array.

In a sixth aspect of the invention the deposition analysis includes a thresholding operation applied to the map of current across the anode array.

In a seventh aspect of the invention determining whether deposition of the layer is complete includes calculating a number of actual deposited pixels within the layer, calculating a number of desired deposited pixels within the layer, and, determining that the deposition of the layer is complete when a ratio of the number of actual deposited pixels to the number of desired deposited pixels reaches or exceeds a threshold.

In an eighth aspect of the invention determining whether deposition of the layer is complete includes identifying a set of actual deposited pixels within the layer, identifying a set of desired deposited pixels within the layer, and, determining that the deposition of the layer is complete when a desired fraction of the set of desired deposited pixels within the layer are within a threshold distance from one or more pixels in the set of actual deposited pixels within the layer.

In a ninth aspect of the invention determining whether deposition of the layer is complete further includes dividing the layer into components, determining whether each component of the components is complete, and, determining that the deposition of the layer is complete when all of the components are complete.

In a tenth aspect of the invention determining whether each component of the components is complete includes determining whether a ratio of the number of actual deposited pixels within each component to the number of desired deposited pixels within each component reaches or exceeds the threshold.

In an eleventh aspect of the invention determining whether each component of the components is complete includes identifying a set of actual deposited pixels within each component, identifying a set of desired deposited pixels within each component, and, determining that the deposition of each component is complete when a desired fraction of the set of desired deposited pixels within each component are within a threshold distance from one or more pixels in the set of actual deposited pixels within each component.

In a twelfth aspect of the invention the layer description further includes identification of whether the associated layer includes an overhang.

In a thirteenth aspect of the invention manufacturing a layer of the plurality of layers further includes when the layer includes an overhang, successively depositing portions of the overhang, wherein each portion of the portions of the overhang extends laterally from one or more previously deposited portions of the overhang.

In a fourteenth aspect of the invention manufacturing a layer of the plurality of layers further includes dividing the target map associated with the layer into regions, and, alternately activating deposition anodes in the anode array associated with each region of the regions.

In a fifteenth aspect of the invention manufacturing a layer of the plurality of layers further includes calculating a map of desired current output from each deposition anode of the anode array that will generate deposition that corresponds to the target map associated with the layer.

In a sixteenth aspect of the invention calculating the map of desired current output from each deposition anode includes applying one or more transformations to the target map associated with the layer.

In a seventeenth aspect of the invention determining whether to modify one or more of the one or more process parameter values associated with the layer includes for one or more deposition anodes in the anode array, calculating one or more of a voltage, a current, and, an amount of time of activation.

In an eighteenth aspect of the invention, setting or confirming the position of the cathode relative to the anode array to begin the manufacturing of the layer includes obtaining one or more sensor signals that vary based on the position of the cathode relative to the anode.

In a nineteenth aspect of the invention the one or more sensor signals comprise a current value or a voltage value.

In a twentieth aspect of the invention manufacturing the layer of the plurality of layers further includes performing one or more maintenance actions to maintain the condition of one or more of the anode array and the electrolyte solution.

In a twenty-first aspect of the invention the one or more maintenance actions include replacing material onto one or more deposition anodes that have eroded.

In a twenty-second aspect of the invention the one or more maintenance actions include activating one or more deposition anodes onto which a film has formed to cause removal of the film.

In a twenty-third aspect of the invention the one or more maintenance actions include removal of bubbles from the electrolyte solution.

Figure 26:
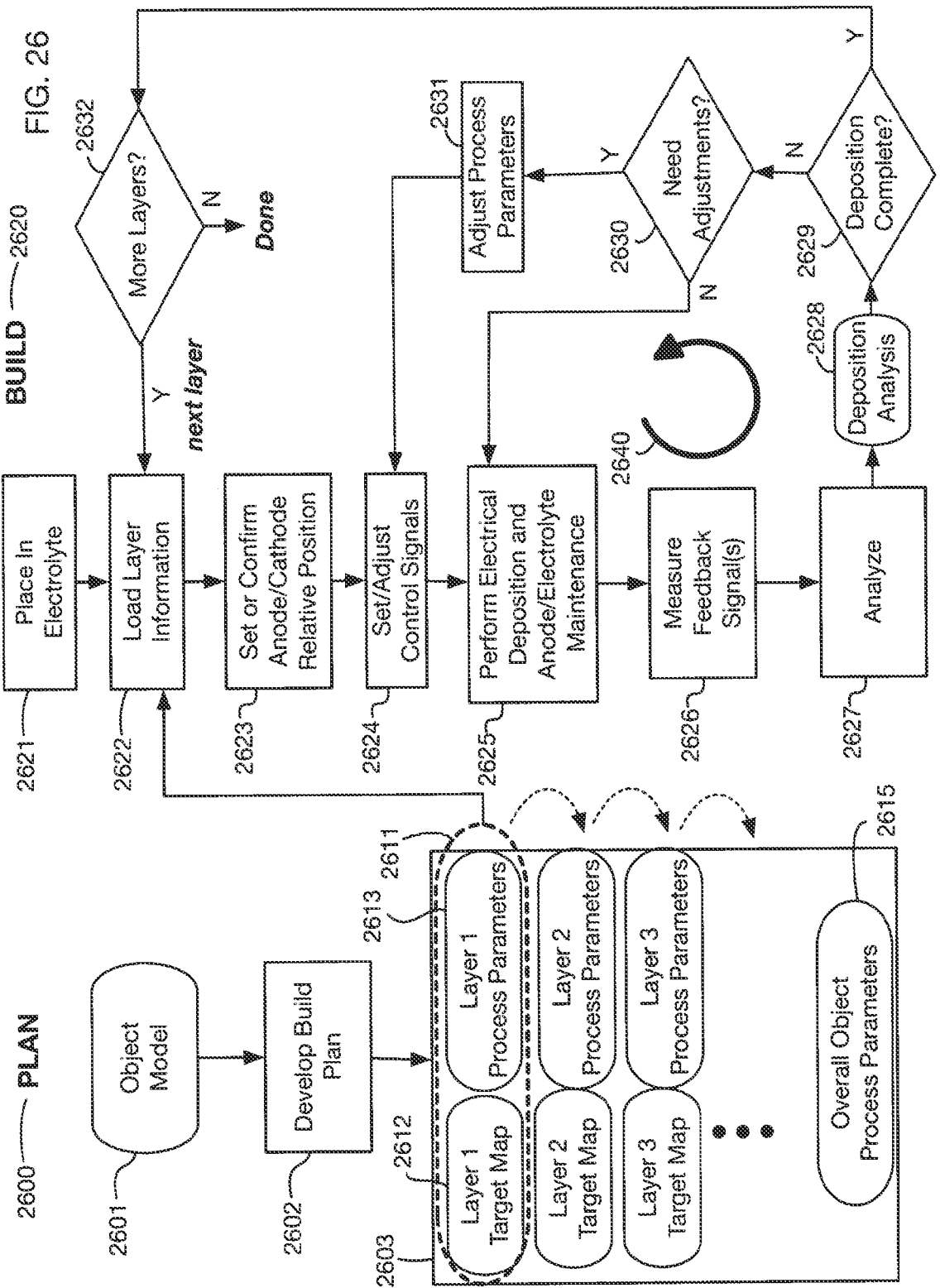
FIG. 26 shows a flowchart of an embodiment of the invention that successively manufactures layers using feedback control to assess layer completion and to adjust parameters during manufacturing.

FIG. 26 shows illustrative steps for an electrochemical additive manufacturing process that incorporates deposition feedback control. These steps are illustrative; one or more embodiments may use different or additional steps and may perform operations in different orders. The manufacturing process illustrated in FIG. 26 has a planning phase 2600, and a building phase 2620. In the planning phase 2600, a model 2601 of an object is analyzed by planning step or steps 2602 to generate a build plan 2603 for construction of the object. The planning step or steps 2602 may execute on any processor or processors, such as for example, without limitation, a computer, a microprocessor, a microcontroller, a desktop, a laptop, a notebook, a server, a mobile device, a tablet, or a network of any of these processors. In one or more embodiments, the planning step (or steps) 2602 may for example slice a 3D object model 2601 into layers, and develop a plan to construct each layer. The build plan 2603 may include a layer description for each layer; a layer description may include for example a target map for the layer and various process parameter values for construction of the layer. The target map may include a two-dimensional grid or image showing locations within the layer where material is to be deposited. The process parameters for a layer may include any variables that affect the physical or electrical processes that construct the layer; these parameters may include for example, without limitation, current density range, voltage range, layer height, movement parameters, overhang controls, safety thresholds, leakage thresholds, short circuit determination threshold values, pixel mapping intervals and thresholds, debubble values, fusing, anode cleaning, islanding, distance to short, distance to short percentage, pixel limits, slow current control values, and maximum blob size. FIG. 26 shows an illustrative layer description 2611 for a first layer of an object, which includes a target map 2612 for the layer and process parameters 2613 for the layer; subsequent layers have similar layer descriptions with target maps and process parameters. The build planning step or steps 2602 may also generate overall process parameters 2615 that apply to all of the layers in the build, or that may be used as default values that apply unless a layer description overrides the defaults.

The build phase 2620 of the process constructs an object from the build plan 2603, using for example equipment that performs electrochemical deposition. Illustrative equipment that may be used in one or more embodiments of the invention is described below with respect to FIG. 27. To initiate the build process, a surface of a cathode may be placed in contact with an electrolyte solution in step 2621; the object may be constructed by electrochemically depositing material onto the cathode by passing current through an anode array that is also in contact with the solution. Layers in build plan 2603 may then be built successively onto the base of the cathode or onto previously constructed layers, effectively enlarging the cathode for purposes of deposition. For each layer in the build plan, the layer description is retrieved or loaded in step 2622. The layer description may for example be loaded into a memory accessible to a controller of the electrochemical deposition equipment; this controller may be any type or types of processors. For example, to start object construction, the first layer description 2611 may be loaded or retrieved. The controller may then perform step 2623 to set or confirm the relative position between the anode and the cathode. As layers are successively built, the distance between the anode and the cathode may need to be modified so that the anode distance from the most recently deposited surfaces remains within a range that enables sufficient control of the deposition process. For example, the electrochemical deposition equipment may include an actuator that can move either or both of the cathode and the anode, as illustrated below with respect to FIG. 27. For the first layer, step 2623 may for example involve a "zeroing" procedure that sets the initial relative position between the anode and the cathode to a desired initial value. The specific methods used for zeroing may vary depending on the deposition equipment. For example, in one or more embodiments the controller may move the cathode or anode until one or more sensors indicate contact (or sufficiently close proximity) between the two, and it may then offset a desired distance from this contacting position. In one or more embodiments there may be sensors such as absolute or relative encoders on the position actuator that assist in zeroing.

For layers after the first layer, step 2623 may ensure that the relative position between the anode and cathode is correct to begin deposition of material for the new layer. In some cases this may require modifications to the relative position, for example using an actuator that moves the anode or the cathode. For example, in some situations an object may be constructed by successively depositing material for a layer, then repositioning the cathode relative to the anode to move the cathode away from the anode to prepare for the next layer, and then depositing material for the next layer. In other situations relative movement between the anode and cathode may be performed throughout construction of a layer, sometimes referred to as "gliding," so that no additional repositioning is required at step 2623 when a new layer is loaded.

After a layer description is loaded in step 2622, and the relative position of the cathode and anode is set or confirmed in step 2623, the build process 2620 enters an inner loop 2640 of steps that may be executed to construct the loaded layer. As described above, this loop may be a closed loop with feedback control, so that build steps and process parameters may be modified throughout the loop based on measured feedback signals. Step 2625 may include various actions to deposit material via electrochemical reactions (for example, by passing current through anodes) as well as actions that maintain or adjust the state or health of the anode array and the electrolyte. Illustrative maintenance actions may include for example, without limitation, removal of bubbles from the electrolyte, agitation of the electrolyte to modify flow rates or to modify distribution of ions in the electrolyte, and actions to remove films from anodes or to replenish anode surfaces. Any of these maintenance actions may be interleaved with deposition actions in any desired manner.

At selected times or periodically during the construction of a layer, step 2626 may be performed to obtain feedback signals that may for example indicate how deposition is progressing. One or more embodiments may use any type or types of sensors to obtain feedback signals. For example, in one or more embodiments the current through each anode in an anode array may be measured (for example with a fixed voltage); a higher current may correspond to a lower impedance between the anode and the cathode, which may be correlated with the amount of material deposited on the cathode in the vicinity of each anode. In other embodiments, a variable voltage waveform may be used, and alternating current (AC) signals may be measured. One or more embodiments may use other feedback signals such as optical images of the cathode or distance measurements to points on the cathode. In step 2627 these feedback signals may be analyzed to generate a deposition analysis 2628, which may include estimates of the amount of material deposited at locations within the layer. Based on the deposition analysis 2628, a determination 2629 may be made as to whether construction of the layer is complete. If the layer is complete, and if test 2632 indicates that there are more layers to be constructed, then a next layer is loaded in step 2622 and the layer construction loop 2640 is executed for that next layer; otherwise construction of the object is finished. In some embodiments, the generation of deposition maps may be performed concurrently with the deposition process. For example, additional sensing elements may be incorporated into the fabrication of the anode array to enable continuous characterization of the current flowing through each deposition anode, or the voltage at each deposition anode surface. This could be performed, for instance, by an Analog to Digital converter (ADC) whose inputs are sequentially connected to successive rows of deposition anodes in a multiplexing method similar to that used in the addressing of the anode array.

If test 2629 indicates that deposition for a layer is not complete, then in some situations the deposition analysis 2628 or other data from the feedback signals may be used to modify the parameters and control signals that are used to construct the layer. A test 2630 may be performed to determine whether any adjustments are required. If they are required, then one or more process parameters 2631 may be modified, and this may modify the control signals 2624 that drive the deposition (and maintenance) actions. As one example, if the deposition analysis 2628 indicates that enough material has been deposited in certain areas of a layer, then current may be turned off (or turned down) for anodes corresponding to those areas.

Figure 27:
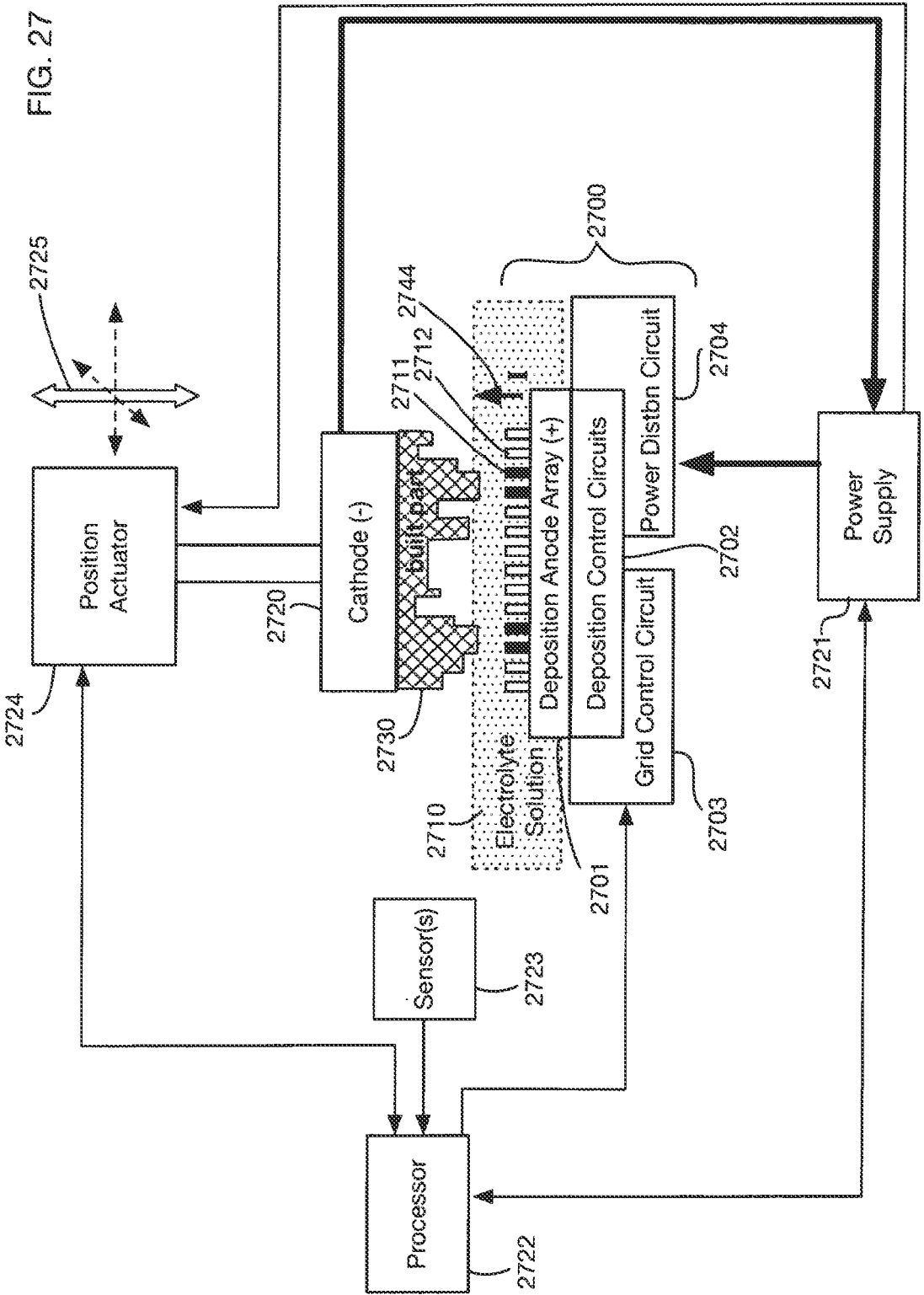
FIG. 27 shows an architectural block diagram of illustrative electrodeposition equipment that may be used to implement one or more embodiments of the invention.

FIG. 27 shows an architectural diagram of illustrative equipment that may be used to perform build steps of one or more embodiments of the invention. The system has a printhead 2700 that contains an array 2701 of deposition anodes, and a corresponding array 2702 of deposition control circuits for the deposition anodes. In one or more embodiments, the deposition control circuits 2702 may be organized in a matrix arrangement, thereby supporting high resolution anode arrays. The deposition anode array 2701 may be organized in a two-dimensional grid; FIG. 27 shows a cross sectional view. A grid control circuit 2703 transmits control signals to the deposition control circuits 2702 to control the amount of current flowing through each deposition anode in anode array 2701. Current flowing through the anodes is provided by a power distribution circuit 2704 that routes power from one or more power supplies 2721 to the deposition control circuits and then to the anodes. Printhead 2700 may also contain other elements such as insulation layers, for example to protect elements of the printhead from the electrolyte solution.

The deposition anode array 2701 of printhead 2700 may be placed in an electrolyte solution 2710. Electrochemical reactions may then cause plating of metal onto a manufactured part 2730 that is coupled to cathode 2720. Intricate and detailed shapes may be built in part 2730 by modifying the current flowing through each anode of deposition anode array 2701. For example, in the snapshot shown in FIG. 27, anode 2711 is energized, so that metal is being deposited onto part 2730 near this anode, but anode 2712 is not energized so no metal is being deposited near that anode.

In one or more embodiments, printhead 2700 may be integrated with a processor 2722. This processor may transmit signals to grid control circuit 2703, which sends signals to the individual deposition control circuits 2702 to turn anodes in deposition anode array 2701 on or off (or to modify the intensity of current flow through each anode). Processor 2722 may be for example, without limitation, a microcontroller, a microprocessor, a GPU, a FPGA, a SoC, a single-board computer, a laptop, a notebook, a desktop computer, a server, or a network or combination of any of these devices. Processor 2722 may be the same as or different from a processor or processors that analyze an object model to construct a build plan. Processor 2722 may communicate with one or more sensors 2723 that may generate the feedback signals that measure the progress of metal deposition on part 2730. Sensors 2723 may include for example, without limitation, current sensors, voltage sensors, timers, cameras, rangefinders, scales, force sensors, or pressure sensors. One or more of the sensors 2723 may also be used to measure the distance between the cathode and the anode, for example for zeroing to begin manufacturing an object, or to set or confirm the relative position between the anode and cathode at the beginning of each layer. The accurate positioning of the build plate relative to the electrode array at the initialization of the deposition process may have a significant impact on the success and quality of the completed deposit. Embodiments may use various types of sensors for this positioning, including for example, without limitation, mechanical, electrical, or optical sensors, or combinations thereof. In one or more embodiments, mechanical sensors such as a pressure sensor, switch, or load cell may be employed, which detects when the build plate is moved and reaches the required location. In one or more embodiments, portions of the system may be energized, and the cathode may be moved to proximity to the energized component at a known location. When a voltage or current is detected on the cathode or build plate the build plate may be known to be at a given location. One or more embodiments may use other types of sensors that detect for example capacitance, impedance, magnetic fields, or that utilize the Hall Effect to determine the location of the cathode/build plate relative to a known position. One or more embodiments may use optical sensors such as laser rangefinders or sensors that detect interference with an optical path.

Either or both of cathode 2720 and printhead 2700 may be attached to one or more position actuators 2724, which may control the relative position of the cathode and the deposition anode array. Position actuator 2724 may control vertical movement 2725, so that the cathode may be raised (or alternatively the anode lowered) as the part 2730 is built in successive layers. In one or more embodiments position actuator 2724 may also move the cathode or deposition anode array horizontally relative to one another, for example so that large parts may be manufactured in tiles.

Printhead 2700 may be connected to a power supply (or multiple power supplies) 2721, which supplies current 2744 that flows through the deposition anode array to drive metal deposition on part 2730. Current may be distributed throughout the array of deposition control circuits via power distribution circuit 2704, which may for example include one or more power busses.

In one or more embodiments, the system may also include a fluid chamber to contain the electrolyte solution (not shown in FIG. 27), and a fluid handling system (also not shown). The fluid system may include for example a tank, a particulate filter, chemically resistant tubing and a pump. Analytical equipment may enable continuous characterization of bath pH, temperature, and ion concentration using methods such as conductivity, High Performance Liquid Chromatography, mass spectrometry, Cyclic Voltammetry Stripping, spectrophotometer measurements, or the like. Bath conditions may be maintained with a chiller, heater and/or an automated replenishment system to replace solution lost to evaporation and/or ions of deposited material.

Although the system shown in FIG. 27 has a single array of deposition anodes, one or more embodiments may incorporate multiple deposition anode arrays. These multiple anode arrays may for example operate simultaneously in different chambers filled with electrolyte solution, or they may be tiled in a manner where the anode arrays work together to deposit material on a shared cathode or series of cathodes.

Figure 28:
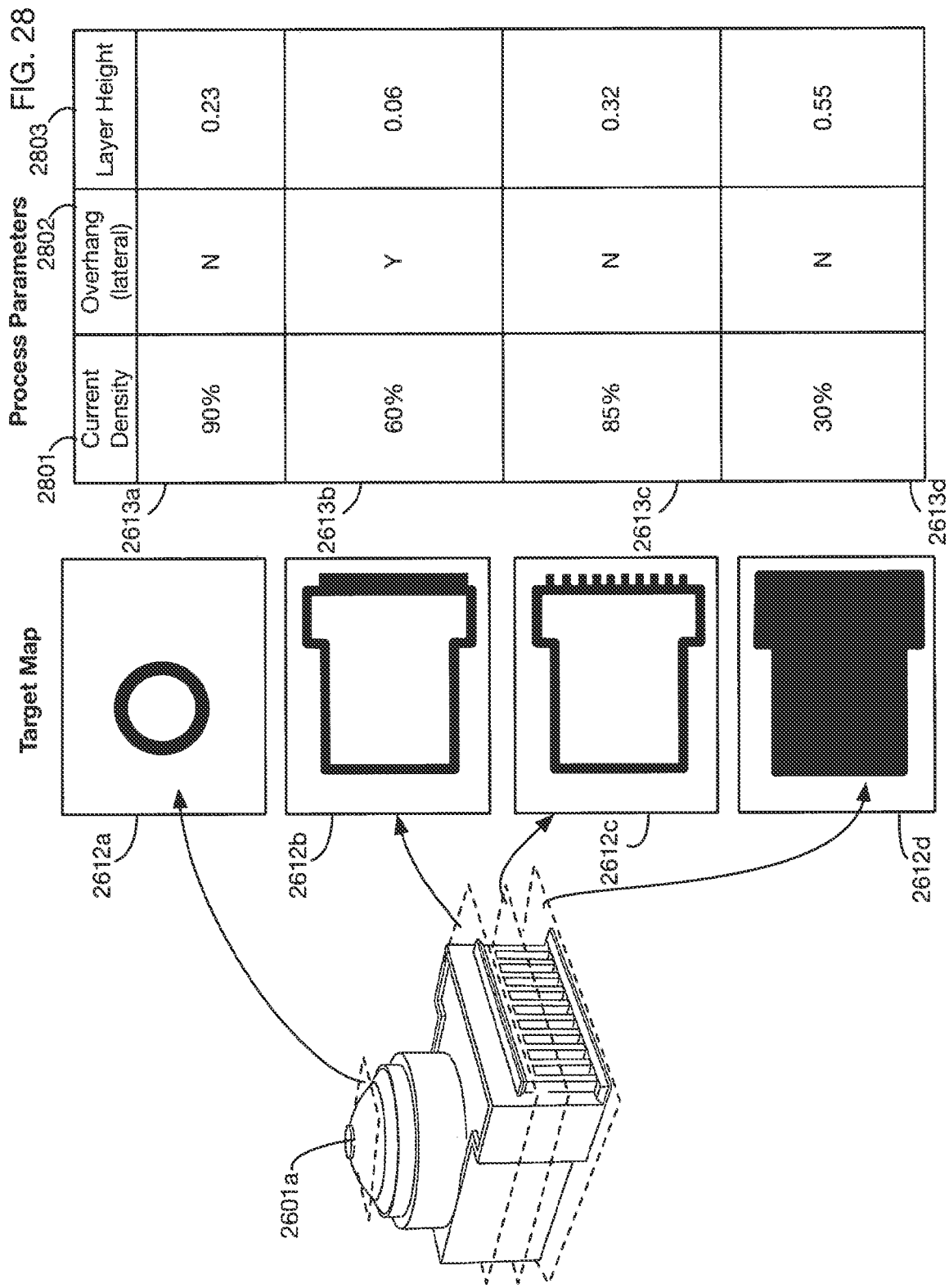
FIG. 28 shows an illustrative build plan for layers of an object, with target maps for each layer showing desired areas of deposited material, and process parameters describing how the layer is to be manufactured.

FIG. 28 shows illustrative elements of a build plan for an object with an object model 2601*a*. The object model 2601*a* may be for example a 3D CAD model, or any description of the geometric or material properties of an object. The build planning process may slice this model into layers, and may develop a layer description for each layer. FIG. 28 shows four illustrative layers, each of which corresponds to a horizontal slice through model 2601a. Build plans may have any number of layers and slices may be of any desired thickness, shape, and orientation. Associated with each layer is a layer description that includes a target map, and one or more process parameters. The four layers shown in FIG. 28 have target maps 2612a through 2612d, and process parameters 2613a through 2613d, respectively. The target map may for example be a two-dimensional image that shows where material is to be deposited in the layer. In FIG. 28 the target maps are shown with black pixels indicating that material is to be deposited at the corresponding layer position, and white pixels indicating that no material is to be deposited. In one or more embodiments the target map may have non-binary values at positions; for example, target maps may be described as grayscale images. In one or more embodiments, target maps may have additional information such as the type of material or materials to be deposited at each location.

FIG. 28 shows three illustrative process parameters 2801 through 2803 for each layer. One or more embodiments may associate any number of process parameters with layer descriptions. A process parameter may describe any factor that affects the manufacturing of a layer or that affects any maintenance activities to be performed. Illustrative parameter 2801 defines the current density that may be set to construct the layer, which is specified for example as a percentage of the maximum current density supported by the manufacturing equipment. Illustrative parameter 2802 indicates whether a layer may require lateral deposition of material. This parameter may be based on whether the build planning system detects overhangs, as described below with respect to FIG. 30. For layers that do not require lateral deposition, in one or more embodiments the manufacturing system may reposition the cathode vertically relative to the anode throughout the manufacturing of the layer, so that deposited material remains at a relatively fixed distance from the anode as it accumulates on the layer; this "gliding" movement may for example reduce the chance of short-circuits developing between the anode and the cathode. Illustrative parameter 2803 is the target height of the layer. In some situations the layer height may be higher on initial layers (such as layer 2612d) to allow for easier bubble clearing. Layers with overhangs (such as layer 2612b) may have lower heights to allow them to build with more dimensional stability, for example.

Process parameters for a layer may also include the target output from each anode in the anode array when constructing the layer. In simple situations this output may match the target map for the layer: anodes may be turned on if they are in the position where material is to be deposited, and turned off otherwise. In other situations the relationship between anode output and the target map may be more complex, as illustrated for example below with respect to FIGS. 36A, 36B, 36C, 37A and 37B.

Figure 29:
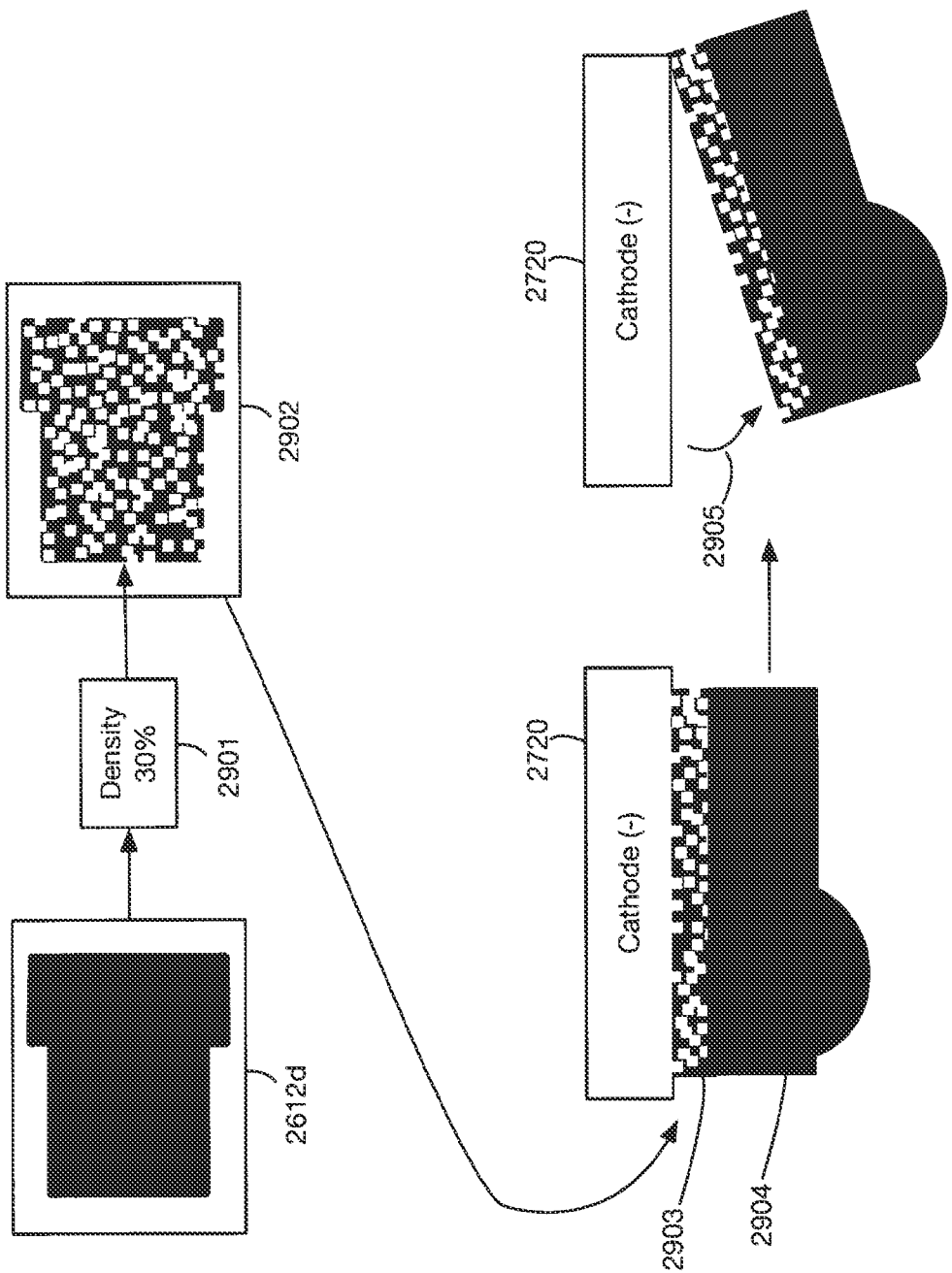
FIG. 29 illustrates density manipulation to generate a porous base layer that facilitates part removal.

FIG. 29 illustrates density manipulation on the base layer 2612d of object 2601a. This layer is added first to the cathode, and other layers are then constructed on top of the base layer. For a base layer (or a set of base layers) in particular, it may be beneficial to reduce the layer density to make the layer porous. The porosity of the layer may make it easier to remove the object from the cathode after manufacturing is complete. Density may be reduced by manipulating the target map to reduce the number of pixels where material is to be deposited. For example, deposition may be turned off at random positions with a probability equal to 100% less the target density. In FIG. 29, the density 2901 parameter is applied to the original target map 2612d to generate a modified target map 2902, where 70% of the pixels of the original target map have been turned off ("off" pixels are shown as white in the image). This modified target map 2902 results in base layer 2903 deposited onto cathode 2720 (shown as a vertical cross section in FIG. 29). Additional layers 2904 are constructed on top of the base layer to form the complete part. Removal 2905 of the part from the cathode 2720 may be facilitated by the porosity of the base layer 2903.

Figure 30:
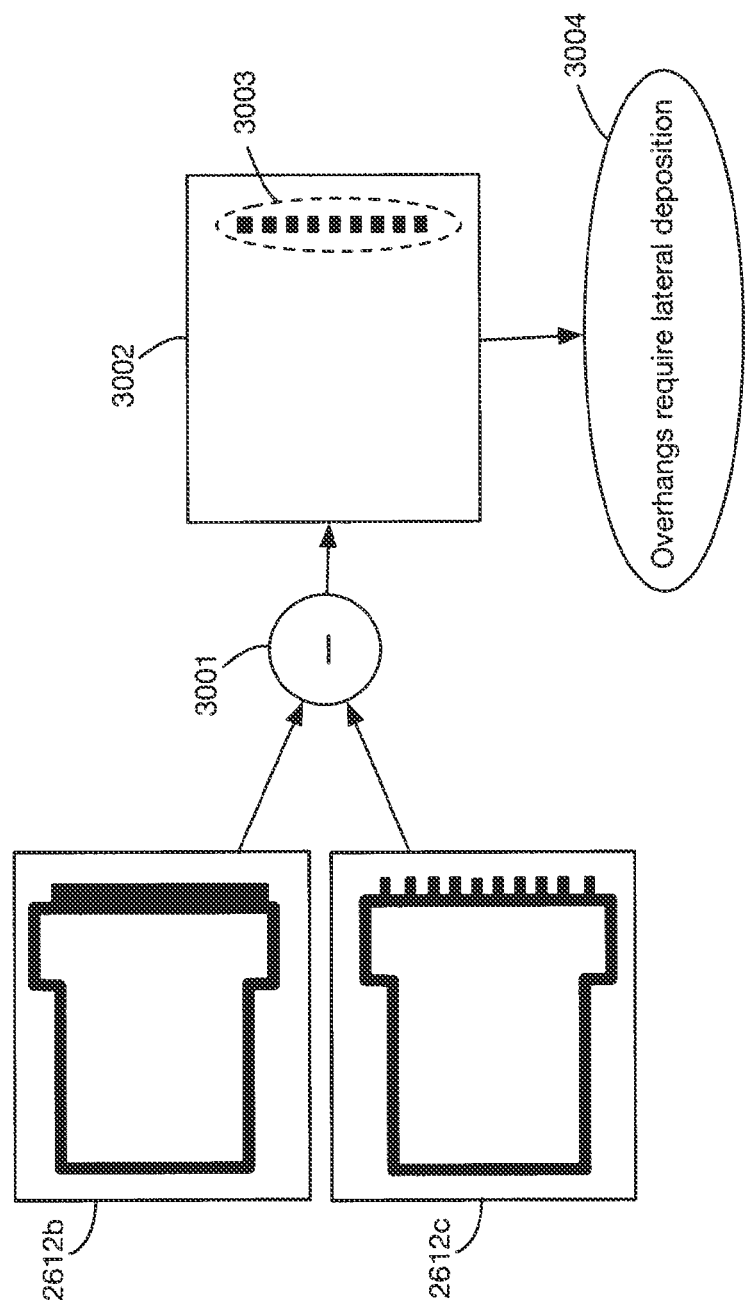
FIG. 30 illustrates detection of an overhang in a layer.
Figure 31:
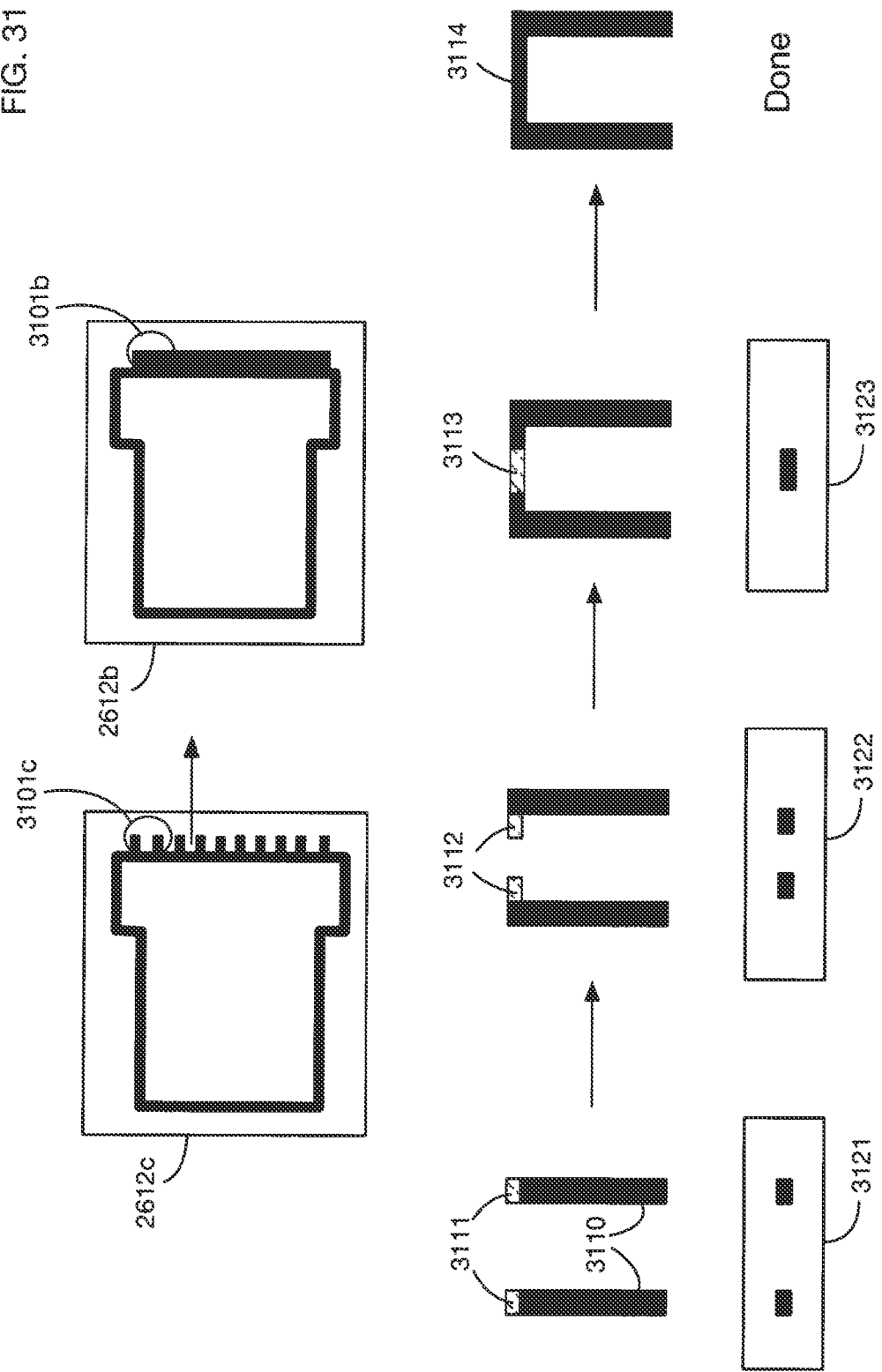
FIG. 31 illustrates manufacturing steps for the overhang detected in FIG. 30.

FIGS. 30 and 31 show illustrative build planning and manufacturing for a layer that has significant overhang. Overhangs are features that extend horizontally without material to support them in the layer below. In traditional 3D printing with plastics, supports must often be added explicitly to support these overhangs, and then removed in a post-production step. For electrochemical additive manufacturing, many overhangs can be constructed directly, without supports, since metal ions can accumulate laterally and fuse to the overhang structure with sufficient strength that underlying supports may be unnecessary. FIG. 30 illustrates how overhangs may be identified in one or more embodiments. The target map 2612b of a layer may be compared to the target map 2612c of the layer underneath (or to several such layers), for example with a differencing operation 3001. This comparison yields a delta map 3002, which shows areas 3003 where material is being added without material below. If the size of these areas within 3003 are sufficiently large, the build planning system may make a determination 3004 that the overhangs require special processing such as lateral construction, as illustrated in FIG. 31. FIG. 31 shows illustrative steps to manufacture a small portion 3101b of the overhang of layer 2612b above area 3101c in the layer 2612c below. This portion 3101b is effectively a "bridge" that rests on two supporting columns below. The columns 3110 have been constructed in previous layers, with the top of these columns corresponding to region 3101c of target map 2612c. Construction of the bridge proceeds in three illustrative sub-steps within layer 2612b. First, material 3111 is added on top of columns 3110; this sub-step corresponds to a subset 3121 of the target map 2612b. Second, material 3112 is added laterally out from the columns, corresponding to a subset 3122 of the target map 2612b. Third, material 3113 is added laterally in the middle, corresponding to a subset 3123 of the target map 2612b, resulting in final structure 3114. The number of lateral build steps required may vary based for example on the size of the overhang and on the binding strength of the material.

In one or more embodiments, overhang processing may also include reducing the height of layers in the regions of overhangs in order to achieve the deposit required. This may be done for example by changing the layer height to make the overhang distance match some ratio of the pixel pitch. For example, with a 45 degree overhang and a pixel pitch of 50 um, the layer height may be set to 50 um, which will cause the overhang distance to be 50 um (1 pixel width). On a 60 degree overhang, the layer height would be ~29 um in order to have an overhang distance of 50 um. These two examples show a 1:1 ratio, where the overhang distance is increased by 1 pixel per layer. For a 2:1 ratio, the layer heights would be doubled, resulting in an overhang distance of 100 um or 2 pixels for each layer. This may be done because it results in a more stable and consistent build of the overhang regardless of overhang angle.

Figure 32:
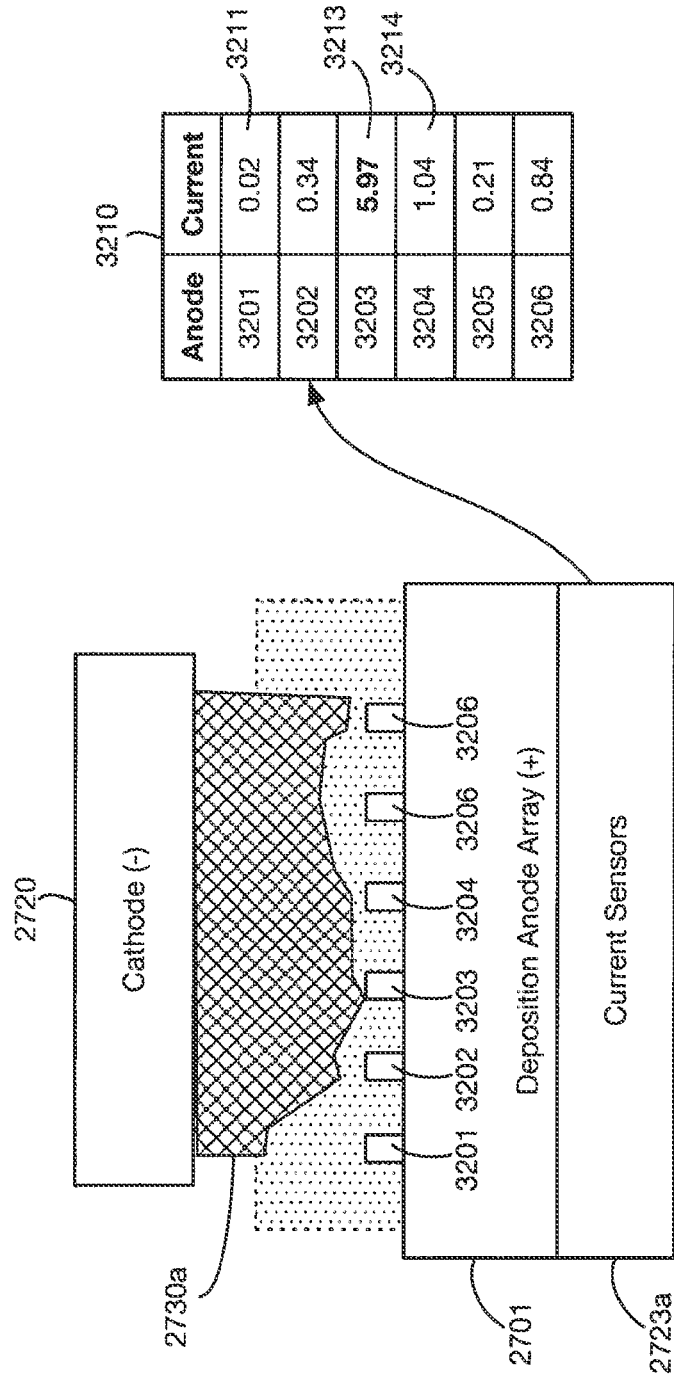
FIG. 32 shows an illustrative embodiment of feedback using current sensors across the anode array.

FIGS. 32 through 35 show illustrative feedback signals and analysis of these feedback signals to determine whether a layer is complete or to modify process parameters for layer manufacturing. FIG. 32 shows an illustrative method of feedback based on current sensors 2723a that may for example be connected to the anodes of the deposition anode array 2701. Current sensors may be used to estimate the extent of deposition proximal to each anode in the anode array, since the impedance between an anode and the cathode may vary based on the proximity of the anode to the deposited conductive material on the cathode. For example, anodes may be set to a known voltage, and the current flowing from each anode may then be inversely proportional to this impedance. FIG. 32 shows illustrative anodes 3201 through 3206, and an illustrative part 2730a that has been partially constructed. Current sensors 2723a measure currents 3210 through each anode. For anode 3203, the anode has formed a short-circuit with the deposited material; thus the measured current 3213 is very high. For anode 3204, the anode is very close to the deposited material, but is not quite short-circuited, so the measured current 3214 is below the level 3213 of the short-circuited anode 3203. Anode 3201 is far from the deposited material, so the measured current 3211 is very small.

Figure 34A:
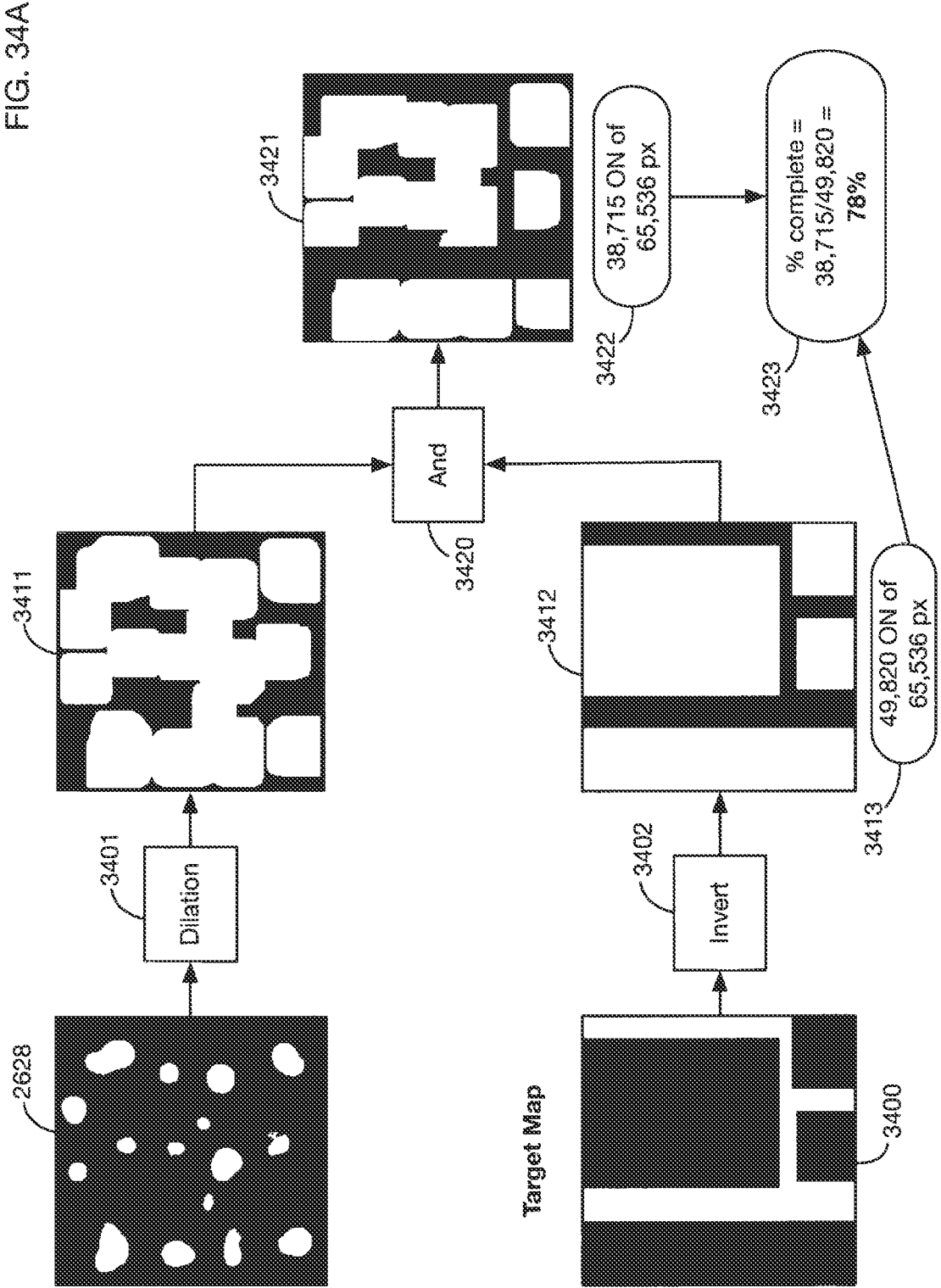
FIG. 34A shows an illustrative method to test for layer completion based on the current sensor data of FIG. 33.
Figure 34B:
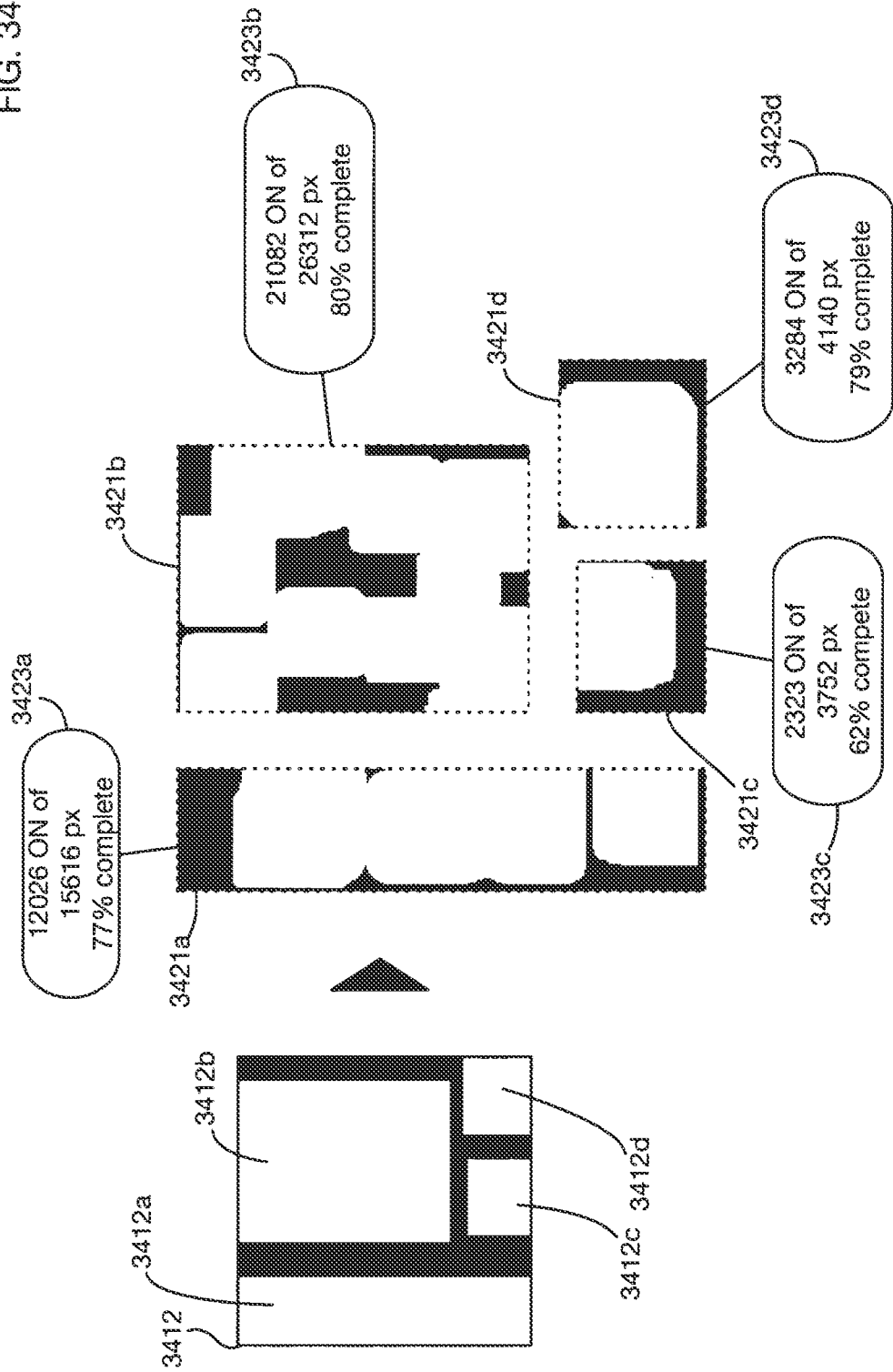
FIG. 34B shows an extension of the layer completion test of FIG. 34A, which tests separately for completion of all connected components of the layer.

In one or more embodiments, the feedback signals such as current sensor data 3210 may be processed further to generate an analysis of the extent of deposition at locations within the part. This processing may for example be based on known or estimated relationships between the extent of deposition and the feedback signals. FIG. 33 shows an illustrative analysis of a two-dimensional map 3301 of current measured by current sensors 2723a. In this map 3301, brighter pixels correspond to higher measured current. Analysis 2627 of the current map 3301 may for example apply a thresholding operation 3302 to select pixels that exceed a specified current level, resulting in preliminary deposition analysis 2628. This illustrative deposition analysis 2628 is a binary image, with white pixels showing regions of high deposition and black pixels showing regions of lower deposition. Thresholding operation 3302 is illustrative; one or more embodiments may analyze feedback signals 3301 in any desired manner to generate a deposition analysis. The deposition analysis 2628 may then be used to make determination 2629 of whether deposition of a layer is complete, and determination 2630 of whether modifications to any process parameters are needed for continued construction of a layer. FIGS. 34A and 34B show an illustrative analysis 2629 to determine layer completeness, and FIG. 35 shows an illustrative analysis 2630 of how to modify process parameters.

FIG. 34A shows an illustrative process to compare deposition analysis 2628 to a layer target map 3400 to determine whether manufacturing of the layer is complete. The target map 3400 indicates where material should be deposited in the layer, with black pixels corresponding to material and white pixels corresponding to no material. The deposition analysis 2628 shows areas of high current, which may for example indicate areas of short circuits where the anode and deposited material are in contact or are very close. In one or more embodiments, the deposition analysis 2628 may be further processed to form an estimate of where material has been deposited in the layer. For example, image 2628 may be modified using any transformations including for example, without limitation, morphological filters, linear or nonlinear filters, or Boolean operations. Illustrative operation 3401 shown in FIG. 34A is a dilation operation (which is a morphological filter); this operation expands regions of white pixels by adding pixels out from the region boundaries. The resulting modified map 3411 may provide an improved indicator of where deposition has occurred, since for example locations close to short-circuited anodes may also have high levels of deposition. This modified map 3411 may then be compared to the target map to determine the extent to which the estimated deposition matches the desired deposition for the layer. First the target map 3400 may be inverted in operation 3402, so that in both the resulting inverted target map 3412 and the modified deposition analysis 3411 the white pixels correspond to deposition locations. A count 3413 of the white ("on") pixels in inverted target map 3412 indicates how many positions in the layer should receive deposited material. The modified deposition map 3411 and the inverted target map 3412 may then be ANDed in operation 3420; the resulting map 3421 shows the pixels that correspond to positions that should have deposited material (according to the target map) and that do have deposited material (according to the deposition analysis). The count 3422 of white ("on") pixels in 3421 may then be compared to the count 3413 of desired "on" pixels; the ratio of these values 3423 is a percentage of completion measure for the layer. In one or more embodiments, this completion percentage ratio may be compared to a threshold, and the layer may be considered complete when the threshold percentage is reached or exceeded. The operations 3401, 3402, and 3420 shown in FIG. 34A are illustrative; one or more embodiments may apply any transformations or operations to the deposition analysis 2628 or the target map 3400 to determine whether a layer is complete, including but not limited to morphological operations such as 3401 or Boolean operations such as 3402 and 3420.

One potential limitation of the method illustrated in FIG. 34A is that it is possible for the overall completion percentage for a layer to be high, while completion may be low for specific subregions of the layer. In some situations it may be important that subregions of the layer all be completed to a high percentage. FIG. 34B shows an illustrative extension of the method of 34A that applies a completion threshold to subregions. In one or more embodiments, subregions may be defined in any desired manner. For example, a layer may be divided into a regular grid of tiles of any resolution, and completion criteria may be applied to each tile. FIG. 34B illustrates an approach that divides the target map into "islands" of connected components, and that applies completion criteria separately to each island. Target map 3412 (inverted as in FIG. 34A so that white pixels correspond to desired deposition) has four islands 3412a through 3412d; each island is a connected component and different islands are not connected. The modified deposition analysis map 3411 is partitioned into these island regions, resulting in four deposition analyses 3421a through 3421d, corresponding to the islands 3412a through 3412d. Within each of these island deposition analyses, the percentage of white ("on") pixels indicates the level of completion of deposition within the associated island. These individual island completion percentages 3423a through 3423d may then be analyzed to determine whether the layer is complete. For example, a threshold may be applied to each of the island completion percentages, and the layer may be complete only when all of the islands meet or exceed this threshold. In one or more embodiments, different completion criteria may be applied to different islands, and the overall layer may be complete only when each island meets its respective completion criterion.

In one or more embodiments, completion criteria for a layer or for individual islands may be based on other factors instead of or in addition to a percentage of completion of desired deposited pixels. For example, a layer or an island may be considered complete if all or a certain number or fraction of pixels within the layer or island where deposition is desired are within a specified threshold distance of one or more deposited pixels. The set of pixels where deposition is desired, and the set of pixels where deposition has occurred (to a desired level of completion) may be determined as described above. In some embodiments, elapsed time of deposition, charge used for deposition, overall current, and/or impedance between the electrodes may be used as part of the determination whether a layer is done.

FIG. 35 shows an illustrative example of how the deposition analysis 2628 may be used to adjust process parameters during the construction of the associated layer until the layer is determined to be complete. As for completion analysis, the deposition analysis 2628 may first be transformed using any type of filters or operations. FIG. 35 shows an erosion operation 3501 applied to the deposition analysis 2628 to generate a modified deposition analysis 3502. This erosion operation 3501, which is an example of a morphological filter, shrinks regions of white pixels by removing pixels from region boundaries. The resulting map 3502 therefore may represent a more conservative estimate of where deposition has occurred. The erosion operation 3501 is illustrative; one or more embodiments may apply any type of transformation to deposition analysis 2628, including for example, without limitation, morphological filters, linear or nonlinear filters, or Boolean operations. Modified map 3502 may then be inverted in operation 3503 to yield map 3504, where the black pixels correspond to the eroded regions of deposition, and the white pixels correspond to locations with potential lack of sufficient deposition. This map 3504 may then be ANDed with the inverted target map 3412, yielding a map 3506 that may be used to modify the process parameters for further construction of the layer. In this map 3506, white ("on") pixels correspond to locations where deposition is desired but may not yet be sufficiently complete. This map may therefore be used to set the outputs 3507 of the anodes in the anode array, so that deposition continues for anodes that correspond to the "on" pixels of map 3506. Anode outputs may be set for example by setting anode currents 3511, by setting anode voltages 3512, or by setting anode duty cycles 3513, or by using a combination of these methods.

FIG. 35 illustrates feedback control that generates essentially binary control signals for anodes, such as map 3506. Anodes may then be turned on or off based on these control signals. In one or more embodiments, anode control (or control of any other process parameters) may use non-binary control signals; for example, anode currents may be varied continuously from zero to a maximum value based on analysis of the feedback signals.

Although use of high resolution anode arrays may provide fine control of deposited material, in some situations the pattern of deposition of material onto the cathode may not correspond precisely to the pattern of anode outputs. One or more embodiments may therefore adjust the anode outputs by pre-processing the target map to account for these effects. FIGS. 36A, 36B, 36C, and 37A illustrate this process using a one-dimensional model of anode arrays for ease of presentation. Similar concepts may be applied in one or more embodiments to two-dimensional anode arrays; an example in two dimensions is shown in FIG. 37B.

Figure 36A:
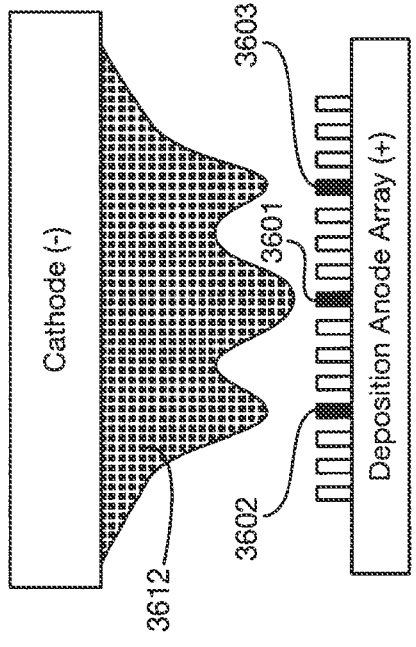
FIGS. 36A, 36B, and 36C illustrate a potentially complex relationship between anode currents and deposited material, which may require pre-processing to obtain the desired deposition pattern.
Figure 36B:
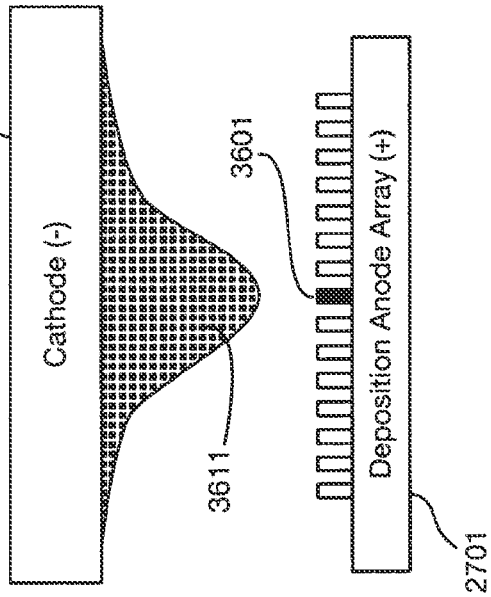
Figure 37A:
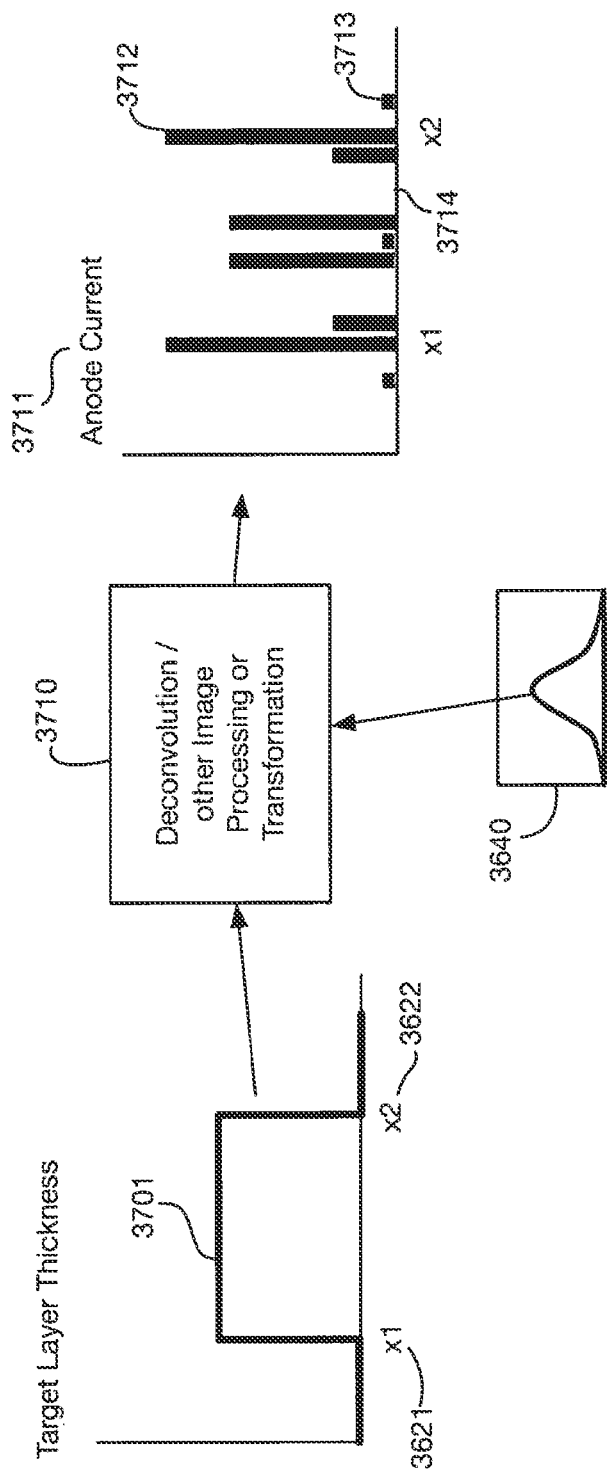
FIG. 37A illustrates calculation of anode currents to obtain a desired deposition pattern.

FIG. 36A shows illustrative deposition 3611 onto cathode 2720 when only a single anode 3601 of anode array 2701 is energized. In some environments, material may be deposited onto the cathode at positions that are not directly across from the energized anode. For example, deposition 3611 may occur in an approximately Gaussian pattern that is centered across from an energized anode, and that spreads out laterally from this center. FIG. 36B shows an illustrative deposition pattern 3612 when multiple anodes 3601, 3602, and 3603 are energized. In this scenario, the deposition pattern may be approximately the sum of the deposition patterns from each of the individual anodes 3601, 3602, and 3603. In particular, FIG. 36B illustrates that deposition may be higher at the center (across from anode 3601) than at the edges, due to the additive effects from all three of the anodes.

Figure 36C:
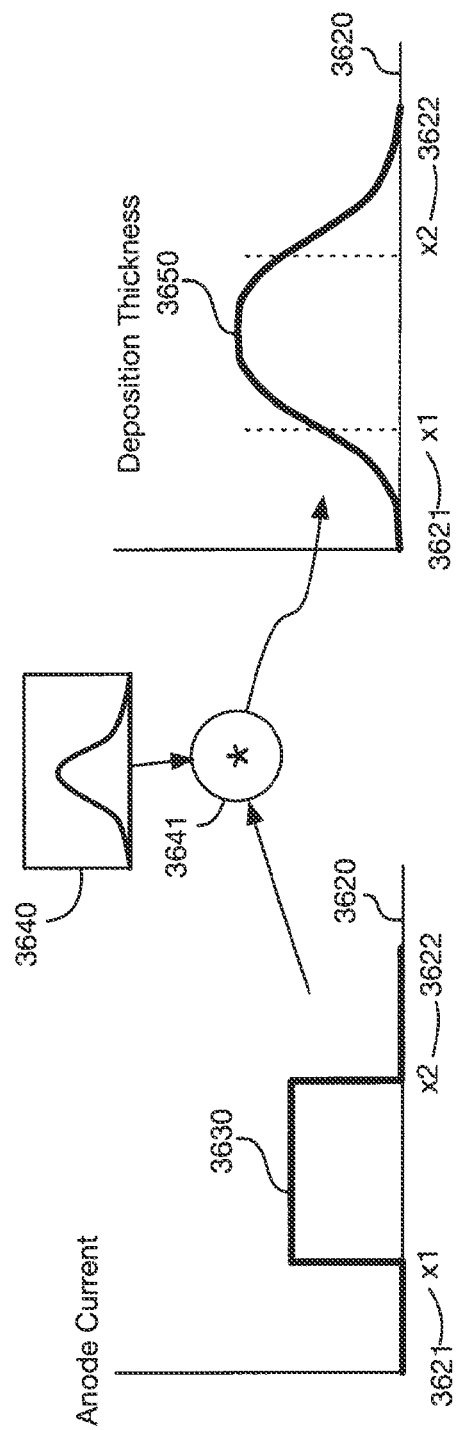

If deposition patterns from individual anodes combine additively, the general effect of the phenomena shown in FIGS. 36A and 36B may be to modify the pattern of anode outputs via a convolution 3641 with a point spread function 3640 that describes the spread of deposition from a single anode point source. FIG. 36C shows an illustrative pattern 3630 of anode current that is constant within a range from 3621 to 3622, and zero outside this range. Because of convolution 3641, the actual deposition thickness will not match the input shape 3630, but instead will have shape 3650 with higher accumulation in the center, and with some deposition extending beyond the bounds 3621 and 3622. Effectively the sharp corners of the anode current pattern 3630 are smoothed by the effects shown in FIGS. 36A and 36B. One or more embodiments may therefore modify the anode currents to account for this convolution 3641 or for other effects that distort the deposition pattern. FIG. 37A shows an illustrative approach that may be used in one or more embodiments. Based on a target map 3701 that describes the target thickness of a layer as a function of position, the build planning process may perform a deconvolution 3710 or other transformation to reverse the effects of the distortion illustrated in FIGS. 36A through 36C. For example, target map 3701 with a constant thickness between bounds 3621 and 3622 may be deconvolved to an anode current pattern 3711. To compensate for the dispersive effects of the deposition point spread function, the illustrative anode current has a higher value 3712 at the edges, and some anodes such as 3714 within the central region of the rectangular pattern may be turned off entirely. In addition, some anodes such as anode 3713 may have nonzero currents even if they are outside the bounds 3621 and 3622. These effects are illustrative; one or more embodiments may generate any desired anode current pattern 3711 to achieve the desired layer thickness pattern 3701. Transformations 3710 may include any deconvolution methods or any other function transformation or image processing methods. These transformations may be based on any measurements or models of the deposition process, including for example a point spread function 3640 that describes how anode currents are mapped to deposition patterns.

FIG. 37B shows a two-dimensional example of transformation of a target map into a desired anode current pattern. Target map 3720 shows areas of desired deposition (in black) for a particular layer of a part build. As described above, transformations 3710, which may for example include deconvolution or any other type of image processing, may be applied to this target map 3720 to generate a pattern 3730 that indicates the anode current pattern that may be generated to achieve the desired deposition. In this example, anodes are turned on for the anodes that correspond to anodes with desired deposition, and additional anodes (shown as cross-hatched regions) are turned on around the edges and the corners of the deposition area. For example, edge anodes are turned on around each outer edge, such as anodes 3731 along the top edge, and additional anodes are turned on around the corners, such as anodes 3732 around the top right corner. Turning on these additional edge and corner anodes helps to shape the field of current to drive deposition of material more evenly at the corresponding edges and corners of target map 3720.

One or more embodiments may also modify anode currents over time in a preprogrammed or adaptive pattern, as illustrated in FIG. 38. For example, in one or more embodiments, subsets of anodes may be successively switched on and off during the manufacturing of a layer. This alternation may for example compensate for potential depletion of metal ions in the electrolyte that might occur if anodes output a constant current throughout the construction of a layer. It may also prevent formation of bubbles in the electrolyte. In the example shown in FIG. 38, target map 2612e has a square central area 3801 where material is to be deposited. Instead of constantly emitting current from all of the anodes that correspond to this region 3801, one or more embodiments may alternate current from two subregions 3811 and 3812, which partition the region 3801 into a checkerboard pattern. During phase 3821, anodes in region 3811 emit current 3831, and anodes in region 3812 are switched off; during phase 3822, anodes in region 3811 are switched off, and anodes in region 3812 emit current 3832. This alternation may for example allow ions 3810 in the electrolyte to diffuse into the regions adjacent to the switched-off anodes so that these regions are not depleted. The checkerboard pattern of regions 3811 and 3812 is illustrative; one or more embodiments may divide anodes into any number of regions of any shape and size, and may switch anodes of these regions on and off in any desired pattern with any desired duty cycles.

Figure 39:
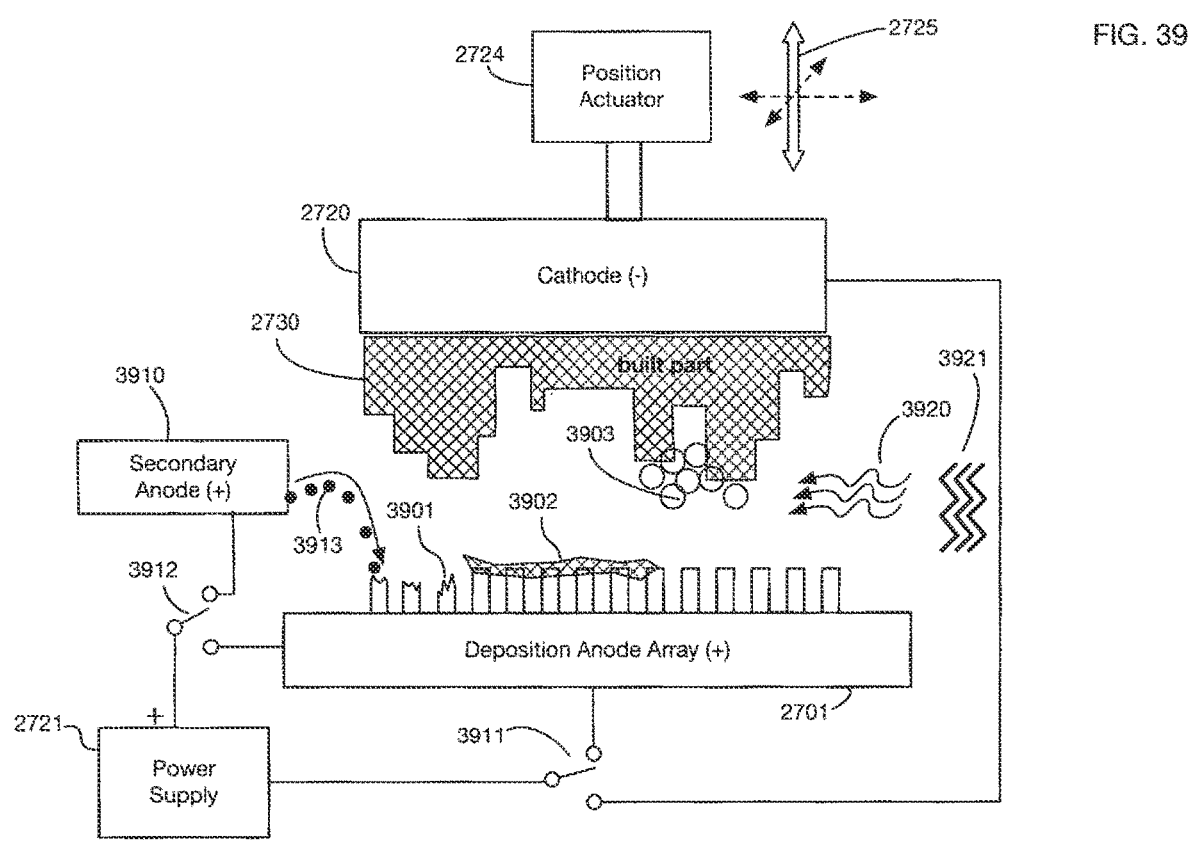
FIG. 39 shows illustrative maintenance actions that may be performed during layer manufacturing to address issues in the anode array or the electrolyte.

FIG. 39 shows illustrative maintenance actions that may be performed during the manufacturing process in one or more embodiments. These actions may for example be interleaved with deposition, or they may be performed between manufacturing of layers. The actions shown are illustrative; one or more embodiments may perform any desired maintenance activities at any point in the manufacturing process. FIG. 39 shows three illustrative issues that may arise during manufacturing that may require maintenance activities. First, anodes in the anode array 2701 may erode, such as anode 3901, and may need to be replenished or resurfaced. Second, films such as film 3902 may form over anodes and prevent them from effectively driving deposition onto the cathode. Third, bubbles such as 3903 may form in the electrolyte between the anode array and the deposited material 2730.

Over time, anodes such as anode 3901 may erode, even if anodes are constructed of a largely insoluble material. One or more embodiments may periodically or as-needed reverse this erosion using a secondary anode 3910. The deposition process may for example be paused and the power supply 2721 may be reversed using switches 3911 and 3912, so that the anode array temporarily acts as a cathode, and the secondary anode 3910 acts as the anode. Current flowing from the secondary anode 3910 may then cause material 3913 to flow from the secondary anode to the eroded anodes in array 2701. The secondary anode 3910 may for example be a large bulk anode that is composed of an inert material like platinum. The secondary anode may be composed of the metal that is used for electrodeposition, such as copper for example; this metal will dissolve and plate onto the anodes of anode array 2701 without depleting the metal in the electrolyte solution. When the switches 3911 and 3912 are reversed again, the metal plated onto the anode array then plates onto the cathode.

In some cases, target deposition material (such as copper from a copper electrolyte bath) may end up plated onto a surface of the electrode array as a film 3902. This film of target material may bridge between multiple deposition electrodes and may impact their ability to be individually addressed. A film may be detected from the feedback signals, for example when a group of adjacent anodes shows an abnormally high current. A film may be removed for example by moving cathode 2720 far away from the anode array and activating the anodes covered by the film. This action dissolves the film while not causing an unintended deposit on the cathode.

During electrolysis, bubbles 3903 may form in the space between the anode array 2701 and the part 2730. Bubbles may be removed for example by manipulating or modifying the flow 3920 of electrolyte, for example with pumps or agitators, or by inducing vibrations 3921 in the electrolyte to dissipate the bubbles. Vibrations may be introduced into the electrolyte using a vibration oscillator in contact with the electrolyte, or by vibrating the cathode, anode array, or reaction chamber. Flow manipulation may also include purposefully increasing the distance between the build and the anode array to allow for greater fluid flow and/or bubble removal, while either keeping the anodes energized or de-energized until the flow manipulation is complete.

In one or more embodiments, all or portions of the feedback signals, control parameters, and deposition analyses measured or generated throughout a build of a part may be maintained as quality control records. This data may be used for any or all of several purposes, including for example facilitating or eliminating part inspections, supporting certification of parts or manufacturing processes, and post-mortem analysis of part failures or part performance issues. In addition to providing detailed tracing for the specific manufacturing steps and parameters used for each part, this quality control data may be aggregated across parts, lots, or facilities and used for statistical process control and for continuous process improvement. For example, data on part performance in the field (such as failure rates or part lifetimes) may be correlated with the part quality control data to discover correlations between process parameters and part performance; these correlations may then be used to improve future part build processes. In one or more embodiments, machine learning techniques or other artificial intelligence techniques may be used to automatically discover relationships between build record information and part performance. For example, analysis of large numbers of parts and their associated quality control records may show that a lower current density for particular types of layers results in higher part failures; a manufacturer may use this type of information to modify build processes to reduce future failure rates. When relationships between build parameters and part performance are discovered, the database of build quality information for parts may be used to predict failures for previously built parts, allowing them to be potentially recalled or replaced prior to failure.

Figure 40:
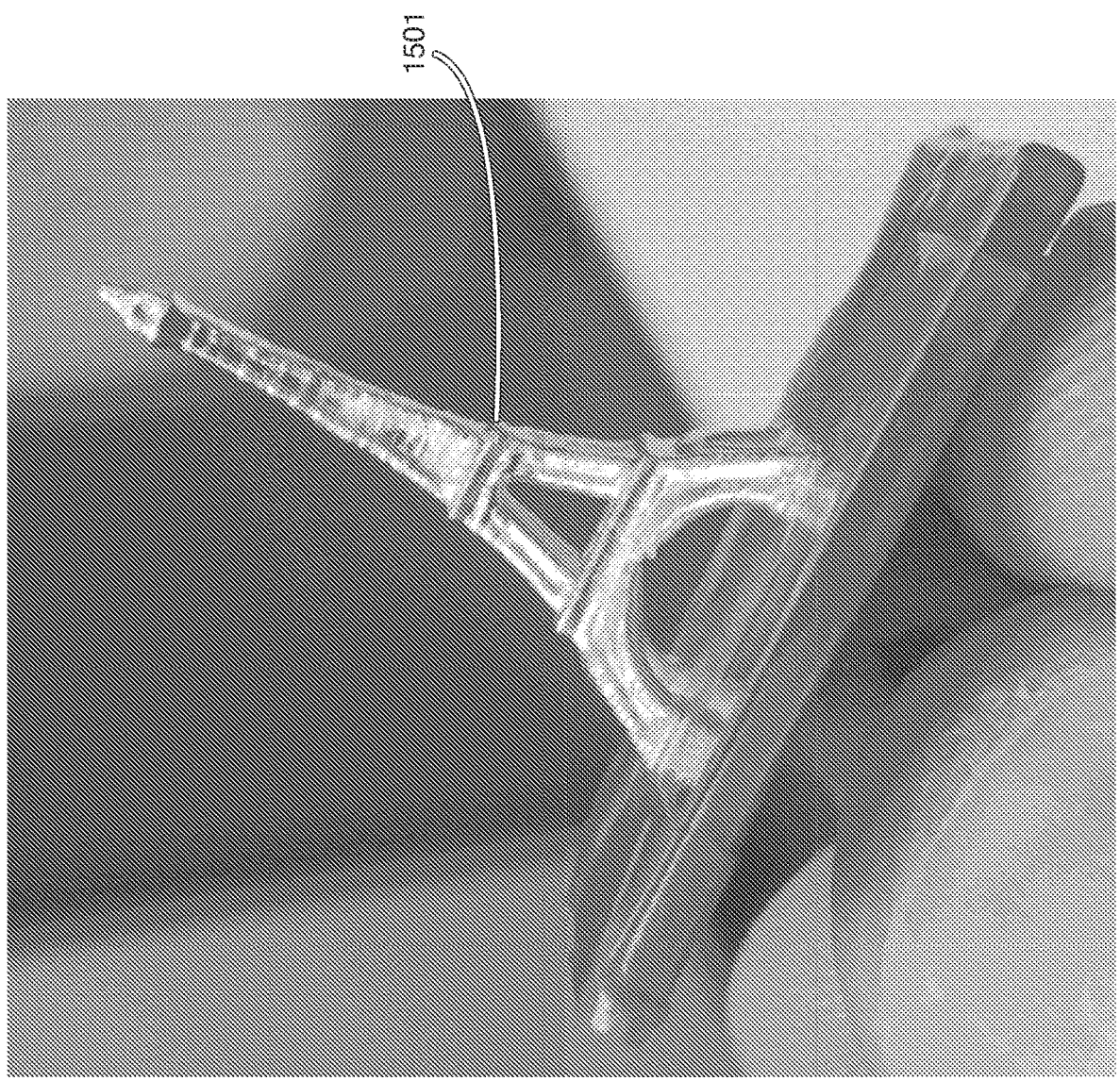
FIG. 40 shows an illustrative part manufactured using an embodiment of the invention.

FIG. 40 shows an illustrative part 4001 that was manufactured using an embodiment of the invention. Feedback control of the manufacturing process using techniques described above enables the extremely fine resolution and high quality of this completed part.

In electrochemical 3D printing it is important to detect when a deposition electrode (anode) makes contact with the substrate or deposited material. One method of doing this is by sequentially activating pixels or groups of pixels and measuring the resulting system current. One drawback to this is that the electrical current supplied by the pixels is read at the system level, combining the current supplied by many pixels into one electrical current. This means that to get a better characterization of the electrical current supplied by an individual pixel, fewer pixels or even one single pixel should be energized at a time for each current measurement. This in turn impacts the primary deposition process because it inherently requires the bulk of the pixels to remain off during this characterization period. Typically, the current flowing through the system is characterized in this method by measuring the voltage drop across a resistive sensing element.

A superior approach is to multiplex the sensing of the pixels so that multiple current measurements are taken at a time. Further, if measurements are taken at the high side (internal to the print head), the print process does not need to be stopped as measurements are taken. If a hardware approach is employed, the frequency of measurements can be increased.

Figure 41:
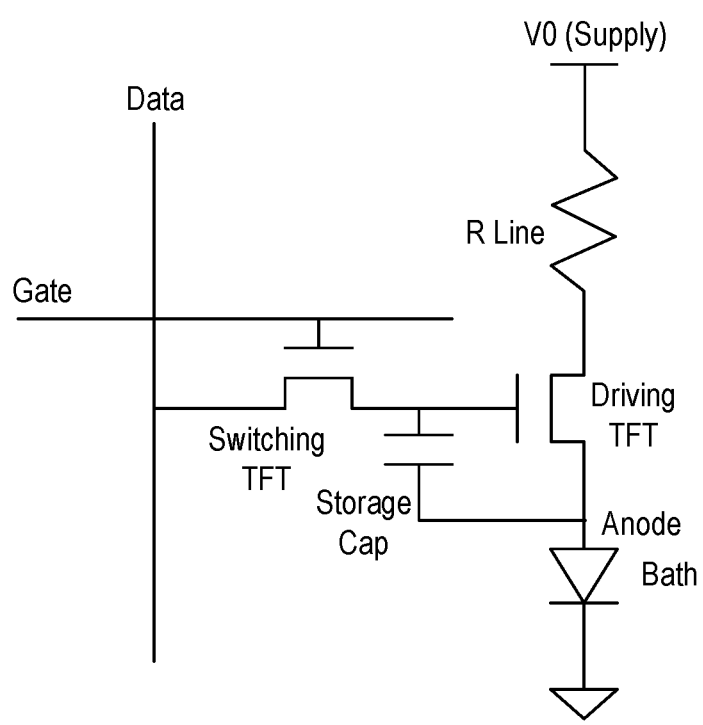
FIG. 41 shows an illustrative embodiment of a circuit for a pixel unit cell.

Typically, a deposition pixel circuit is shown in FIG. 41, with two transistors, and one capacitor. One transistor, the "drive" transistor is much larger, and switches the main pixel current. The other, smaller transistor, the "switch" transistor is employed to simply charge and discharge the main transistor as the row select line "gate" line scans through the panel.

We aim to exploit the fact that as the pixel/electrode is plating, a voltage remains at the node marked "Anode" which causes the electrochemical reaction. When the deposit (which is kept at 0V potential), grows and touches the anode, the mechanical hard short greatly reduces the impedance of the system at the anode, and causes a spike in current. Subsequently, the voltage at the anode drops significantly, and we aim to measure this difference.

We have conceptualized two different methods of measuring this change, by measuring the voltage at this node, and by measuring current at this node through a sense element to infer the voltage at the node. In both cases, an additional transistor and sense line is added to the pixel unit cell that connects the pixel to the sense element when the gate of the sense transistor is modulated. In this way, many pixels can be connected to a shared sense line, and only the pixel at the intersection of the select gate line and the sense line's measurement is transmitted to the edge of the array.

Figure 42:
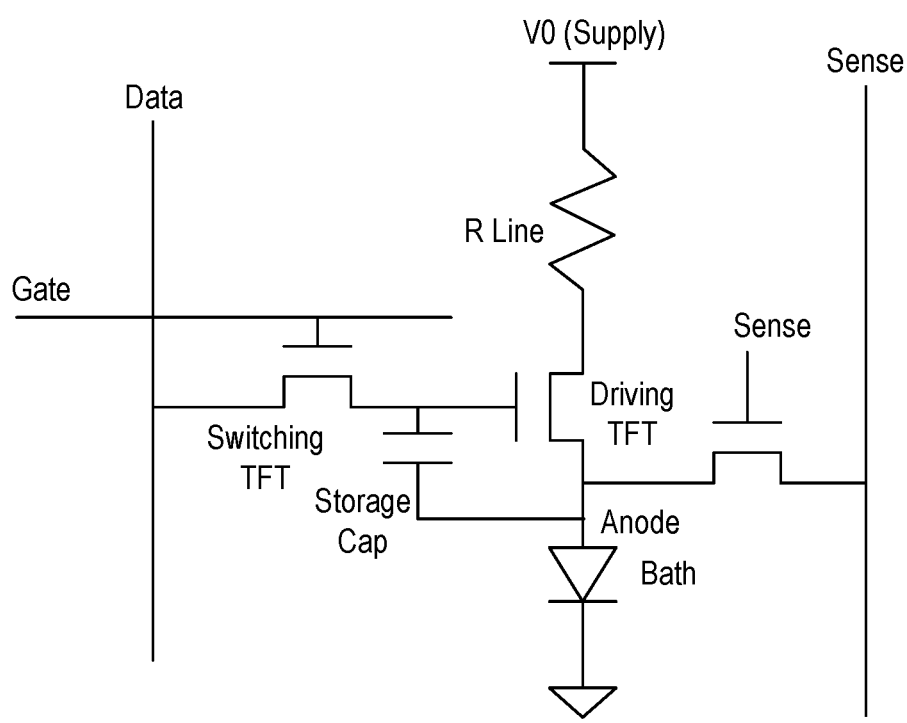
FIG. 42 shows an illustrative embodiment of a circuit for a pixel unit cell.

FIG. 42 shows the addition of the additional sense line, sense transistor.

On an edge of the array a high speed Analog to Digital Converter (ADC) will interpret all of the signals in parallel and outputs the values to an external microcontroller via digital communication. These devices either measure the voltage of a signal line, or the current flowing through a signal line. In one implementation, a read out IC ROIC typically used for Infrared or X-Ray detectors with 256 or greater inputs is utilized, with each column in the printhead connected to one input. In the case that the array consists of more columns than inputs, multiple of these ADC chips are incorporated into the device, facilitating a measurement on each column.

Most simply, the ADC input is connected to the anode output through the sense line and the pixels' associated sense transistor. In the simplest case, the ADC directly measures the voltage at the node through the connection. In the case that the ADC actually is configured to measure the current on the line, the voltage at the node can be inferred by knowing the resistance of the sense transistor and the associated sense line.

To simplify the design and fabrication of the device, it is possible to use the same electrical signal for the gate of the sense transistor as the signal which is used for the gate on the switching transistor. In this way, the addressing and the measurement of the pixels is done in parallel. Knowing that allowing current to flow through the sense transistor in effect robs current from the bath, it might be preferable to only take this measurement current when the row is being actively addressed rather than all the time.

While the invention herein disclosed has been described by means of specific embodiments and applications thereof, numerous modifications and variations could be made thereto by those skilled in the art without departing from the scope of the invention set forth in the claims.

What is claimed is:

1. An electrochemical additive manufacturing method, comprising steps of:
   positioning a surface of a cathode into an electrolyte solution;
   positioning a plurality of deposition anodes into the electrolyte solution such that a gap, filled with the electrolyte solution, is defined between the cathode and the deposition anodes;
   while transmitting electrical energy through two or more of the plurality of deposition anodes, the electrolyte solution, and the cathode, such that a quantity of a material in the electrolyte solution is deposited onto the cathode, electrically connecting one of the two or more of the plurality of deposition anodes to a corresponding one of a plurality of electrical sensors, such that when a first amount of the electrical energy is transmitted through the one of the two or more of the plurality of deposition anodes, a portion of the first amount of the electrical energy is transmitted to the corresponding one of the plurality of electrical sensors;
   detecting, via the corresponding one of the plurality of electrical sensors, at least one of a voltage or a current of the portion of the first amount of the electrical energy;
   while transmitting the electrical energy through the two or more of the plurality of deposition anodes, the electrolyte solution, and the cathode, subsequent to electrically connecting the one of the two or more of the plurality of deposition anodes to the corresponding one of the plurality of electrical sensors, electrically connecting a second one of the two or more of the plurality of deposition anodes to a corresponding second one of the plurality of electrical sensors, such that when a second amount of the electrical energy is transmitted through the second one of the two or more of the plurality of deposition anodes, a portion of the second amount of the electrical energy is transmitted to the corresponding second one of the plurality of electrical sensors;
   detecting, via the corresponding second one of the plurality of electrical sensors, at least one of a voltage or a current of the portion of the second amount of the electrical energy; and
   determining a condition of a part, formed on the cathode, based on the at least one of the voltage or the current of the portion of the first amount of electrical energy, detected by the corresponding one of the plurality of electrical sensors, or the at least one of the voltage or the current of the portion of the second amount of electrical energy, detected by the corresponding second one of the plurality of electrical sensors, by performing a thresholding operation using the at least one of the voltage or the current of the portion of the first amount of electrical energy or the at least one of the voltage or the current of the portion of the second amount of electrical energy, so that a binary image, having pixels, is generated, wherein the pixels are first pixels and second pixels, with the first pixels representing regions of higher material deposition, and the second pixels representing regions of lower material deposition.

2. The electrochemical additive manufacturing method according to claim 1, further comprising a step of changing the first amount of the electrical energy, transmitted through the one of the two or more of the plurality of deposition anodes, in response to the at least one of the voltage or the current of the portion of the electrical energy, detected by the corresponding one of the plurality of electrical sensors.

3. The electrochemical additive manufacturing method according to claim 2, wherein the first amount of the electrical energy, transmitted through the one of the two or more of the plurality of deposition anodes, is changed when:
  the voltage of the portion of the first amount of the electrical energy, detected by the corresponding one of the plurality of electrical sensors, is different from a target voltage; or
  the current of the portion of the first amount of the electrical energy, detected by the corresponding one of the plurality of electrical sensors, is different from a target current.

4. The electrochemical additive manufacturing method according to claim 1, further comprising steps of:
  changing the first amount of the electrical energy, transmitted through the one of the two or more of the plurality of deposition anodes, by a third amount, in response to the step of detecting, via the corresponding one of the plurality of electrical sensors, the at least one of the voltage or the current of the portion of the first amount of the electrical energy; and
  changing the second amount of the electrical energy, transmitted through the second one of the two or more of the plurality of deposition anodes, by a fourth amount, in response to the step of detecting, via the corresponding second one of the plurality of electrical sensors, the at least one of the voltage or the current of the portion of the second amount of the electrical energy,
  wherein the third amount of the electrical energy is different from the fourth amount of the electrical energy.

5. The electrochemical additive manufacturing method according to claim 1, further comprising steps of:
  changing the first amount of the electrical energy, transmitted through the one of the two or more of the plurality of deposition anodes, the electrolyte solution, and the cathode to a third amount, in response to the at least one of the voltage or the current of the portion of the first amount of the electrical energy, detected by the corresponding one of the plurality of electrical sensors; and
  changing the second amount of the electrical energy, transmitted through the second one of the two or more of the plurality of deposition anodes, the electrolyte solution, and the cathode to a fourth amount, in response to the at least one of the voltage or the current of the portion of the second amount of the electrical energy, detected by the corresponding second one of the plurality of electrical sensors,
  wherein the third amount is different from the fourth amount, and neither the third amount nor the fourth amount is zero.

6. The electrochemical additive manufacturing method according to claim 1, further comprising a step of comparing the binary image to a target map of a layer of the part, so that at least one of:
  one or more completed regions of the layer of the part, where a predetermined amount of material has been deposited, is identified, or
  one or more uncompleted regions of the layer of the part, where less than the predetermined amount of the material has been deposited, is identified.

7. The electrochemical additive manufacturing method according to claim 6, further comprising a step of determining a number of the one or more completed regions of the layer of the part and a number of the one or more uncompleted regions of the layer of the part.

8. The electrochemical additive manufacturing method according to claim 7, further comprising a step of taking a ratio of the number of the one or more completed regions of the layer of the part to the number of the one or more uncompleted regions of the layer of the part.

9. The electrochemical additive manufacturing method according to claim 8, further comprising a step of comparing the ratio of the number of the one or more completed regions of the layer of the part to the number of the one or more uncompleted regions of the layer of the part to a threshold value, representing a desired completion percentage for the layer.

10. The electrochemical additive manufacturing method according to claim 1, wherein each one of the plurality of electrical sensors is connected to at least one of the plurality of deposition anodes via a sense line and a transistor.

11. An electrochemical additive manufacturing method, comprising steps of:
  positioning a surface of a cathode into an electrolyte solution;
  positioning deposition anodes into the electrolyte solution such that a gap, filled with the electrolyte solution, is defined between the cathode and the deposition anodes;
  transmitting a first amount of electrical energy through a first one of the deposition anodes, the electrolyte solution, and the cathode, such that a first quantity of a material in the electrolyte solution is deposited onto the cathode as a first layer;
  transmitting a second amount of electrical energy through a second one of the deposition anodes, the electrolyte solution, and the cathode, such that a second quantity of the material in the electrolyte solution is deposited onto the cathode as a second layer;
  electrically connecting the first one of the deposition anodes to one of a plurality of electrical sensors, such that when the first amount of the electrical energy is transmitted through the first one of the deposition anodes, the electrolyte solution, and the cathode, a portion of the first amount of the electrical energy is transmitted to the one of the plurality of electrical sensors; and
  detecting, via the one of the plurality of electrical sensors, at least one of a voltage or a current of the portion of the first amount of the electrical energy, transmitted through the first one of the deposition anodes to the one of the plurality of electrical sensors,
  electrically connecting the second one of the deposition anodes to a second one of the plurality of electrical sensors, such that when the second amount of the electrical energy is transmitted through the second one of the deposition anodes, the electrolyte solution, and the cathode, a portion of the second amount of the electrical energy is transmitted to the second one of the plurality of electrical sensors;

detecting, via the second one of the plurality of electrical sensors, at least one of a voltage or a current of the portion of the second amount of the electrical energy, transmitted through the second one of the deposition anodes to the second one of the plurality of electrical sensors; and determining a condition of a part, formed on the cathode, based on the at least one of the voltage or the current of the portion of the first amount of electrical energy, detected by the one of the plurality of electrical sensors, or the at least one of the voltage or the current of the portion of the second amount of electrical energy, detected by the second one of the plurality of electrical sensors, by performing a thresholding operation using the at least one of the voltage or the current of the portion of the first amount of electrical energy or the at least one of the voltage or the current of the portion of the second amount of electrical energy, so that a binary image, having pixels, is generated, wherein the pixels are first pixels and second pixels, with the first pixels representing regions of higher material deposition, and the second pixels representing regions of lower material deposition, wherein the deposition anodes are arranged in a two-dimensional grid, comprising a plurality of rows and a plurality of columns.

12. The electrochemical additive manufacturing method according to claim 11, wherein the first amount of the electrical energy is different than the second amount of the electrical energy.

13. The electrochemical additive manufacturing method according to claim 12, wherein the step of transmitting the second amount of the electrical energy through the second one of the deposition anodes follows the step of transmitting the first amount of the electrical energy through the first one of the deposition anodes.

14. The electrochemical additive manufacturing method according to claim 11, wherein a thickness of the first layer is different than a thickness of the second layer.

15. The electrochemical additive manufacturing method according to claim 11, wherein:
the first amount of the electrical energy is transmitted at a first voltage;
the second amount of the electrical energy is transmitted at a second voltage; and
the second voltage is different from the first voltage.

16. The electrochemical additive manufacturing method according to claim 11, wherein:
the first amount of the electrical energy is transmitted at a given voltage, applied for a first period of time;
the second amount of the electrical energy is transmitted at the given voltage, applied for a second period of time; and
the second period of time is different from the first period of time.

17. An electrochemical additive manufacturing method, comprising steps of:

positioning a surface of a cathode into an electrolyte solution;

positioning a plurality of deposition anodes into the electrolyte solution such that a gap, filled with the electrolyte solution, is defined between the cathode and the deposition anodes;

while transmitting electrical energy through two or more of the plurality of deposition anodes, the electrolyte solution, and the cathode, such that a quantity of a material in the electrolyte solution is deposited onto the cathode, electrically connecting one of the two or more of the plurality of deposition anodes to a corresponding one of a plurality of electrical sensors, such that when a first amount of the electrical energy is transmitted through the one of the two or more of the plurality of deposition anodes, a portion of the first amount of the electrical energy is transmitted to the corresponding one of the plurality of electrical sensors, and detecting, via the corresponding one of the plurality of electrical sensors, at least one of a voltage or a current, associated with the portion of the first amount of the electrical energy, transmitted through the one of the two or more of the plurality of deposition anodes;

while transmitting the electrical energy through the two or more of the plurality of deposition anodes, the electrolyte solution, and the cathode, electrically connecting a second one of the two or more of the plurality of deposition anodes to a corresponding second one of the plurality of electrical sensors, such that when a second amount of the electrical energy is transmitted through the second one of the two or more of the plurality of deposition anodes, a portion of the second amount of the electrical energy is transmitted to the corresponding second one of the plurality of electrical sensors, and detecting, via the corresponding second one of the plurality of electrical sensors, at least one of a voltage or a current, associated with the portion of the second amount of the electrical energy, transmitted through the second one of the two or more of the plurality of deposition anodes; and determining a condition of a part, formed on the cathode, based on the at least one of the voltage or the current of the portion of the first amount of electrical energy, detected by the corresponding one of the plurality of electrical sensors, or the at least one of the voltage or the current of the portion of the second amount of electrical energy, detected by the corresponding second one of the plurality of electrical sensors, by performing a thresholding operation using the at least one of the voltage or the current of the portion of the first amount of electrical energy or the at least one of the voltage or the current of the portion of the second amount of electrical energy, so that a binary image, having pixels, is generated, wherein the pixels are first pixels and second pixels, with the first pixels representing regions of higher material deposition, and the second pixels representing regions of lower material deposition, wherein each one of the plurality of electrical sensors is stationary relative to the deposition anodes.

* * * * *